(12) United States Patent
Yavid

(10) Patent No.: US 12,399,279 B1
(45) Date of Patent: Aug. 26, 2025

(54) ENHANCED HYBRID LIDAR WITH HIGH-SPEED SCANNING

(71) Applicant: Red Creamery LLC, Massapequa Park, NY (US)

(72) Inventor: Dmitriy Yavid, Stony Brook, NY (US)

(73) Assignee: RED CREAMERY LLC, Massapequa, NY (US)

(*) Notice: Subject to any disclaimer, the term of this patent is extended or adjusted under 35 U.S.C. 154(b) by 1084 days.

(21) Appl. No.: 17/370,183

(22) Filed: Jul. 8, 2021

Related U.S. Application Data

(63) Continuation-in-part of application No. 17/356,676, filed on Jun. 24, 2021, and a continuation-in-part of application No. 17/000,464, filed on Aug. 24, 2020, now Pat. No. 11,556,000, and a continuation-in-part of application No. 16/744,410, filed on Jan. 16, 2020, now Pat. No. 11,156,716, which is a continuation of
(Continued)

(51) Int. Cl.
  *G01C 3/08* (2006.01)
  *G01S 7/481* (2006.01)
  *G01S 7/4863* (2020.01)
  *G01S 7/4865* (2020.01)
  *G01S 17/89* (2020.01)

(52) U.S. Cl.
  CPC ............ *G01S 17/89* (2013.01); *G01S 7/4817* (2013.01); *G01S 7/4863* (2013.01); *G01S 7/4865* (2013.01)

(58) Field of Classification Search
  CPC ...... G01S 17/89; G01S 7/4817; G01S 7/4863; G01S 7/4865
  See application file for complete search history.

(56) References Cited

U.S. PATENT DOCUMENTS

| | | |
|---|---|---|
| 3,636,250 A | 1/1972 | Haeff |
| 4,240,746 A | 12/1980 | Courtenay |

(Continued)

FOREIGN PATENT DOCUMENTS

| | | |
|---|---|---|
| CN | 1106534 A | 8/1995 |
| CN | 1576123 A | 2/2005 |

(Continued)

OTHER PUBLICATIONS

US 11,068,723 B1, 07/2021, Beijbom (withdrawn)

*Primary Examiner* — Mark Hellner
(74) *Attorney, Agent, or Firm* — Thomas A. O'Rourke; James Bongiorno; O'ROURKE IP LAW PLLC

(57) ABSTRACT

An optical arrangement for a LIDAR system includes a laser, scanner, fold mirror, lens, and sensors. Adding a wedge-shaped optical element creates an auxiliary field of view, when positioned to overlie an edge portion of the lens. The wedge-shaped optical element may have a variable transparency preventing reception by the sensors of excessive signals from close targets. The sensors may be: a plurality of sensors with unique lengths/widths, arranged to form a linear array; or sensors with the same length/width, but positioned to form an arcuate shape, compensating for an arcuate scan line; or two columns of sensors, one with a field of view in focus at far field positions, and the other in focus at near field positions, correcting for parallax effect/error; or a column of highly sensitive sensors surrounded by a plurality of guard rail sensors having higher immunity to damage from stray laser light.

9 Claims, 51 Drawing Sheets

Related U.S. Application Data application No. 15/432,105, filed on Feb. 14, 2017, now Pat. No. 10,571,574.

(60) Provisional application No. 63/154,990, filed on Mar. 1, 2021, provisional application No. 63/155,169, filed on Mar. 1, 2021, provisional application No. 62/890,189, filed on Aug. 22, 2019, provisional application No. 62/295,210, filed on Feb. 15, 2016.

(56) References Cited

U.S. PATENT DOCUMENTS

| | | |
|---|---|---|
| 4,397,549 A | 8/1983 | Morgan |
| 4,627,734 A | 12/1986 | Rioux |
| 4,820,914 A | 4/1989 | Allen |
| 4,862,257 A | 8/1989 | Ulich |
| 4,941,719 A | 7/1990 | Hisada |
| 4,964,721 A | 10/1990 | Ulich |
| 4,967,270 A | 10/1990 | Ulich |
| 5,006,721 A | 4/1991 | Cameron |
| 5,013,917 A | 5/1991 | Ulich |
| 5,091,778 A | 2/1992 | Keeler |
| 5,096,293 A | 3/1992 | Cecchi |
| 5,157,257 A | 10/1992 | Geiger |
| 5,159,225 A | 10/1992 | Um |
| 5,164,784 A | 11/1992 | Waggoner |
| 5,164,823 A | 11/1992 | Keeler |
| 5,166,507 A | 11/1992 | Davis |
| 5,192,978 A | 3/1993 | Keeler |
| 5,198,657 A | 3/1993 | Trost |
| 5,200,606 A | 4/1993 | Krasutsky |
| 5,206,698 A | 4/1993 | Werner |
| 5,220,164 A | 6/1993 | Lieber |
| 5,221,927 A | 6/1993 | Palmer |
| 5,221,956 A | 6/1993 | Patterson |
| 5,231,401 A | 7/1993 | Kaman |
| 5,231,480 A | 7/1993 | Ulich |
| 5,233,415 A | 8/1993 | French |
| 5,239,352 A | 8/1993 | Bissonnette |
| 5,241,314 A | 8/1993 | Keeler |
| 5,243,541 A | 9/1993 | Ulich |
| 5,250,810 A | 10/1993 | Geiger |
| 5,255,065 A | 10/1993 | Schwemmer |
| 5,257,085 A | 10/1993 | Ulich |
| 5,270,780 A | 12/1993 | Moran |
| 5,270,929 A | 12/1993 | Paulson |
| 5,272,351 A | 12/1993 | Andressen |
| 5,303,084 A | 4/1994 | Pflibsen |
| 5,311,272 A | 5/1994 | Daniels |
| 5,335,070 A | 8/1994 | Pflibsen |
| 5,343,284 A | 8/1994 | Keeler |
| 5,353,054 A | 10/1994 | Geiger |
| 5,384,589 A | 1/1995 | Ulich |
| 5,442,358 A | 8/1995 | Keeler |
| 5,450,125 A | 9/1995 | Ulich |
| 5,457,639 A | 10/1995 | Ulich |
| 5,467,122 A | 11/1995 | Bowker |
| 5,534,993 A | 7/1996 | Ball |
| 5,546,183 A | 8/1996 | Fegley |
| 5,570,224 A | 10/1996 | Endo |
| 5,574,553 A | 11/1996 | McManamon |
| 5,579,102 A * | 11/1996 | Pratt ............... G01S 17/89 356/141.5 |
| 5,608,514 A | 3/1997 | Stann |
| 5,644,386 A | 7/1997 | Jenkins |
| 5,667,304 A | 9/1997 | Gelbwachs |
| 5,670,935 A | 9/1997 | Schofield |
| 5,682,225 A | 10/1997 | DuBois |
| 5,724,125 A | 3/1998 | Ames |
| 5,767,519 A | 6/1998 | Gelbwachs |
| 5,778,019 A | 7/1998 | Churnside |
| 5,796,471 A | 8/1998 | Wilkerson |
| 5,822,047 A | 10/1998 | Contarino |
| 5,825,464 A | 10/1998 | Feichtner |
| 5,831,719 A | 11/1998 | Berg |
| 5,831,724 A | 11/1998 | Cordes |
| 5,835,199 A | 11/1998 | Phillips |
| 5,847,815 A | 12/1998 | Albouy |
| 5,847,816 A | 12/1998 | Zediker |
| 5,847,817 A | 12/1998 | Zediker |
| 5,870,180 A | 2/1999 | Wangler |
| 5,877,851 A | 3/1999 | Stann |
| 5,898,483 A | 4/1999 | Flowers |
| 5,914,776 A | 6/1999 | Streicher |
| 5,989,087 A | 11/1999 | Cordes |
| 6,042,050 A | 3/2000 | Sims |
| 6,084,659 A | 7/2000 | Tulet |
| 6,147,747 A | 11/2000 | Kavaya |
| 6,246,468 B1 | 6/2001 | Dimsdale |
| 6,302,355 B1 | 10/2001 | Sallee |
| 6,323,941 B1 | 11/2001 | Evans |
| 6,371,405 B1 | 4/2002 | Sallee |
| 6,381,007 B2 | 4/2002 | Fabre |
| 6,388,739 B1 | 5/2002 | Rice |
| 6,396,397 B1 | 5/2002 | Bos |
| 6,396,577 B1 | 5/2002 | Ramstack |
| 6,404,494 B1 | 6/2002 | Masonis |
| 6,441,889 B1 | 8/2002 | Patterson |
| 6,448,572 B1 | 9/2002 | Tennant |
| 6,522,396 B1 | 2/2003 | Halmos |
| 6,556,282 B2 | 4/2003 | Jamieson |
| 6,559,932 B1 | 5/2003 | Halmos |
| 6,577,417 B1 | 6/2003 | Khoury |
| 6,593,582 B2 | 7/2003 | Lee |
| 6,608,669 B2 | 8/2003 | Holton |
| 6,608,677 B1 | 8/2003 | Ray |
| 6,618,125 B2 | 9/2003 | Stann |
| 6,619,406 B1 | 9/2003 | Kacyra |
| 6,634,600 B2 | 10/2003 | Krawczyk |
| 6,636,300 B2 | 10/2003 | Doemens |
| 6,646,725 B1 | 11/2003 | Eichinger |
| 6,664,529 B2 | 12/2003 | Pack |
| 6,711,475 B2 | 3/2004 | Murphy |
| 6,714,286 B1 | 3/2004 | Wheel |
| 6,717,655 B2 | 4/2004 | Cheng |
| 6,724,470 B2 | 4/2004 | Barenz |
| 6,781,683 B2 | 8/2004 | Kacyra |
| 6,836,285 B1 | 12/2004 | Lubard |
| 6,844,924 B2 | 1/2005 | Ruff |
| 6,873,716 B1 | 3/2005 | Bowker |
| 6,875,978 B2 | 4/2005 | Halmos |
| 6,882,409 B1 | 4/2005 | Evans |
| 6,963,354 B1 | 11/2005 | Scheps |
| 7,010,339 B2 | 3/2006 | Mullen |
| 7,046,358 B2 | 5/2006 | Barker |
| 7,064,810 B2 | 6/2006 | Anderson |
| 7,064,817 B1 | 6/2006 | Schmitt |
| 7,067,812 B2 | 6/2006 | Gelbwachs |
| 7,104,453 B1 | 9/2006 | Zhu |
| 7,130,028 B2 | 10/2006 | Pain |
| 7,135,672 B2 | 11/2006 | Land |
| 7,164,468 B2 | 1/2007 | Correia Da Silva Vilar |
| 7,164,787 B1 | 1/2007 | Nevis |
| 7,164,788 B1 | 1/2007 | Nevis |
| 7,187,452 B2 | 3/2007 | Jupp |
| 7,190,854 B1 | 3/2007 | Novotny |
| 7,195,163 B2 | 3/2007 | Yoo |
| 7,203,339 B1 | 4/2007 | Nevis |
| 7,206,062 B2 | 4/2007 | Asbrock |
| 7,215,826 B1 | 5/2007 | Nevis |
| 7,227,625 B2 | 6/2007 | Kobayashi |
| 7,242,460 B2 | 7/2007 | Hsu |
| 7,248,342 B1 | 7/2007 | Degnan |
| 7,248,343 B2 | 7/2007 | Cardero |
| 7,260,507 B2 | 8/2007 | Kalayeh |
| 7,274,448 B2 | 9/2007 | Babbin |
| 7,281,891 B2 | 10/2007 | Smith |
| 7,301,608 B1 | 11/2007 | Mendenhall |
| 7,312,855 B1 | 12/2007 | Hintz |
| 7,313,506 B2 | 12/2007 | Kacyra |
| 7,333,184 B2 | 2/2008 | Kalayeh |
| 7,336,345 B2 | 2/2008 | Krasutsky |
| 7,339,670 B2 | 3/2008 | Carrig |
| 7,345,744 B2 | 3/2008 | Halmos |

(56) References Cited

U.S. PATENT DOCUMENTS

| | | | |
|---|---|---|---|
| 7,359,039 B2 | 4/2008 | Kloza |
| 7,361,922 B2 | 4/2008 | Kameyama |
| 7,375,804 B2 | 5/2008 | Liebman |
| 7,375,877 B1 | 5/2008 | Di Teodoro |
| 7,397,568 B2 | 7/2008 | Bryce |
| 7,400,384 B1 | 7/2008 | Evans |
| 7,411,196 B2 | 8/2008 | Kalayeh |
| 7,411,662 B1 | 8/2008 | Ruff |
| 7,417,717 B2 | 8/2008 | Pack |
| 7,428,041 B2 | 9/2008 | Kallio |
| 7,436,494 B1 | 10/2008 | Kennedy |
| 7,440,084 B2 | 10/2008 | Kane |
| 7,463,340 B2 | 12/2008 | Krishnaswamy |
| 7,463,341 B2 | 12/2008 | Halldorsson |
| 7,474,332 B2 | 1/2009 | Byren |
| 7,474,964 B1 | 1/2009 | Welty |
| 7,485,862 B2 | 2/2009 | Danziger |
| 7,495,764 B1 | 2/2009 | McMillan |
| 7,505,488 B2 | 3/2009 | Halmos |
| 7,532,311 B2 | 5/2009 | Henderson |
| 7,561,261 B2 | 7/2009 | Hilde |
| 7,570,347 B2 | 8/2009 | Ruff |
| 7,571,081 B2 | 8/2009 | Faulkner |
| 7,580,127 B1 | 8/2009 | Mayor |
| 7,583,364 B1 | 9/2009 | Mayor |
| 7,630,062 B2 | 12/2009 | Mori |
| 7,649,616 B2 | 1/2010 | Michael |
| 7,652,752 B2 | 1/2010 | Fetzer |
| 7,656,526 B1 | 2/2010 | Spuler |
| 7,675,610 B2 | 3/2010 | Redman |
| 7,675,619 B2 | 3/2010 | Danehy |
| 7,683,928 B2 | 3/2010 | Lubard |
| 7,688,348 B2 | 3/2010 | Lubard |
| 7,688,374 B2 | 3/2010 | Land |
| 7,692,775 B2 | 4/2010 | Treado |
| 7,697,125 B2 | 4/2010 | Swenson |
| 7,697,794 B2 | 4/2010 | Dragic |
| 7,701,558 B2 | 4/2010 | Walsh |
| 7,720,580 B2 | 5/2010 | Higgins-Luthman |
| 7,720,605 B2 | 5/2010 | Welty |
| 7,739,823 B2 | 6/2010 | Shapira |
| 7,741,618 B2 | 6/2010 | Lee |
| 7,742,151 B2 | 6/2010 | Krasutsky |
| 7,746,450 B2 | 6/2010 | Willner |
| 7,755,745 B2 | 7/2010 | Urata |
| 7,760,334 B1 | 7/2010 | Evans |
| 7,786,421 B2 * | 8/2010 | Nikzad .............. H01L 27/14806 |
| | | | 250/214 R |
| 7,800,736 B2 | 9/2010 | Pack |
| 7,821,619 B2 | 10/2010 | Krikorian |
| 7,827,861 B2 | 11/2010 | La White et al. |
| 7,830,442 B2 | 11/2010 | Griffis |
| 7,847,235 B2 | 12/2010 | Krumpkin |
| 7,894,044 B1 | 2/2011 | Sullivan |
| 7,933,002 B2 | 4/2011 | Halldorsson |
| 7,936,448 B2 | 5/2011 | Albuquerque |
| 7,944,547 B2 | 5/2011 | Wang |
| 7,948,610 B2 | 5/2011 | Hintz |
| 7,961,301 B2 | 6/2011 | Earhart |
| 7,969,558 B2 | 6/2011 | Hall |
| 7,974,813 B2 | 7/2011 | Welty |
| 7,983,738 B2 | 7/2011 | Goldman |
| 7,986,397 B1 | 7/2011 | Tiemann |
| 8,010,300 B1 | 8/2011 | Stearns |
| 8,024,135 B2 | 9/2011 | Lee |
| 8,054,454 B2 | 11/2011 | Treado |
| 8,054,464 B2 | 11/2011 | Mathur |
| 8,072,581 B1 | 12/2011 | Breiholz |
| 8,072,582 B2 | 12/2011 | Meneely |
| 8,072,663 B2 | 12/2011 | O'Neill |
| 8,077,294 B1 | 12/2011 | Grund |
| 8,081,301 B2 | 12/2011 | Stann |
| 8,090,153 B2 | 1/2012 | Schofield |
| 8,098,889 B2 | 1/2012 | Zhu |
| 8,115,622 B2 | 2/2012 | Stolarczyk |
| 8,115,925 B1 | 2/2012 | Mathur |
| 8,120,754 B2 | 2/2012 | Kaehler |
| 8,121,798 B2 | 2/2012 | Lippert |
| 8,125,367 B2 | 2/2012 | Ludwig |
| 8,125,622 B2 | 2/2012 | Gammenthaler |
| 8,135,513 B2 | 3/2012 | Bauer |
| 8,139,863 B2 | 3/2012 | Hsu |
| 8,164,742 B1 | 4/2012 | Carrieri |
| 8,179,521 B2 | 5/2012 | Valla |
| 8,198,576 B2 | 6/2012 | Kennedy |
| 8,224,097 B2 | 7/2012 | Matei |
| 8,229,663 B2 | 7/2012 | Zeng |
| 8,229,679 B1 | 7/2012 | Matthews |
| 8,242,428 B2 | 8/2012 | Meyers |
| 8,244,026 B2 | 8/2012 | Nahari |
| 8,269,950 B2 | 9/2012 | Spinelli |
| RE43,722 E | 10/2012 | Kennedy |
| 8,279,420 B2 | 10/2012 | Ludwig |
| 8,284,382 B2 | 10/2012 | Krasutsky |
| 8,294,881 B2 | 10/2012 | Hellickson |
| 8,306,273 B1 | 11/2012 | Gravseth |
| 8,306,941 B2 | 11/2012 | Ma |
| 8,325,328 B2 | 12/2012 | Renard |
| 8,332,134 B2 | 12/2012 | Zhang |
| 8,344,942 B2 | 1/2013 | Jin |
| 8,362,889 B2 | 1/2013 | Komori |
| 8,386,876 B2 | 2/2013 | Khoshnevis |
| 8,427,649 B2 | 4/2013 | Hays |
| 8,441,622 B2 | 5/2013 | Gammenthaler |
| 8,446,571 B2 | 5/2013 | Fiess |
| 8,465,478 B2 | 6/2013 | Frey |
| 8,478,386 B2 | 7/2013 | Goldman |
| 8,493,445 B2 | 7/2013 | Degnan |
| 8,494,687 B2 | 7/2013 | Vanek |
| 8,508,721 B2 | 8/2013 | Cates |
| 8,537,337 B2 | 9/2013 | Welty |
| 8,537,338 B1 | 9/2013 | Medasani |
| 8,538,695 B2 | 9/2013 | Welty |
| 8,541,744 B1 | 9/2013 | Liu |
| 8,558,993 B2 | 10/2013 | Newbury |
| 8,577,611 B2 | 11/2013 | Ma |
| 8,587,637 B1 | 11/2013 | Cryder |
| 8,599,365 B2 | 12/2013 | Ma |
| 8,599,367 B2 | 12/2013 | Canham |
| 8,600,589 B2 | 12/2013 | Mendez-Rodriguez |
| 8,605,262 B2 | 12/2013 | Campbell |
| 8,610,881 B2 | 12/2013 | Gammenthaler |
| 8,629,975 B1 | 1/2014 | Dierking |
| 8,629,977 B2 | 1/2014 | Phillips |
| 8,648,702 B2 | 2/2014 | Pala |
| 8,655,513 B2 | 2/2014 | Vanek |
| 8,659,747 B2 | 2/2014 | Goodman |
| 8,659,748 B2 | 2/2014 | Fakin |
| 8,670,591 B2 | 3/2014 | Mendez-Rodriguez |
| 8,675,181 B2 | 3/2014 | Hall |
| 8,675,184 B2 | 3/2014 | Schmitt |
| 8,692,980 B2 | 4/2014 | Gilliland |
| 8,692,983 B1 | 4/2014 | Chapman |
| 8,712,147 B2 | 4/2014 | Rahmes |
| 8,717,545 B2 | 5/2014 | Sebastian |
| 8,724,099 B2 | 5/2014 | Asahara |
| 8,736,818 B2 | 5/2014 | Weimer |
| 8,767,187 B2 | 7/2014 | Coda |
| 8,767,190 B2 | 7/2014 | Hall |
| 8,775,081 B2 | 7/2014 | Welty |
| 8,781,790 B2 | 7/2014 | Zhu |
| 8,786,835 B1 | 7/2014 | Reardon |
| 8,797,512 B2 | 8/2014 | Stettner |
| 8,798,372 B1 | 8/2014 | Korchev |
| 8,798,841 B1 | 8/2014 | Nickolaou |
| 8,804,101 B2 | 8/2014 | Spagnolia |
| 8,818,124 B1 | 8/2014 | Kia |
| 8,818,722 B2 | 8/2014 | Elgersma |
| 8,829,417 B2 | 9/2014 | Krill |
| 8,836,922 B1 | 9/2014 | Pennecot |
| 8,855,848 B2 | 10/2014 | Zeng |
| 8,855,849 B1 | 10/2014 | Ferguson |
| 8,885,883 B2 | 11/2014 | Goodman |
| 8,891,069 B2 | 11/2014 | Pedersen |

(56) References Cited

U.S. PATENT DOCUMENTS

| | | |
|---|---|---|
| 8,896,818 B2 | 11/2014 | Walsh |
| 8,915,709 B2 | 12/2014 | Westergaard |
| 8,938,362 B2 | 1/2015 | Ionov |
| 8,939,081 B1 | 1/2015 | Smith |
| 8,947,644 B2 | 2/2015 | Halmos |
| 8,947,647 B2 | 2/2015 | Halmos |
| 8,958,057 B2 | 2/2015 | Kane |
| 8,976,339 B2 | 3/2015 | Phillips |
| 8,976,340 B2 | 3/2015 | Gilliland |
| 8,976,342 B2 | 3/2015 | Lacondemine |
| 9,002,511 B1 | 4/2015 | Hickerson |
| 9,007,569 B2 | 4/2015 | AmZajerdian |
| 9,007,570 B1 | 4/2015 | Beyon |
| 9,041,915 B2 | 5/2015 | Earhart |
| 9,046,600 B2 | 6/2015 | James |
| 9,056,395 B1 | 6/2015 | Ferguson |
| 9,057,605 B2 | 6/2015 | Halmos |
| 9,069,059 B2 | 6/2015 | Vogt |
| 9,069,061 B1 | 6/2015 | Harwit |
| 9,069,080 B2 | 6/2015 | Stettner |
| 9,081,090 B2 | 7/2015 | Sebastian |
| 9,086,275 B2 | 7/2015 | Weinberg |
| 9,086,486 B2 | 7/2015 | Gilliland |
| 9,098,753 B1 | 8/2015 | Zhu |
| 9,103,907 B2 | 8/2015 | Sebastian |
| 9,110,154 B1 | 8/2015 | Bates |
| 9,110,163 B2 | 8/2015 | Rogan |
| 9,110,169 B2 | 8/2015 | Stettner |
| 9,111,444 B2 | 8/2015 | Kaganovich |
| 9,128,185 B2 | 9/2015 | Zeng |
| 9,128,190 B1 | 9/2015 | Ulrich |
| 9,129,211 B2 | 9/2015 | Zeng |
| 9,134,402 B2 | 9/2015 | Sebastian |
| 9,146,102 B2 | 9/2015 | Pernstich |
| 9,146,316 B2 | 9/2015 | Gammenthaler |
| 9,165,383 B1 | 10/2015 | Mendez-Rodriguez |
| 9,170,096 B2 | 10/2015 | Fowler |
| 9,188,674 B2 | 11/2015 | Suzuki |
| 9,188,677 B2 | 11/2015 | Bossert |
| 9,201,146 B2 | 12/2015 | Beyon |
| 9,215,382 B1 | 12/2015 | Hilde |
| 9,223,025 B2 | 12/2015 | Debrunner |
| 9,229,108 B2 | 1/2016 | Debrunner |
| 9,229,109 B2 | 1/2016 | Stettner |
| 9,244,272 B2 | 1/2016 | Schiltz |
| 9,255,989 B2 | 2/2016 | Joshi |
| 9,277,204 B2 | 3/2016 | Gilliland |
| 9,285,464 B2 | 3/2016 | Pennecot |
| 9,300,321 B2 | 3/2016 | Zalik |
| 9,310,471 B2 | 4/2016 | Sayyah |
| 9,310,487 B2 | 4/2016 | Sakimura |
| 9,315,192 B1 | 4/2016 | Zhu |
| 9,335,414 B2 | 5/2016 | Leyva |
| 9,354,317 B2 | 5/2016 | Halmos |
| 9,354,825 B2 | 5/2016 | Kozak |
| 9,360,554 B2 | 6/2016 | Retterath |
| 9,360,555 B2 | 6/2016 | Oh |
| 9,361,412 B1 | 6/2016 | Hilde |
| 9,366,938 B1 | 6/2016 | Anderson |
| 9,369,689 B1 | 6/2016 | Tran |
| 9,378,463 B2 | 6/2016 | Zeng |
| 9,383,447 B2 | 7/2016 | Schmitt |
| 9,383,753 B1 | 7/2016 | Tempelton |
| 9,407,285 B2 | 8/2016 | Kozak |
| 9,420,177 B2 | 8/2016 | Pettegrew |
| 9,420,264 B2 | 8/2016 | Gilliland |
| 9,425,654 B2 | 8/2016 | Lenius |
| 9,448,110 B2 | 9/2016 | Wong |
| 9,453,907 B2 | 9/2016 | Zheleznyak |
| 9,453,914 B2 | 9/2016 | Stettner |
| 9,453,941 B2 | 9/2016 | Stainvas Olshansky |
| 9,465,112 B2 | 10/2016 | Stettner |
| 9,470,520 B2 | 10/2016 | Schwarz |
| 9,476,968 B2 | 10/2016 | Anderson |
| 9,476,983 B2 | 10/2016 | Zeng |
| 9,489,746 B2 | 11/2016 | Sebastian |
| 9,495,466 B2 | 11/2016 | Geringer |
| 9,519,979 B1 | 12/2016 | Hilde |
| 9,523,772 B2 | 12/2016 | Rogan |
| 9,525,863 B2 | 12/2016 | Nawasra |
| 9,529,087 B2 | 12/2016 | Stainvas Olshansky |
| 9,530,062 B2 | 12/2016 | Nguyen |
| 9,547,074 B2 | 1/2017 | Schulz |
| 9,575,162 B2 | 2/2017 | Owechko |
| 9,575,164 B2 | 2/2017 | Kim |
| 9,575,184 B2 | 2/2017 | Gilliland |
| 9,575,341 B2 | 2/2017 | Heck |
| 9,588,220 B2 | 3/2017 | Rondeau |
| 9,599,468 B2 | 3/2017 | Walsh |
| 9,599,714 B2 | 3/2017 | Imaki |
| 9,602,224 B1 | 3/2017 | McLaughlin |
| 9,606,236 B2 | 3/2017 | Rojas |
| 9,625,580 B2 | 4/2017 | Kotelnikov |
| 9,625,582 B2 | 4/2017 | Gruver |
| 9,651,658 B2 | 5/2017 | Pennecot |
| 9,658,322 B2 | 5/2017 | Lewis |
| 9,658,337 B2 | 5/2017 | Ray |
| 9,678,199 B2 | 6/2017 | Hutson |
| 9,702,975 B2 | 7/2017 | Brinkmeyer |
| 9,710,714 B2 | 7/2017 | Chen |
| 9,735,885 B1 | 8/2017 | Sayyah |
| 9,753,124 B2 | 9/2017 | Hayes |
| 9,753,462 B2 | 9/2017 | Gilliland |
| 9,759,809 B2 | 9/2017 | Derenick |
| 9,772,399 B2 | 9/2017 | Schwarz |
| 9,778,362 B2 | 10/2017 | Rondeau |
| 9,784,840 B2 | 10/2017 | Pedersen |
| 9,790,924 B2 | 10/2017 | Bayon |
| 9,791,555 B2 | 10/2017 | Zhu |
| 9,791,557 B1 | 10/2017 | Wyrwas |
| 9,797,995 B2 | 10/2017 | Gilliland |
| 9,804,264 B2 | 10/2017 | Villeneuve |
| 9,810,775 B1 | 11/2017 | Welford |
| 9,810,776 B2 | 11/2017 | Sapir |
| 9,810,777 B2 | 11/2017 | Williams |
| 9,810,786 B1 | 11/2017 | Welford |
| 9,812,838 B2 | 11/2017 | Villeneuve |
| 9,823,118 B2 | 11/2017 | Doylend |
| 9,823,350 B2 | 11/2017 | Fluckiger |
| 9,823,351 B2 | 11/2017 | Haslim |
| 9,823,353 B2 | 11/2017 | Eichenholz |
| 9,830,509 B2 | 11/2017 | Zang |
| 9,831,630 B2 | 11/2017 | Lipson |
| 9,834,209 B2 | 12/2017 | Stettner |
| 9,841,495 B2 | 12/2017 | Campbell |
| 9,851,433 B2 | 12/2017 | Sebastian |
| 9,851,442 B1 | 12/2017 | Lo |
| RE46,672 E | 1/2018 | Hall |
| 9,857,473 B2 | 1/2018 | Kim |
| 9,860,770 B1 | 1/2018 | McLaughlin |
| 9,869,753 B2 | 1/2018 | Eldada |
| 9,869,754 B1 | 1/2018 | Campbell |
| 9,870,512 B2 | 1/2018 | Rogan |
| 9,872,010 B2 | 1/2018 | Tran |
| 9,874,635 B1 | 1/2018 | Eichenholz |
| 9,877,009 B2 | 1/2018 | Tran |
| 9,880,263 B2 | 1/2018 | Droz |
| 9,880,281 B2 | 1/2018 | Gilliland |
| 9,881,220 B2 | 1/2018 | Korvadi |
| 9,882,433 B2 | 1/2018 | Lenius |
| 9,885,778 B2 | 2/2018 | Dussan |
| 9,891,711 B1 | 2/2018 | Lee |
| 9,892,567 B2 | 2/2018 | Binion |
| 9,897,687 B1 | 2/2018 | Campbell |
| 9,897,689 B2 | 2/2018 | Dussan |
| 9,904,375 B1 | 2/2018 | Donnelly |
| 9,905,032 B2 | 2/2018 | Rogan |
| 9,905,987 B2 | 2/2018 | Seo |
| 9,905,992 B1 | 2/2018 | Welford |
| 9,910,136 B2 | 3/2018 | Heo |
| 9,910,139 B2 | 3/2018 | Pennecot |
| 9,910,155 B2 | 3/2018 | Lundquist |
| 9,915,726 B2 | 3/2018 | Bailey |
| 9,921,297 B2 | 3/2018 | Jungwirth |

(56) References Cited

U.S. PATENT DOCUMENTS

| | | | |
|---|---|---|---|
| 9,921,307 | B2 | 3/2018 | Schmalengurg |
| 9,927,524 | B2 | 3/2018 | Kaiser |
| 9,933,513 | B2 | 4/2018 | Dussan |
| 9,933,514 | B1 | 4/2018 | Gylys |
| 9,945,950 | B2 | 4/2018 | Newman |
| 9,958,545 | B2 | 5/2018 | Eichenholz |
| 9,971,024 | B2 | 5/2018 | Schwarz |
| 9,971,035 | B2 | 5/2018 | Imaki |
| 9,983,297 | B2 | 5/2018 | Hall |
| 9,983,590 | B2 | 5/2018 | Templeton |
| 9,985,071 | B2 | 5/2018 | Irish |
| 9,989,969 | B2 | 6/2018 | Eustice |
| 10,000,000 | B2 | 6/2018 | Marron |
| 10,012,474 | B2 | 7/2018 | Teetzel |
| 10,012,723 | B2 | 7/2018 | Lindskog |
| 10,012,732 | B2 | 7/2018 | Eichenholz |
| 10,018,711 | B1 | 7/2018 | Sebastian |
| 10,018,725 | B2 | 7/2018 | Liu |
| 10,018,726 | B2 | 7/2018 | Hall |
| 10,019,803 | B2 | 7/2018 | Venable |
| 10,024,964 | B2 | 7/2018 | Pierce |
| 10,031,214 | B2 | 7/2018 | Rosenweig |
| 10,031,231 | B2 | 7/2018 | Zermas |
| 10,031,232 | B2 | 7/2018 | Zohar |
| 10,032,369 | B2 | 7/2018 | Korvadi |
| 10,036,801 | B2 | 7/2018 | Reterrath |
| 10,036,803 | B2 | 7/2018 | Pacala |
| D826,746 | S | 8/2018 | Qiu |
| 10,042,042 | B2 | 8/2018 | Miremadi |
| 10,042,043 | B2 | 8/2018 | Dussan |
| 10,042,159 | B2 | 8/2018 | Dussan |
| 10,046,187 | B2 | 8/2018 | Doten |
| 10,048,359 | B2 | 8/2018 | Zhelenyzak |
| 10,048,374 | B2 | 8/2018 | Hall |
| 10,054,841 | B2 | 8/2018 | Nomura |
| 10,061,019 | B1 | 8/2018 | Campbell |
| 10,061,020 | B2 | 8/2018 | Slobodyanyuk |
| 10,061,266 | B2 | 8/2018 | Christmas |
| 10,067,230 | B2 | 9/2018 | Smits |
| 10,073,166 | B2 | 9/2018 | Dussan |
| 10,078,133 | B2 | 9/2018 | Dussan |
| 10,078,137 | B2 | 9/2018 | Ludwig |
| 10,088,557 | B2 | 10/2018 | Yeun |
| 10,088,558 | B2 | 10/2018 | Dussan |
| 10,094,657 | B2 | 10/2018 | Kiss |
| 10,094,916 | B1 | 10/2018 | Droz |
| 10,094,925 | B1 | 10/2018 | LaChapelle |
| 10,094,928 | B2 | 10/2018 | Josset |
| 10,107,914 | B2 | 10/2018 | Kalscheur |
| 10,107,915 | B2 | 10/2018 | Rozenzweig |
| 10,109,208 | B2 | 10/2018 | Cherepinsky |
| 10,114,109 | B2 | 10/2018 | Gazit |
| 10,114,112 | B2 | 10/2018 | Slobodyanyuk |
| 10,115,024 | B2 | 10/2018 | Stein |
| 10,120,076 | B2 | 11/2018 | Scheim |
| 10,121,813 | B2 | 11/2018 | Eichenholz |
| 10,126,411 | B2 | 11/2018 | Gilliland |
| 10,126,412 | B2 | 11/2018 | Eldada |
| 10,131,446 | B1 | 11/2018 | Stambler |
| 10,132,928 | B2 | 11/2018 | Eldada |
| 10,139,478 | B2 | 11/2018 | Gaalema |
| 10,142,538 | B2 | 11/2018 | Hurd |
| 10,145,941 | B2 | 12/2018 | Lee |
| 10,145,944 | B1 | 12/2018 | Shchemelinin |
| 10,145,945 | B2 | 12/2018 | Harada |
| 10,148,060 | B2 | 12/2018 | Hong |
| 10,151,836 | B2 | 12/2018 | O'Keeffe |
| 10,168,423 | B2 | 1/2019 | Lombrozo |
| 10,168,429 | B2 | 1/2019 | Maleki |
| 10,175,344 | B2 | 1/2019 | Jungwirth |
| 10,175,361 | B2 | 1/2019 | Haines |
| 10,180,493 | B2 | 1/2019 | Eldada |
| 10,185,027 | B2 | 1/2019 | O'Keeffe |
| 10,185,028 | B2 | 1/2019 | Dussan |
| 10,185,033 | B2 | 1/2019 | Justice |
| 10,191,156 | B2 | 1/2019 | Steinberg |
| 10,197,669 | B2 | 2/2019 | Hall |
| 10,197,676 | B2 | 2/2019 | Slobodyyanyuk |
| 10,197,765 | B2 | 2/2019 | Schulz |
| 10,203,399 | B2 | 2/2019 | Retterath |
| 10,203,401 | B2 | 2/2019 | Sebastian |
| 10,209,349 | B2 | 2/2019 | Dussan |
| 10,209,359 | B2 | 2/2019 | Russell |
| 10,209,709 | B2 | 2/2019 | Peters |
| 10,214,299 | B2 | 2/2019 | Jackowski |
| 10,215,846 | B2 | 2/2019 | Carothers |
| 10,215,847 | B2 | 2/2019 | Scheim |
| 10,215,848 | B2 | 2/2019 | Dussan |
| 10,215,859 | B2 | 2/2019 | Steinberg |
| 10,222,474 | B1 | 3/2019 | Raring |
| 10,222,477 | B2 | 3/2019 | Keilaf |
| 10,223,806 | B1 | 3/2019 | Luo |
| 10,223,807 | B1 | 3/2019 | Luo |
| 10,241,196 | B2 | 3/2019 | Bailey |
| 10,241,198 | B2 | 3/2019 | LaChapelle |
| 10,247,811 | B2 | 4/2019 | Clifton |
| 10,254,402 | B2 | 4/2019 | Lane |
| 10,254,405 | B2 | 4/2019 | Campbell |
| 10,261,006 | B2 | 4/2019 | Ray |
| 10,261,187 | B2 | 4/2019 | Halmos |
| 10,262,234 | B2 | 4/2019 | Li |
| 10,267,898 | B2 | 4/2019 | Campbell |
| 10,267,918 | B2 | 4/2019 | LaChapelle |
| 10,274,377 | B1 | 4/2019 | Rabb |
| 10,274,599 | B2 | 4/2019 | Schmalenberg |
| D849,573 | S | 5/2019 | Haban |
| 10,281,254 | B2 | 5/2019 | Ginsberg |
| 10,281,322 | B2 | 5/2019 | Doyland |
| 10,281,564 | B2 | 5/2019 | Low |
| 10,281,581 | B2 | 5/2019 | Lipson |
| 10,281,582 | B2 | 5/2019 | Elooz |
| 10,288,736 | B2 | 5/2019 | Lipson |
| 10,288,737 | B2 | 5/2019 | Mooney |
| 10,295,656 | B1 | 5/2019 | Li |
| 10,295,660 | B1 | 5/2019 | McMichael |
| 10,295,668 | B2 | 5/2019 | LaChapelle |
| 10,295,670 | B2 | 5/2019 | Stettner |
| 10,295,671 | B2 | 5/2019 | Grazit |
| 10,295,672 | B2 | 5/2019 | Abari |
| 10,295,673 | B1 | 5/2019 | Tucker |
| 10,302,746 | B2 | 5/2019 | O'Keeffe |
| 10,302,749 | B2 | 5/2019 | Droz |
| D850,306 | S | 6/2019 | Bainter |
| 10,310,058 | B1 | 6/2019 | Campbell |
| 10,310,087 | B2 | 6/2019 | Laddha |
| 10,317,529 | B2 | 6/2019 | Shy |
| 10,317,533 | B2 | 6/2019 | Cherepinsky |
| 10,324,170 | B1 | 6/2019 | Enberg |
| 10,324,185 | B2 | 6/2019 | McWhirter |
| 10,330,777 | B2 | 6/2019 | Popovich |
| 10,330,778 | B2 | 6/2019 | Kaneda |
| 10,330,780 | B2 | 6/2019 | Hall |
| 10,331,956 | B2 | 6/2019 | Solar |
| 10,337,996 | B2 | 7/2019 | Blagojevic |
| 10,338,201 | B2 | 7/2019 | Slobodyyanyuk |
| 10,338,202 | B2 | 7/2019 | Mashtare |
| 10,338,220 | B1 | 7/2019 | Raring |
| 10,338,224 | B2 | 7/2019 | Eken |
| 10,338,225 | B2 | 7/2019 | Boehmke |
| 10,340,651 | B1 | 7/2019 | Drummer |
| 10,345,446 | B2 | 7/2019 | Raring |
| 10,345,447 | B1 | 7/2019 | Hicks |
| 10,346,695 | B2 | 7/2019 | Clifford |
| 10,351,103 | B2 | 7/2019 | Yeo |
| 10,353,057 | B2 | 7/2019 | Suzuki |
| 10,353,074 | B2 | 7/2019 | Justice |
| 10,353,075 | B2 | 7/2019 | Buskila |
| 10,359,507 | B2 | 7/2019 | Berger |
| 10,366,282 | B2 | 7/2019 | Lee |
| 10,372,138 | B2 | 8/2019 | Gilliland |
| 10,377,373 | B2 | 8/2019 | Stettner |
| 10,379,135 | B2 | 8/2019 | Maryfield |
| 10,379,205 | B2 | 8/2019 | Dussan |
| 10,379,220 | B1 | 8/2019 | Smits |

(56) References Cited

U.S. PATENT DOCUMENTS

| | | |
|---|---|---|
| 10,379,540 B2 | 8/2019 | Droz |
| 10,386,464 B2 | 8/2019 | Dussan |
| 10,386,465 B2 | 8/2019 | Hall |
| 10,386,467 B2 | 8/2019 | Dussan |
| 10,386,487 B1 | 8/2019 | Wilton |
| 10,386,488 B2 | 8/2019 | Ridderbusch |
| 10,393,863 B2 | 8/2019 | Sun |
| 10,393,877 B2 | 8/2019 | Hall |
| 10,394,345 B2 | 8/2019 | Donnelly |
| 10,401,480 B1 | 9/2019 | Gaalema |
| 10,401,484 B2 | 9/2019 | Lee |
| 10,401,500 B2 | 9/2019 | Yang |
| 10,401,866 B2 | 9/2019 | Rust |
| 10,408,926 B2 | 9/2019 | Slobodyyabnyuk |
| 10,408,936 B2 | 9/2019 | Van Voorst |
| 10,408,939 B1 | 9/2019 | Kim |
| 10,408,940 B2 | 9/2019 | O'Keeffe |
| 10,416,292 B2 | 9/2019 | de Mersseman |
| 10,418,776 B2 | 9/2019 | Welford |
| 10,422,862 B2 | 9/2019 | Gnecchi |
| 10,422,863 B2 | 9/2019 | Choi |
| 10,422,865 B2 | 9/2019 | Irish |
| 10,429,243 B2 | 10/2019 | Yu |
| 10,429,495 B1 | 10/2019 | Wang |
| 10,429,496 B2 | 10/2019 | Weinberg |
| 10,429,507 B2 | 10/2019 | Sebastian |
| 10,429,511 B2 | 10/2019 | Bosetti |
| 10,430,970 B2 | 10/2019 | Bier |
| 10,436,882 B2 | 10/2019 | Meng |
| 10,436,904 B2 | 10/2019 | Moss |
| 10,436,907 B1 | 10/2019 | Murray |
| 10,444,330 B2 | 10/2019 | Stann |
| 10,444,356 B2 | 10/2019 | Wu |
| 10,444,362 B2 | 10/2019 | Schaefer |
| 10,444,367 B2 | 10/2019 | Lodden |
| 10,445,928 B2 | 10/2019 | Nehmadi |
| 10,447,973 B2 | 10/2019 | Droz |
| 10,451,716 B2 | 10/2019 | Hughes |
| 10,451,740 B2 | 10/2019 | Pei |
| 10,451,742 B2 | 10/2019 | Christmas |
| 10,458,904 B2 | 10/2019 | Batholomew |
| 10,466,342 B1 | 11/2019 | Zhu |
| 10,469,753 B2 | 11/2019 | Yang |
| 10,473,763 B2 | 11/2019 | Schwarz |
| 10,473,767 B2 | 11/2019 | Xiang |
| 10,473,768 B2 | 11/2019 | Walsh |
| 10,473,770 B1 | 11/2019 | Zhu |
| 10,473,784 B2 | 11/2019 | Puglia |
| 10,474,160 B2 | 11/2019 | Huang |
| 10,474,161 B2 | 11/2019 | Huang |
| 10,481,267 B2 | 11/2019 | Wang |
| 10,481,268 B2 | 11/2019 | Vlaiko |
| 10,482,740 B2 | 11/2019 | Fang |
| 10,488,495 B2 | 11/2019 | Sebastian |
| 10,488,496 B2 | 11/2019 | Campbell |
| 10,488,497 B2 | 11/2019 | Cheong |
| 10,491,052 B2 | 11/2019 | Lenius |
| 10,491,855 B2 | 11/2019 | Gates |
| 10,495,757 B2 | 12/2019 | Dussan |
| 10,502,813 B2 | 12/2019 | Schultz |
| 10,503,174 B1 | 12/2019 | Lim |
| 10,503,175 B2 | 12/2019 | Agarwal |
| 10,509,111 B2 | 12/2019 | Park |
| 10,509,112 B1 | 12/2019 | Pan |
| 10,509,120 B2 | 12/2019 | Bilik |
| 10,509,198 B1 | 12/2019 | Zhou |
| 10,514,444 B2 | 12/2019 | Donovan |
| 10,514,447 B2 | 12/2019 | Schwarz |
| 10,520,591 B2 | 12/2019 | Kotelnikov |
| 10,520,592 B2 | 12/2019 | Droz |
| 10,520,602 B2 | 12/2019 | Villeneuve |
| 10,523,880 B2 | 12/2019 | Gassend |
| 10,527,726 B2 | 1/2020 | Bartlett |
| 10,531,004 B2 | 1/2020 | Wheeler |
| 10,534,074 B2 | 1/2020 | Slobodyyanyuk |
| 10,534,079 B2 | 1/2020 | Kim |
| 10,539,116 B2 | 1/2020 | Davoust |
| 10,539,661 B2 | 1/2020 | Hall |
| 10,539,663 B2 | 1/2020 | Liu |
| 10,545,222 B2 | 1/2020 | Hall |
| 10,545,238 B1 | 1/2020 | Rezk |
| 10,545,240 B2 | 1/2020 | Campbell |
| 10,545,289 B1 | 1/2020 | Chriqui |
| 10,551,501 B1 | 2/2020 | LaChapelle |
| 10,552,691 B2 | 2/2020 | Li |
| 10,556,585 B1 | 2/2020 | Berger |
| 10,557,923 B2 | 2/2020 | Watnik |
| 10,557,924 B1 | 2/2020 | Jang |
| 10,557,926 B2 | 2/2020 | Gilliland |
| 10,557,927 B2 | 2/2020 | Marron |
| 10,557,929 B2 | 2/2020 | Kajiyama |
| 10,557,939 B2 | 2/2020 | Campbell |
| 10,557,940 B2 | 2/2020 | Eichenholz |
| 10,557,942 B2 | 2/2020 | Belsey |
| 10,564,261 B2 | 2/2020 | Huebner |
| 10,564,263 B2 | 2/2020 | Efimov |
| 10,564,266 B2 | 2/2020 | O'Keeffe |
| 10,564,285 B2 | 2/2020 | Belsley |
| 10,565,457 B2 | 2/2020 | Luo |
| 10,571,552 B1 | 2/2020 | Gao |
| 10,571,567 B2 | 2/2020 | Campbell |
| 10,571,570 B1 | 2/2020 | Paulsen |
| 10,571,574 B1 | 2/2020 | Yavid |
| 10,571,683 B2 | 2/2020 | Low |
| 10,576,011 B1 | 3/2020 | Krishnan |
| 10,578,717 B2 | 3/2020 | Bucina |
| 10,578,719 B2 | 3/2020 | O'Keeffe |
| 10,578,720 B2 | 3/2020 | Hughes |
| 10,578,721 B2 | 3/2020 | Jang |
| 10,578,724 B2 | 3/2020 | Droz |
| 10,578,742 B2 | 3/2020 | Guo |
| 10,585,174 B2 | 3/2020 | Gnecchi |
| 10,585,175 B2 | 3/2020 | Reterath |
| 10,591,598 B2 | 3/2020 | Jeong |
| 10,591,599 B2 | 3/2020 | O'keeffe |
| 10,591,600 B2 | 3/2020 | Villeneuve |
| 10,591,601 B2 | 3/2020 | Hicks |
| 10,591,604 B2 | 3/2020 | Xu |
| 10,591,740 B2 | 3/2020 | McMichael |
| 10,598,769 B2 | 3/2020 | Rodrigo |
| 10,598,770 B2 | 3/2020 | Singer |
| 10,598,788 B1 | 3/2020 | Dussan |
| 10,598,791 B2 | 3/2020 | Jain |
| 10,598,922 B2 | 3/2020 | Low |
| 10,600,930 B2 | 3/2020 | Suzuki |
| 10,605,899 B2 | 3/2020 | Singer |
| 10,605,900 B2 | 3/2020 | Spuler |
| 10,605,918 B2 | 3/2020 | Wong |
| 10,605,924 B2 | 3/2020 | Slutsky |
| RE47,942 E | 4/2020 | Hall |
| D882,430 S | 4/2020 | Haban |
| 10,613,200 B2 | 4/2020 | Hallstig |
| 10,613,201 B2 | 4/2020 | Pacala |
| 10,613,204 B2 | 4/2020 | Warke |
| 10,613,224 B2 | 4/2020 | Jeong |
| 10,620,301 B2 | 4/2020 | Wilton |
| 10,620,302 B2 | 4/2020 | Zhu |
| 10,620,315 B2 | 4/2020 | Zellinger |
| 10,620,317 B1 | 4/2020 | Chai |
| 10,620,318 B2 | 4/2020 | Yi |
| 10,627,490 B2 | 4/2020 | Hall |
| 10,627,491 B2 | 4/2020 | Hall |
| 10,627,492 B2 | 4/2020 | Shand |
| 10,627,495 B2 | 4/2020 | Gaalema |
| 10,627,512 B1 | 4/2020 | Hicks |
| 10,627,516 B2 | 4/2020 | Eichenholz |
| 10,629,072 B2 | 4/2020 | Felix |
| 10,630,913 B2 | 4/2020 | Wei |
| 10,634,772 B2 | 4/2020 | Eckstein |
| 10,634,793 B1 | 4/2020 | Siao |
| 10,641,870 B1 | 5/2020 | Magnani |
| 10,641,872 B2 | 5/2020 | Dussan |
| 10,641,873 B2 | 5/2020 | Dussan |
| 10,641,874 B2 | 5/2020 | Campbell |

(56) References Cited

U.S. PATENT DOCUMENTS

| | | |
|---|---|---|
| 10,641,876 B2 | 5/2020 | Field |
| 10,641,877 B2 | 5/2020 | Lombrozo |
| 10,641,878 B2 | 5/2020 | Yeo |
| 10,641,897 B1 | 5/2020 | Dussan |
| 10,641,900 B2 | 5/2020 | Dussan |
| 10,642,029 B2 | 5/2020 | Dussan |
| 10,649,072 B2 | 5/2020 | Bozchalooi |
| 10,649,086 B2 | 5/2020 | Raring |
| 10,650,531 B2 | 5/2020 | Lakshmi Narayanan |
| 10,656,252 B1 | 5/2020 | Dussan |
| 10,656,272 B1 | 5/2020 | Dussan |
| 10,656,277 B1 | 5/2020 | Dussan |
| 10,663,584 B2 | 5/2020 | Sakai |
| 10,663,587 B1 | 5/2020 | Sandborn |
| 10,663,590 B2 | 5/2020 | Rzeszutek |
| 10,663,596 B2 | 5/2020 | Dussan |
| RE48,042 E | 6/2020 | Pennecot |
| 10,670,460 B1 | 6/2020 | Waterbury |
| 10,670,702 B2 | 6/2020 | Choi |
| 10,670,718 B1 | 6/2020 | Dussan |
| 10,670,721 B2 | 6/2020 | Efimov |
| 10,670,724 B2 | 6/2020 | Moon |
| 10,677,897 B2 | 6/2020 | LaChapelle |
| 10,677,925 B2 | 6/2020 | Boehmke |
| 10,684,359 B2 | 6/2020 | Axelsson |
| 10,684,360 B2 | 6/2020 | Campbell |
| 10,690,754 B2 | 6/2020 | Pei |
| 10,690,756 B2 | 6/2020 | Warke |
| 10,690,772 B2 | 6/2020 | Van Voorst |
| 10,697,582 B2 | 6/2020 | Campbell |
| 10,698,088 B2 | 6/2020 | Droz |
| 10,698,114 B2 | 6/2020 | Keilaf |
| 10,705,189 B2 | 7/2020 | Qiu |
| 10,705,190 B2 | 7/2020 | Jang |
| 10,712,433 B2 | 7/2020 | Carothers |
| 10,712,434 B2 | 7/2020 | Hall |
| 10,714,889 B2 | 7/2020 | Hong |
| 10,725,156 B2 | 7/2020 | Halmos |
| 10,725,177 B2 | 7/2020 | Smits |
| 10,726,567 B2 | 7/2020 | Lee |
| 10,726,579 B1 | 7/2020 | Huang |
| 10,732,264 B2 | 8/2020 | Bailey |
| 10,732,266 B2 | 8/2020 | Popovich |
| 10,732,279 B2 | 8/2020 | Schlotterbeck |
| 10,732,281 B2 | 8/2020 | LaChapelle |
| 10,732,283 B2 | 8/2020 | Gilliland |
| 10,732,287 B2 | 8/2020 | Korsgaard Jensen et al. |
| 10,739,440 B2 | 8/2020 | Shimizu |
| 10,739,441 B2 | 8/2020 | Nabbe |
| 10,739,444 B2 | 8/2020 | Hall |
| 10,739,459 B2 | 8/2020 | Castorena Martinez |
| 10,739,461 B2 | 8/2020 | Agarwal |
| 10,746,858 B2 | 8/2020 | Bradley |
| 10,754,009 B2 | 8/2020 | Sung |
| 10,754,012 B2 | 8/2020 | Galloway |
| 10,754,015 B2 | 8/2020 | Dussan |
| 10,754,033 B2 | 8/2020 | Shand |
| 10,754,034 B1 | 8/2020 | Chamberlain |
| 10,761,191 B2 | 9/2020 | Qiu |
| 10,761,195 B2 | 9/2020 | Donovan |
| 10,761,196 B2 | 9/2020 | Dussan |
| 10,762,673 B2 | 9/2020 | Luo |
| 10,763,290 B2 | 9/2020 | Akselrod |
| 10,768,282 B2 | 9/2020 | Crouch |
| 10,768,303 B2 | 9/2020 | Xiong |
| 10,775,484 B2 | 9/2020 | Jeong |
| 10,775,485 B2 | 9/2020 | Shim |
| 10,775,488 B2 | 9/2020 | Bradley |
| 10,775,507 B2 | 9/2020 | Mandai |
| 10,782,393 B2 | 9/2020 | Dussan |
| 10,782,399 B2 | 9/2020 | Lee |
| 10,782,409 B2 | 9/2020 | Wang |
| 10,788,574 B2 | 9/2020 | Shim |
| 10,791,884 B2 | 10/2020 | Starkey |
| 10,794,998 B2 | 10/2020 | Spuler |
| 10,795,000 B2 | 10/2020 | Singer |
| 10,796,457 B2 | 10/2020 | Beek |
| 10,802,119 B2 | 10/2020 | Yoon |
| 10,802,120 B1 | 10/2020 | LaChapelle |
| 10,802,122 B1 | 10/2020 | Goldberg |
| 10,802,149 B2 | 10/2020 | Stettner |
| 10,809,361 B2 | 10/2020 | Vallespi-Gonzalez |
| 10,809,362 B2 | 10/2020 | Fredericksen |
| 10,809,380 B2 | 10/2020 | Pacala |
| 10,816,647 B2 | 10/2020 | Xiang |
| 10,816,648 B2 | 10/2020 | Pennecot |
| 10,816,649 B1 | 10/2020 | Keyser |
| 10,818,091 B2 | 10/2020 | Evans |
| 10,819,082 B2 | 10/2020 | Josset |
| 10,821,942 B2 | 11/2020 | Green |
| 10,823,855 B2 | 11/2020 | Li |
| 10,830,877 B1 | 11/2020 | Chawla |
| 10,830,878 B2 | 11/2020 | McMichael |
| 10,830,880 B2 | 11/2020 | Subasingha |
| 10,830,890 B1 | 11/2020 | Keyser |
| 10,837,773 B2 | 11/2020 | Yang |
| 10,838,042 B2 | 11/2020 | Badoni |
| 10,838,045 B2 | 11/2020 | Crouch |
| 10,838,046 B2 | 11/2020 | Qui |
| 10,838,047 B2 | 11/2020 | Chong |
| 10,838,048 B2 | 11/2020 | Field |
| 10,838,049 B1 | 11/2020 | Schwiesow |
| 10,838,062 B2 | 11/2020 | de Mersseman |
| 10,841,496 B2 | 11/2020 | Wheeler |
| 10,844,838 B2 | 11/2020 | Schlipf |
| 10,845,464 B2 | 11/2020 | Schwarz |
| 10,845,466 B2 | 11/2020 | Pei |
| 10,845,468 B2 | 11/2020 | Marron |
| 10,845,470 B2 | 11/2020 | Verghese |
| 10,845,480 B1 | 11/2020 | Shah |
| 10,845,482 B2 | 11/2020 | Frederiksen |
| 10,845,587 B2 | 11/2020 | Low |
| 10,852,397 B2 | 12/2020 | Schwarz |
| 10,852,398 B2 | 12/2020 | Yu |
| 10,852,426 B2 | 12/2020 | Shan |
| 10,852,433 B2 | 12/2020 | Chen |
| 10,852,437 B2 | 12/2020 | Eken |
| 10,852,438 B2 | 12/2020 | Hartman |
| 10,859,683 B2 | 12/2020 | Lin |
| 10,859,684 B1 | 12/2020 | Nabatchian |
| 10,866,312 B2 | 12/2020 | Crouch |
| 10,866,319 B2 | 12/2020 | Brinkmeyer |
| 10,871,554 B1 | 12/2020 | Keyser |
| 10,871,779 B2 | 12/2020 | Templeton |
| 10,872,269 B2 | 12/2020 | Roy Chowdhury |
| 10,877,131 B2 | 12/2020 | Singer |
| 10,877,134 B2 | 12/2020 | Han |
| 10,877,154 B2 | 12/2020 | Bronstein |
| 10,878,282 B2 | 12/2020 | Mei |
| 10,878,580 B2 | 12/2020 | Mei |
| 10,879,415 B2 | 12/2020 | Kwon |
| 10,884,126 B2 | 1/2021 | Shu |
| 10,884,129 B2 | 1/2021 | Wu |
| 10,884,130 B1 | 1/2021 | Viswanatha |
| 10,884,131 B1 | 1/2021 | Allais |
| 10,884,411 B1 | 1/2021 | Allais |
| 10,890,650 B2 | 1/2021 | Droz |
| 10,891,744 B1 | 1/2021 | Wyffels |
| 10,897,575 B2 | 1/2021 | Wheeler |
| 10,901,074 B1 | 1/2021 | Pan |
| 10,901,089 B2 | 1/2021 | Zhang |
| 10,901,292 B2 | 1/2021 | Jeong |
| D909,216 S | 2/2021 | Vuletici |
| 10,908,080 B2 | 2/2021 | Salazar |
| 10,908,262 B2 | 2/2021 | Dussan |
| 10,908,264 B2 | 2/2021 | O'Keeffe |
| 10,908,265 B2 | 2/2021 | Dussan |
| 10,908,267 B1 | 2/2021 | Gagne |
| 10,908,268 B2 | 2/2021 | Zhou |
| 10,908,282 B2 | 2/2021 | Meyers |
| 10,908,287 B2 | 2/2021 | Warke |
| 10,908,372 B2 | 2/2021 | Moebius |
| 10,908,409 B2 | 2/2021 | Zhou |
| 10,914,821 B2 | 2/2021 | Patterson |

(56) References Cited

U.S. PATENT DOCUMENTS

| | | |
|---|---|---|
| 10,914,822 B2 | 2/2021 | Kremer |
| 10,914,824 B2 | 2/2021 | Meng |
| 10,914,825 B2 | 2/2021 | Coda |
| 10,914,839 B2 | 2/2021 | Hartmann |
| 10,914,841 B2 | 2/2021 | Crouch |
| 10,921,431 B2 | 2/2021 | Pei |
| 10,921,450 B2 | 2/2021 | Dussan |
| 10,921,452 B2 | 2/2021 | Crouch |
| 10,921,453 B2 | 2/2021 | Dumais |
| 10,922,880 B2 | 2/2021 | Scanlon |
| 10,928,485 B1 | 2/2021 | Karadeniz |
| 10,928,486 B2 | 2/2021 | Donovan |
| 10,928,487 B2 | 2/2021 | O'Keeffe |
| 10,928,488 B2 | 2/2021 | Sun |
| 10,928,490 B2 | 2/2021 | Tatipamula |
| 10,928,519 B2 | 2/2021 | Schaffner |
| 10,929,694 B1 | 2/2021 | Zhang |
| RE48,490 E | 3/2021 | Hall |
| RE48,491 E | 3/2021 | Hall |
| 10,935,637 B2 | 3/2021 | Cullumber |
| 10,935,640 B2 | 3/2021 | Jackson |
| 10,935,658 B2 | 3/2021 | Park |
| 10,935,659 B2 | 3/2021 | Smits |
| 10,939,057 B2 | 3/2021 | Gassend |
| 10,942,257 B2 | 3/2021 | Bao |
| 10,942,260 B2 | 3/2021 | Low |
| 10,942,272 B2 | 3/2021 | Droz |
| 10,942,277 B1 | 3/2021 | Angus |
| 10,948,598 B1 | 3/2021 | Prabhakar |
| 10,951,864 B2 | 3/2021 | Droz |
| 10,955,530 B2 | 3/2021 | Pei |
| 10,955,532 B2 | 3/2021 | Gilliland |
| 10,955,533 B2 | 3/2021 | Konrad |
| 10,955,534 B2 | 3/2021 | Halmos |
| 10,955,545 B1 | 3/2021 | Hunt |
| 10,955,952 B2 | 3/2021 | Gwon |
| 10,962,644 B1 | 3/2021 | Kong |
| 10,962,647 B2 | 3/2021 | Shin |
| 10,965,379 B2 | 3/2021 | Brown |
| RE48,503 E | 4/2021 | Hall |
| RE48,504 E | 4/2021 | Hall |
| 10,969,474 B2 | 4/2021 | O'keeffe |
| 10,969,475 B2 | 4/2021 | Li |
| 10,969,489 B2 | 4/2021 | Schmitt |
| 10,969,491 B1 | 4/2021 | Krause Perin |
| 10,976,413 B2 | 4/2021 | Han |
| 10,976,414 B2 | 4/2021 | Sayyah |
| 10,976,417 B2 | 4/2021 | LaChapelle |
| 10,979,644 B2 | 4/2021 | Jamjoom |
| 10,983,197 B1 | 4/2021 | Zhu |
| 10,983,201 B2 | 4/2021 | Pimentel |
| 10,983,213 B2 | 4/2021 | Eichenholz |
| 10,983,215 B2 | 4/2021 | Li |
| 10,983,218 B2 | 4/2021 | Hall |
| 10,983,219 B2 | 4/2021 | Kotov |
| 10,984,540 B2 | 4/2021 | Mei |
| 10,989,796 B2 | 4/2021 | Liu |
| 10,989,914 B2 | 4/2021 | Ramsey |
| 10,996,322 B2 | 5/2021 | Buettner |
| 10,996,334 B2 | 5/2021 | Datta |
| 10,999,511 B2 | 5/2021 | Yang |
| 11,002,832 B2 | 5/2021 | Sayyah |
| 11,002,834 B2 | 5/2021 | Kaestner |
| 11,002,837 B2 | 5/2021 | Barber |
| 11,002,839 B2 | 5/2021 | Shi |
| 11,002,852 B2 | 5/2021 | Cao |
| 11,002,853 B2 | 5/2021 | McWhirter |
| 11,002,857 B2 | 5/2021 | Dussan |
| 11,003,137 B2 | 5/2021 | Christmas |
| 11,009,592 B2 | 5/2021 | Wilton |
| 11,009,605 B2 | 5/2021 | Li |
| 11,016,178 B2 | 5/2021 | Donovan |
| 11,016,181 B2 | 5/2021 | Schwarz |
| 11,016,183 B2 | 5/2021 | Gill |
| 11,016,195 B2 | 5/2021 | Margallo Balbas |
| 11,016,197 B1 | 5/2021 | Barber |
| 11,016,496 B2 | 5/2021 | Chen |
| 11,022,682 B2 | 6/2021 | Konrad |
| 11,022,688 B2 | 6/2021 | Eichenholz |
| 11,022,689 B2 | 6/2021 | Villeneuve |
| 11,022,691 B2 | 6/2021 | Frederiksen |
| 11,022,693 B1 | 6/2021 | Allais |
| 11,024,669 B2 | 6/2021 | Rezk |
| 11,027,726 B2 | 6/2021 | Stettner |
| 11,029,393 B2 | 6/2021 | Li |
| 11,029,394 B2 | 6/2021 | Li |
| 11,029,395 B1 | 6/2021 | Barber |
| 11,029,398 B2 | 6/2021 | Hwang |
| 11,029,406 B2 | 6/2021 | LaChapelle |
| 11,035,933 B2 | 6/2021 | Demir |
| 11,035,957 B2 | 6/2021 | Shotan |
| 11,041,942 B2 | 6/2021 | Ruchatz |
| 11,041,944 B2 | 6/2021 | Zhu |
| 11,041,954 B2 | 6/2021 | Crouch |
| 11,041,956 B2 | 6/2021 | Harris |
| 11,041,957 B2 | 6/2021 | Uehara |
| 11,043,005 B2 | 6/2021 | Wallin |
| 11,047,958 B1 | 6/2021 | Choiniere |
| 11,047,963 B1 | 6/2021 | Viswanatha |
| 11,047,983 B1 | 6/2021 | Prabhakar |
| 11,054,505 B2 | 7/2021 | Droz |
| 11,054,508 B2 | 7/2021 | Li |
| 11,054,523 B1 | 7/2021 | Buchter |
| 11,054,524 B2 | 7/2021 | Rezk |
| 11,061,116 B2 | 7/2021 | Gao |
| 11,061,140 B2 | 7/2021 | Hosseini |
| 11,063,408 B2 | 7/2021 | Jang |
| 11,067,670 B2 | 7/2021 | Patterson |
| 11,067,671 B2 | 7/2021 | Chong |
| 11,067,673 B2 | 7/2021 | Wei |
| 11,067,676 B2 | 7/2021 | Yang |
| 11,067,693 B2 | 7/2021 | Walls |
| 11,119,218 B2 | 9/2021 | Patterson |
| 11,150,349 B2 | 10/2021 | Chen |
| 2002/0140294 A1 | 10/2002 | Iwata |
| 2002/0140924 A1 | 10/2002 | Wangler |
| 2005/0173770 A1 | 8/2005 | Linden et al. |
| 2007/0035624 A1 | 2/2007 | Lubard |
| 2008/0063239 A1* | 3/2008 | Macneille ............ G06V 10/145 382/104 |
| 2009/0273770 A1 | 11/2009 | Bauhahn |
| 2010/0053715 A1 | 3/2010 | O'Neill |
| 2010/0204974 A1 | 8/2010 | Israelsen |
| 2012/0170024 A1 | 7/2012 | Azzazy |
| 2012/0170029 A1 | 7/2012 | Azzazy |
| 2012/0236379 A1 | 9/2012 | da Silva |
| 2013/0120734 A1 | 5/2013 | Ogata |
| 2013/0242283 A1 | 9/2013 | Bailey |
| 2014/0168634 A1* | 6/2014 | Kameyama ............ G01S 17/933 356/601 |
| 2015/0192677 A1 | 7/2015 | Yu |
| 2015/0301180 A1 | 10/2015 | Stettner |
| 2015/0329111 A1 | 11/2015 | Prokhorov |
| 2016/0162743 A1 | 6/2016 | Chundrlik |
| 2017/0328990 A1 | 11/2017 | Magee |
| 2020/0101890 A1 | 4/2020 | Solar |

FOREIGN PATENT DOCUMENTS

| | | |
|---|---|---|
| CN | 2681085 Y | 2/2006 |
| CN | 2773714 Y | 4/2006 |
| CN | 103278808 B | 12/2015 |
| CN | 104299244 B | 7/2017 |
| CN | 206773192 U | 12/2017 |
| CN | 106443699 B | 2/2019 |
| CN | 106597471 B | 5/2019 |
| CN | 208902906 U | 5/2019 |
| CN | 109997057 B | 7/2020 |
| DE | 930909 C | 7/1955 |
| DE | 3134815 A1 | 3/1983 |
| DE | 3216312 A1 | 11/1983 |
| DE | 3216313 A1 | 11/1983 |
| DE | 3701340 A1 | 7/1988 |
| DE | 3741259 A1 | 6/1989 |

(56) References Cited

FOREIGN PATENT DOCUMENTS

| | | |
|---|---|---|
| DE | 3808972 A1 | 10/1989 |
| DE | 3821892 C1 | 2/1990 |
| DE | 4040894 C1 | 4/1992 |
| DE | 4115747 A1 | 11/1992 |
| DE | 4124192 A1 | 1/1993 |
| DE | 4127168 A1 | 2/1993 |
| DE | 4137550 A1 | 3/1993 |
| DE | 4215272 A1 | 11/1993 |
| DE | 4243631 A1 | 6/1994 |
| DE | 4340756 A1 | 6/1994 |
| DE | 4411448 A1 | 10/1995 |
| DE | 4412044 A1 | 10/1995 |
| DE | 19512644 A1 | 10/1996 |
| DE | 19512681 A1 | 10/1996 |
| DE | 4345446 C2 | 7/1998 |
| DE | 4345448 C2 | 7/1998 |
| DE | 19727792 A1 | 2/1999 |
| DE | 19741730 A1 | 4/1999 |
| DE | 19741731 A1 | 4/1999 |
| DE | 19752145 A1 | 5/1999 |
| DE | 19717399 A1 | 6/1999 |
| DE | 19757847 A1 | 7/1999 |
| DE | 19757848 A1 | 7/1999 |
| DE | 19757849 A1 | 7/1999 |
| DE | 19757840 C1 | 9/1999 |
| DE | 19815149 A1 | 10/1999 |
| DE | 19828000 A1 | 1/2000 |
| DE | 19902903 C1 | 5/2000 |
| DE | 19911375 A1 | 9/2000 |
| DE | 19919925 A1 | 11/2000 |
| DE | 19927501 A1 | 11/2000 |
| DE | 19936440 A1 | 3/2001 |
| DE | 19953006 A1 | 5/2001 |
| DE | 19953007 A1 | 5/2001 |
| DE | 19953009 A1 | 5/2001 |
| DE | 19953010 A1 | 5/2001 |
| DE | 10025511 C1 | 12/2001 |
| DE | 10110420 A1 | 9/2002 |
| DE | 10114362 A1 | 10/2002 |
| DE | 10127417 A1 | 12/2002 |
| DE | 10128954 A1 | 12/2002 |
| DE | 10141055 A1 | 3/2003 |
| DE | 10143060 A1 | 3/2003 |
| DE | 10146692 A1 | 4/2003 |
| DE | 10148070 A1 | 4/2003 |
| DE | 10151983 A1 | 4/2003 |
| DE | 10162668 A1 | 7/2003 |
| DE | 10217295 A1 | 11/2003 |
| DE | 10222797 A1 | 12/2003 |
| DE | 10229408 A1 | 1/2004 |
| DE | 10244638 A1 | 4/2004 |
| DE | 10244640 A1 | 4/2004 |
| DE | 10244643 A1 | 4/2004 |
| DE | 10258794 A1 | 6/2004 |
| DE | 10303015 A1 | 8/2004 |
| DE | 10331529 A1 | 1/2005 |
| DE | 10341548 A1 | 3/2005 |
| DE | 102004010197 A1 | 9/2005 |
| DE | 102004014041 A1 | 10/2005 |
| DE | 102005050824 A1 | 5/2006 |
| DE | 102005003827 A1 | 7/2006 |
| DE | 102005019233 A1 | 11/2006 |
| DE | 102007013023 A1 | 9/2008 |
| DE | 102007044536 A1 | 3/2009 |
| DE | 202015009250 U1 | 1/2017 |
| EP | 0185816 A1 | 7/1986 |
| EP | 0361188 A2 | 4/1990 |
| EP | 0396865 A2 | 11/1990 |
| EP | 0412395 A1 | 2/1991 |
| EP | 0412398 A1 | 2/1991 |
| EP | 0412399 A1 | 2/1991 |
| EP | 0412400 A1 | 2/1991 |
| EP | 0468175 A2 | 1/1992 |
| EP | 0486430 A2 | 5/1992 |
| EP | 0653720 A2 | 5/1995 |
| EP | 0656868 A1 | 6/1995 |
| EP | 0897120 A2 | 2/1999 |
| EP | 0913707 A1 | 5/1999 |
| EP | 0937996 A2 | 8/1999 |
| EP | 0967492 A1 | 12/1999 |
| EP | 1046938 A2 | 10/2000 |
| EP | 1055937 A2 | 11/2000 |
| EP | 1148345 A1 | 10/2001 |
| EP | 1160718 A2 | 12/2001 |
| EP | 1174733 A2 | 1/2002 |
| EP | 1267177 A1 | 12/2002 |
| EP | 1267178 A1 | 12/2002 |
| EP | 1286178 A2 | 2/2003 |
| EP | 1286181 A1 | 2/2003 |
| EP | 1288677 A2 | 3/2003 |
| EP | 1291673 A2 | 3/2003 |
| EP | 1291674 A2 | 3/2003 |
| EP | 1298012 A2 | 4/2003 |
| EP | 1298454 A2 | 4/2003 |
| EP | 1298543 A2 | 4/2003 |
| EP | 1300715 A2 | 4/2003 |
| EP | 1302784 A2 | 4/2003 |
| EP | 1304583 A2 | 4/2003 |
| EP | 1306690 A2 | 5/2003 |
| EP | 1308747 A2 | 5/2003 |
| EP | 1355128 A1 | 10/2003 |
| EP | 1403657 A1 | 3/2004 |
| EP | 1408318 A1 | 4/2004 |
| EP | 1418444 A1 | 5/2004 |
| EP | 1460454 A2 | 9/2004 |
| EP | 1475764 A2 | 11/2004 |
| EP | 1515157 A1 | 3/2005 |
| EP | 1531342 A1 | 5/2005 |
| EP | 1531343 A1 | 5/2005 |
| EP | 1548351 A2 | 6/2005 |
| EP | 1557691 A1 | 7/2005 |
| EP | 1557693 A1 | 7/2005 |
| EP | 1557694 A1 | 7/2005 |
| EP | 1557992 A1 | 7/2005 |
| EP | 1700763 A2 | 9/2006 |
| EP | 1914564 A1 | 4/2008 |
| EP | 1927867 A1 | 6/2008 |
| EP | 1939652 A1 | 7/2008 |
| EP | 1947377 A1 | 7/2008 |
| EP | 1965225 | 9/2008 |
| EP | 1983354 A1 | 10/2008 |
| EP | 2003471 A1 | 12/2008 |
| EP | 2177931 A2 | 4/2010 |
| EP | 2503360 A1 | 9/2012 |
| EP | 2631667 | 8/2013 |
| EP | 2994772 | 3/2016 |
| EP | 3029488 | 6/2016 |
| EP | 2122599 B1 | 11/2019 |
| EP | 3671261 A1 | 6/2020 |
| GB | 2041687 A | 9/1980 |
| GB | 2251150 A | 6/1992 |
| GB | 2463815 | 3/2010 |
| JP | H36407 | 1/1991 |
| JP | H05240940 A | 9/1993 |
| JP | H6288725 | 10/1994 |
| JP | H09113262 A * | 5/1997 ............ G02B 26/00 |
| JP | 2011264871 | 9/1999 |
| JP | 2001216592 | 8/2001 |
| JP | 20012656576 | 9/2001 |
| JP | 2002031528 A | 1/2002 |
| JP | 2003336447 A | 11/2003 |
| JP | 2004348575 A | 12/2004 |
| JP | 2005070840 A | 3/2005 |
| JP | 2005297863 A | 10/2005 |
| JP | 2006177843 A | 7/2006 |
| JP | 2009086787 A | 4/2009 |
| JP | 6039704 B2 | 12/2016 |
| JP | 2017162204 A | 9/2017 |
| JP | 2020521955 A | 7/2020 |
| RU | 2480712 | 4/2013 |
| WO | WO1999/003080 A1 | 1/1999 |
| WO | WO2000/025089 A1 | 5/2000 |
| WO | WO01/31608 A1 | 5/2001 |
| WO | WO03/019234 A1 | 3/2003 |

(56) References Cited

FOREIGN PATENT DOCUMENTS

| | | |
|---|---|---|
| WO | WO03/040755 A2 | 5/2003 |
| WO | WO2004/019293 A2 | 3/2004 |
| WO | WO2004/036245 A2 | 4/2004 |
| WO | WO2008008970 A2 | 1/2008 |
| WO | WO2009/120706 A2 | 10/2009 |
| WO | WO2010141631 A1 | 12/2010 |
| WO | WO2015/079300 A1 | 6/2015 |
| WO | WO2015/104572 A1 | 7/2015 |
| WO | WO2016/162568 A1 | 10/2016 |
| WO | WO2017/033419 A1 | 3/2017 |
| WO | WO2017/089063 A1 | 6/2017 |
| WO | WO2017/132703 A1 | 8/2017 |
| WO | WO2017/164989 A1 | 9/2017 |
| WO | WO2017/165316 A1 | 9/2017 |
| WO | WO2017/193269 A1 | 11/2017 |
| WO | WO2018/125823 A1 | 7/2018 |
| WO | WO2018/196001 A1 | 11/2018 |

\* cited by examiner

FIG. 3A
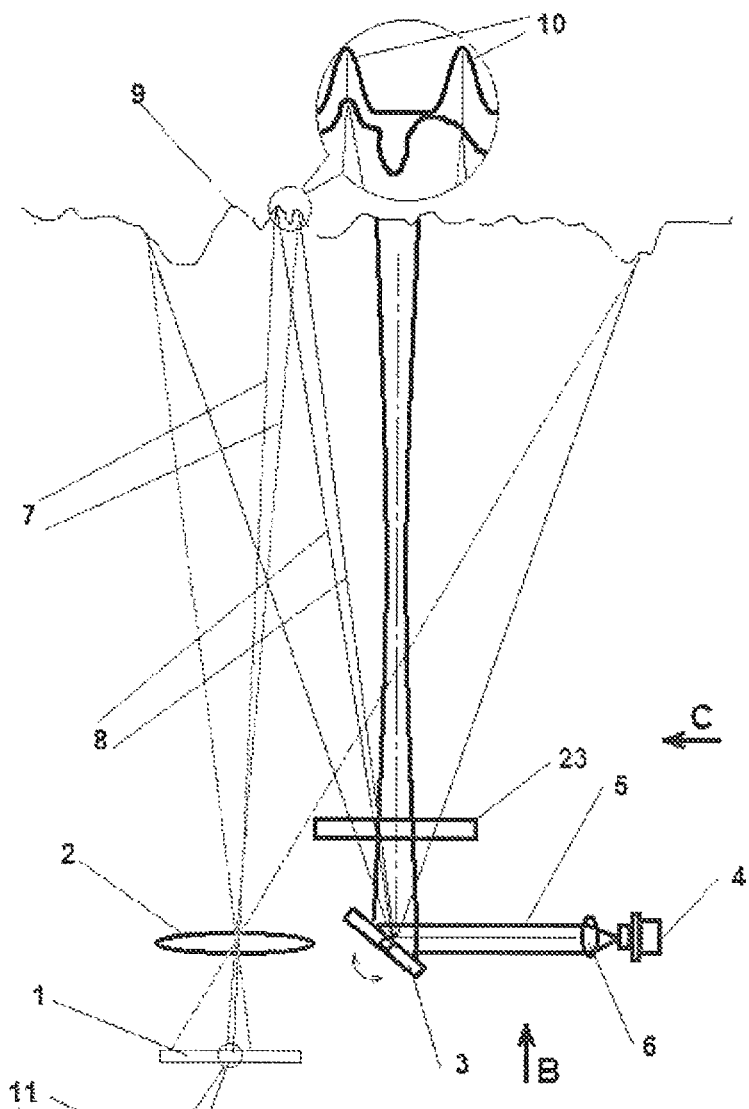
FIG. 3C
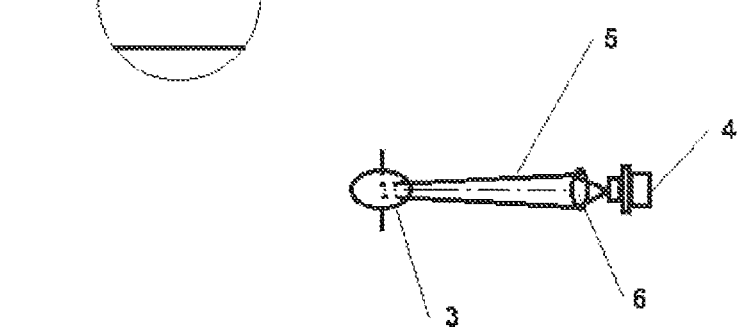
FIG. 3B

(Polar Coordinate System)

(Image of the Laser Spot)

(Raster Pattern in φ-θ Coordinate Space)

(Scanner FOV)

(Laser FOV and Scanner FOV)

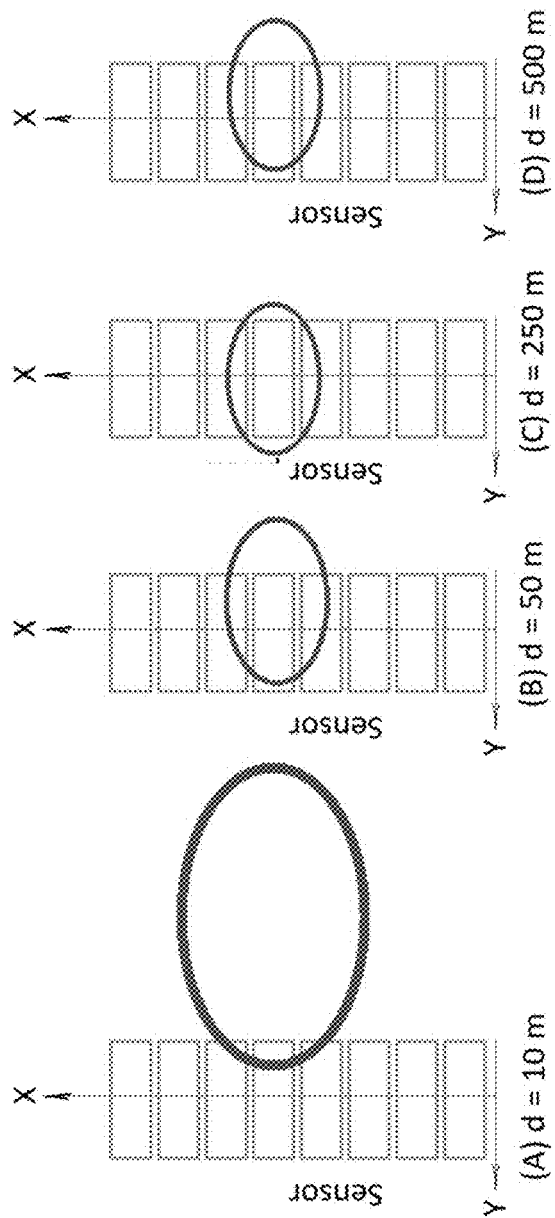

FIG. 11Aiii

FIG. 11Biii

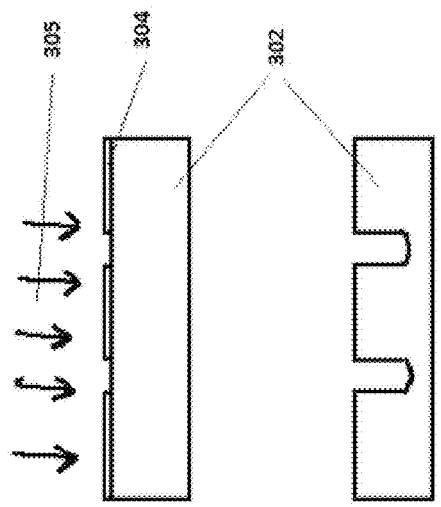
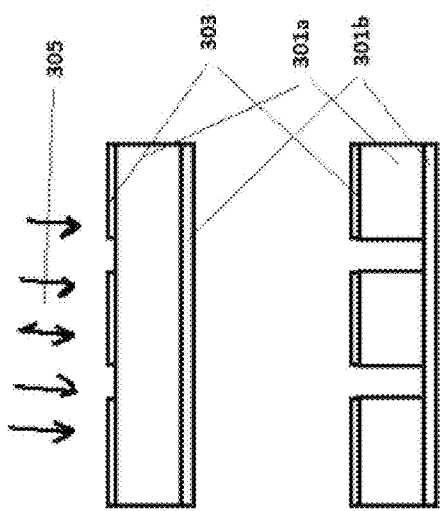
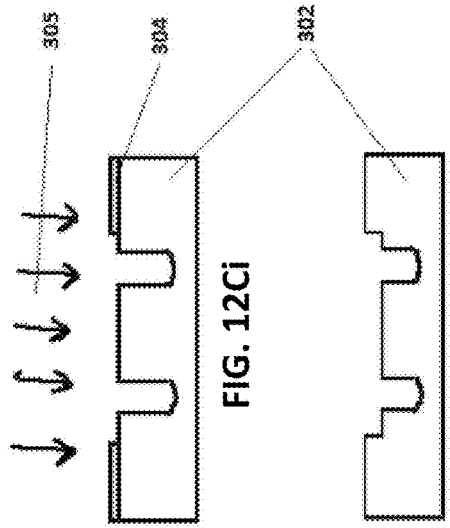

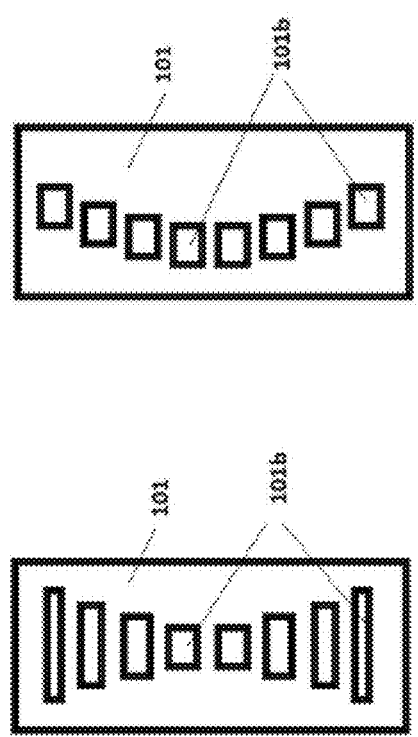
FIG. 14A
FIG. 14B
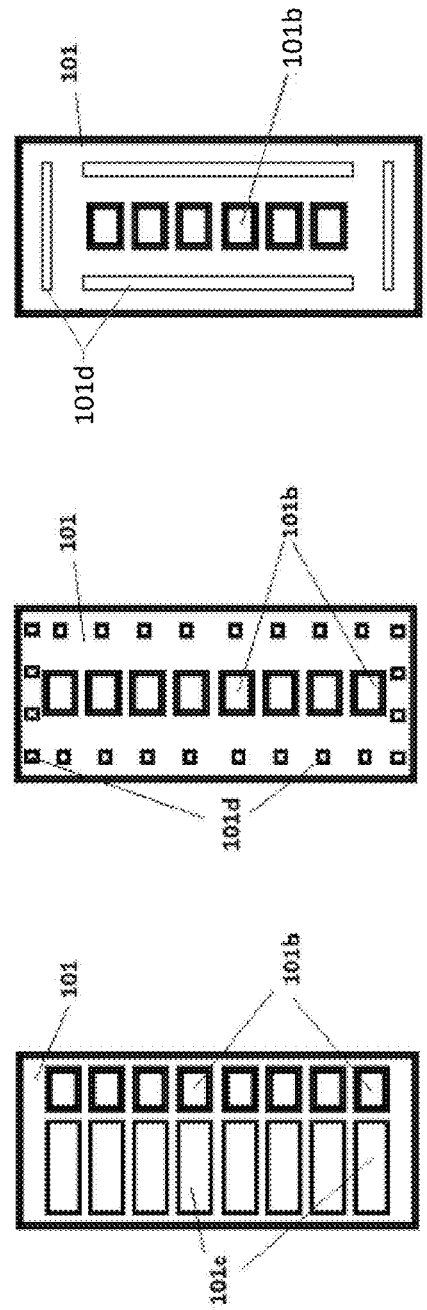
FIG. 14C
FIG. 14Di
FIG. 14Dii

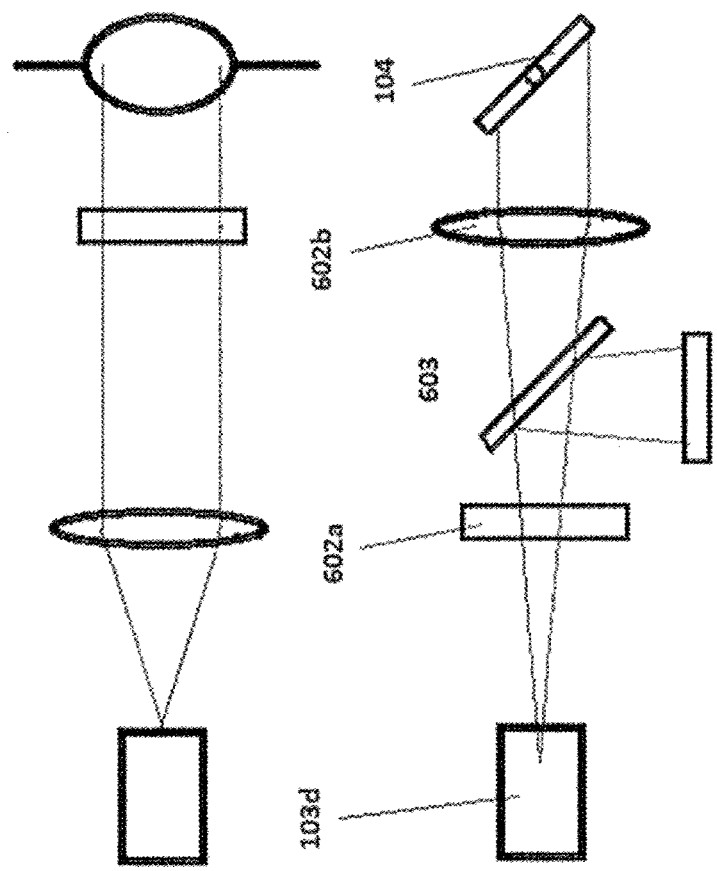
FIG. 15Dii    FIG. 15Di

FIG. 15Eii

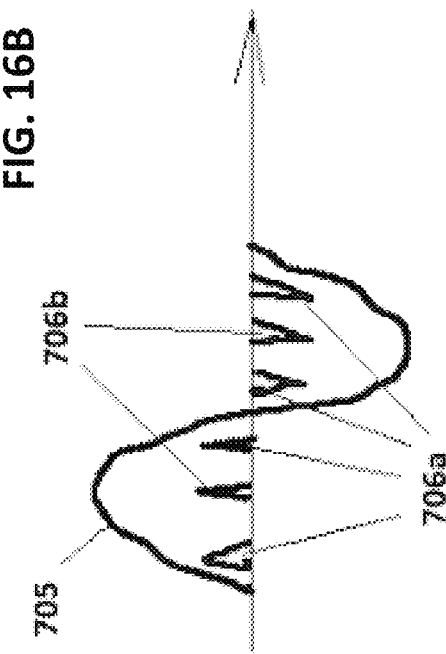
FIG. 16A
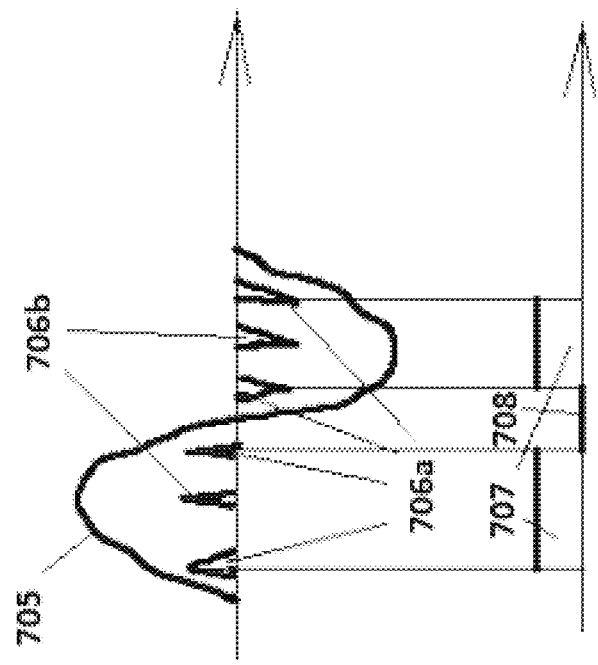
FIG. 16B
FIG. 16C

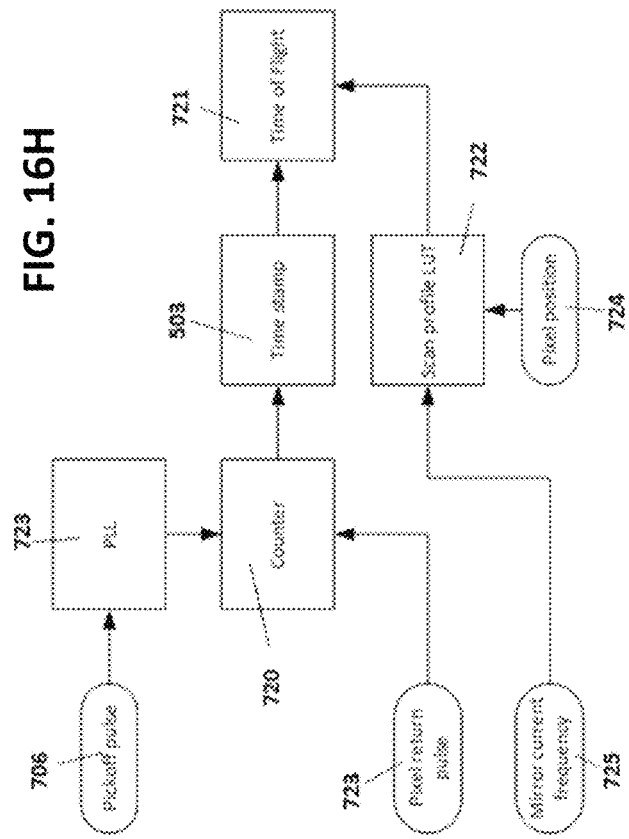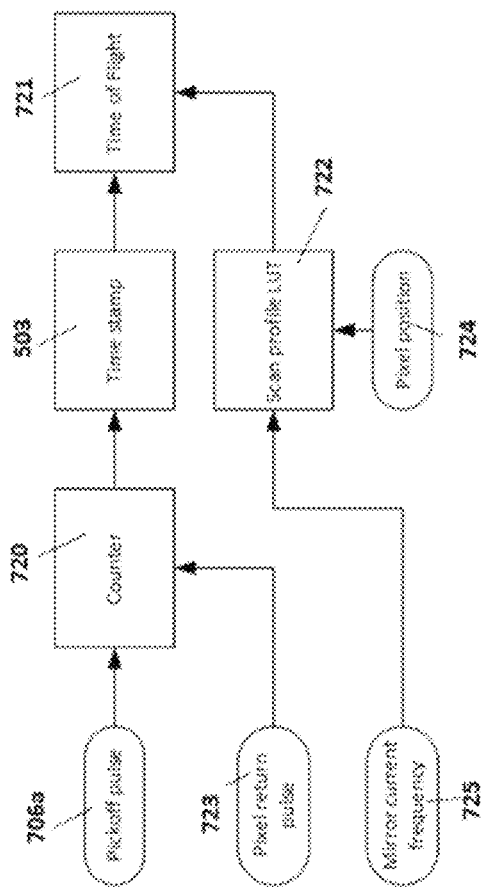
FIG. 16H
FIG. 16G

ENHANCED HYBRID LIDAR WITH HIGH-SPEED SCANNING

CROSS REFERENCES TO RELATED APPLICATIONS

This application claims priority on U.S. Provisional Patent Application Ser. No. 63/155,169, filed on Mar. 1, 2021; and this application is also a continuation in part of U.S. application Ser. No. 17/356,676, filed on Apr. 3, 2021, having the title "Hybrid LIDAR with Optically Enhanced Scanned Laser," which claims priority on U.S. Provisional Application Ser. No. 63/154,990, filed on Mar. 1, 2021; this application is also a continuation in part of U.S. application Ser. No. 17/000,464, filed on Aug. 24, 2020, which claims priority on U.S. Provisional Application Ser. No. 62/890,189, filed on Aug. 22, 2019; and this application is also a continuation in part of U.S. application Ser. No. 16/744,410, filed on Jan. 16, 2020, which is a continuation of U.S. application Ser. No. 15/432,105, filed on Feb. 14, 2017, which claims priority on U.S. Provisional Patent Application Ser. No. 62/295,210, filed on Feb. 15, 2016; and all disclosures of these applications are incorporated herein by reference.

FIELD OF THE INVENTION

The present invention relates generally to the field of optical Time-of-Flight (ToF) measurement, and more specifically, to directionally-resolved ToF measurement technology, known as Laser Radar (LADAR).

BACKGROUND OF THE INVENTION

In the modern era, beginning in World War II, radio detection and ranging (RADAR) systems were deployed, and which utilize reflected radio waves to identify the position of enemy aircraft. Sonar similarly uses sound waves to locate vessels within the oceans. Soon after the development of laser technologies, light/laser detection and ranging (LIDAR/LADAR) systems underwent development.

LADAR is generally based on emitting short pulses of light within a certain Field-Of-View (FOV) at precisely-controlled moments, collecting the reflected light and determining its Time-of-Arrival, possibly, separately from different directions. Subtraction of the pulse emission time from ToA yields ToF, and that, in turns, allows one to determine the distance to the target the light was reflected from. LADAR is the most promising vision technology for autonomous vehicles of different kinds, as well as surveillance, security, industrial automation, and many other areas, where detailed information about the immediate surroundings is required. While lacking the range of radar, LADAR has a much higher resolution due to much shorter wavelengths that are used for sensing, and hence, comparatively relaxed diffractive limitations. It may be especially useful for moving vehicles, both manned, self-driving, and unmanned, if it could provide detailed 3D information in real-time, with the potential to revolutionize vehicles' sensing abilities and enable a variety of missions and applications.

However, until recently, LADARs have been prohibitively large and expensive for vehicular use. They were also lacking in desirable performance: to become a true real-time vision technology, LADAR must provide high-resolution imagery, at high frame rates, comparable with video cameras, in the range of 15-60 fps, and cover a substantial solid angle. Ideally, a LADAR with omnidirectional coverage of 360° azimuth and 180° elevation would be very beneficial. Collectively, these requirements may be called "real-time 3D vision".

A variety of approaches has been suggested and tried, including mechanical scanning, non-mechanical scanning, and imaging time-of-flight (ToF) focal-plane arrays (FPA). There is also a variety of laser types, detectors, signal processing techniques, etc. that have been used to date, as shown by the following.

U.S. Patent Application Pub. No. 2012/0170029 by Azzazy teaches 2D focal plane array (FPA) in the form of a micro-channel plate, illuminated in its entirety by a short power pulse of light. This arrangement is generally known as flash LADAR.

U.S. Patent Application Pub. No. 2012/0261516 by Gilliland teaches another embodiment of flash LADAR, with a two dimensional array of avalanche photodiodes illuminated in its entirety as well.

U.S. Patent Application Pub. No. 2007/0035624 by Lubard teaches a similar arrangement with a 1D array of detectors, still illuminated together, while U.S. Pat. No. 6,882,409 to Evans further adds sensitivity to different wavelengths to flash LADAR. Another approach is the use a 2D scanner and only one detector receiving reflected light sequentially from every point in the FOV, as taught by US Patent Application Pub. No. 2012/0236379 by da Silva.

Additional improvements to this approach are offered by U.S. Pat. No. 9,383,753 to Templeton, teaching a synchronous scan of the FOV of a single receiver via an array of synchronized MEMS mirrors. This arrangement is known as retro-reflective.

Yet another approach is to combine multiple lasers and multiple detectors in a single scanned FOV, as taught by U.S. Pat. No. 8,767,190 to Hall.

See also, the laser range camera of U.S. Pat. No. 5,870,180 to Wangler.

The herein disclosed apparatus provides improvements upon prior art LADAR systems.

It is noted that the citing of any reference within this disclosure, i.e., any patents, published patent applications, and non-patent literature, is not an admission regarding a determination as to its availability as prior art with respect to the herein disclosed and claimed method/apparatus.

OBJECTS OF THE INVENTION

The present invention is aimed at overcoming the limitations of both scanning and imaging approaches to LADAR by combining their advantages and alleviating their problems, including but not limited to:

1. Making a light origin point for a LIDAR system at the side of the sensor array, and using a spot, possibly being oval, that may bleed into the imaging field, to eliminate parallax;
2. Prevent the emitted light from the LIDAR system of a vehicle from being bounced off an object that is suddenly nearer than objects that were previously being imaged, to prevent damages to imaging sensors; and
3. Create one or more imaging sensor arrangement that will prevent damage thereto when being exposed to high intensity laser light from the LIDAR system of another vehicle or any other source.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

For a LIDAR system, it is disadvantageous to have the optical reception path and the optical transmission path for the laser beam of the system being completely identical (e.g., being co-axial), as objects (e.g., a mirror) in the transmission path would block light along the reception path. Plus the LIDAR system needs to "see" (i.e., image) from between one meter to 200 meters, and account for parallax. LIDAR system embodiments disclosed herein are particularly configured to address these and other issues.

In accordance with at least one embodiment of the herein disclosed apparatus, an optical system for a light detection and ranging (LIDAR) system may broadly include a laser, an optical transmission system, and an optical reception system. The laser is configured to emit a beam of light at a desired wavelength or wavelengths.

The optical transmission system is configured to shape the beam of light emitted by the laser, and may include: a first mirror and a fold mirror. The first mirror is configured to pivot about an axis to scan the beam of light, and the fold mirror is positioned to reflect the scanned beam of light along a fan of transmission light paths toward a target.

The optical reception system is configured to collect the laser light reflected from the target along a fan of reception light paths, and may include: a lens, and a sensor array that may have a field of view (FOV) on at least a portion of the target.

To improve the performance of the LIDAR system the optical transmission system may also include a wedge-shaped optical element that is positioned to create an auxiliary field of view. The wedge-shaped optical element is positioned proximate to an outside edge of the lens, and the fold mirror is positioned proximate to, but beyond the outside edge of the lens. The wedge-shaped optical element may be formed to have a width that covers one-quarter of the lens. The wedge-shaped optical element may also be formed with a variable transparency, having increasing transparency with increasing distance from a center of the first lens, thereby preventing excessive signals from being received at the linear sensor array when the target is extremely close and therefore the reflected signal is very strong.

The fold mirror may just be a single mirror, and in another embodiment the functionality of the fold mirror may be achieved by a plurality of mirrors arranged in an arcuate pattern to reflect the scanned beam of light toward the target.

Several different embodiments of a scanner may be used. In one embodiment the scanner may be a mirror configured to pivot about an axis to scan the beam of light toward the fold mirror. In another embodiment, the scanner may be a polygonal reflector configured to rotate about an axis to sequentially scan the beam of light toward each of the plurality of mirrors arranged in the arcuate pattern.

Several different embodiments of the sensor array may be utilized. In one embodiment the sensor array may be formed of a plurality of sensors each having a unique length and width, with a center of each of the plurality of sensors being arranged in a line to form a linear sensor array. In another embodiment, the sensor array may be formed of a plurality of sensors each having the same length and width, with a lengthwise direction of each of the plurality of sensors are parallel, but a center of each of the plurality of sensors being positioned to form an arcuate shape, to compensate for an arcuate scan line. In yet another embodiment, the sensor array may be formed to include a first plurality of sensors and a second plurality of sensors. The first plurality of sensors each have a first length and a first width, with a center of each of the first plurality of sensors being arranged in a line to form a first column of sensors; and the second plurality of sensors each have a longer length and the same width, with a center of each of the second plurality of sensors being arranged in a line to form a second column of sensors. Each of the first plurality of sensors are configured to have a field of view in focus at far field positions; and each of the second plurality of sensors are configured to have a field of view in focus at near field positions, to correct for parallax effect/error. In yet a further embodiment, the sensor array may be formed to include a first plurality of sensors, and a plurality of guard rail sensors. The first plurality of sensors each have the same length and width, with a center of each of the first plurality of sensors being arranged in a line to form a linear array of the sensors, The plurality of guard rail sensors are smaller and are configured to have a lower sensitivity and a higher immunity to damage from stray laser light than each of the first plurality of sensors. The guard rail sensors are positioned to surround the first plurality of sensors, so that corresponding electronic circuitry may be configured to shut down the first plurality of sensors when any one or more of the guard rail sensors receive laser light above a threshold intensity that be harmful.

BRIEF DESCRIPTION OF THE DRAWINGS

The description of the various example embodiments is explained in conjunction with appended drawings, as follows.

FIG. 3A illustrates tight focusing of the laser beam on the scanning mirror of a LADAR and subsequent re-collimation with a cylindrical lens.

FIG. 3B is a bottom view of the LADAR of FIG. 3A.

FIG. 3C is a side view of the LADAR of FIG. 3A.

FIG. 6A illustrates the laser of the LADAR system being continuously ON.

FIGS. 9G, 9H, 9J and 9K illustrate changes to the size and position of the laser spot versus the target distance.

FIG. 12Ai shows such a cross-section through a mirror having a handle layer and a device layer, with a photo resist mask having been deposited at locations where the handle layer is to remain intact, so that an applied etchant can remove select portions of the handle layer.

FIG. 12Aii shows the resulting structure after the etchant has removed portions of the mirror of FIG. 12Ai.

FIG. 12Bi shows a cross-sectional view of a mirror that has been formed out of a single layer silicon wafer, with an oxide mask having been applied to portions thereof where the silicon wafer is to remain intact.

FIG. 12Bii shows the mirror cross-section of FIG. 12Bi after an applied etchant has removed portions of the silicon wafer.

FIG. 12Ci shows the mirror cross-section of FIG. 12Bii being masked prior to receiving an etchant to undergo processing a second time.

FIG. 12Cii shows the mirror cross-section of FIG. 12Ci after the etchant has removed additional portions of the silicon wafer.

FIGS. 14A through 14Dii show various embodiments of sensor arrays for an optical system of the LIDAR disclosed herein.

FIG. 15Di and FIG. 15Dii illustrate an embodiment similar to the one shown in FIG. 15Bi and FIG. 15Bii, but which additionally includes a low-reflectance signal sampling mirror that diverts some of the light beam coming out from the cylindrical lens.

FIG. 16A illustrates an optical arrangement that may be used for accurate control of the motion of a high-speed scanning mirror, and which uses a pickoff laser and two pickoff sensors.

FIG. 16B shows the mirror scan profile and the pulses from the end pickoff sensors and the pulses for the center pickoff sensors of the embodiment of FIG. 16A.

FIG. 16C is the same a FIG. 16B, but also includes a digital representation of the laser on interval and the laser off interval.

FIG. 16G is diagram showing a drive circuit that is configured such that sensor timing is driven based upon the end pickoff pulse.

FIG. 16H is diagram showing an arrangement where a PLL is utilized to smooth the pickoff pulse in the event that any jitter occurred in the pickoff pulse.

DETAILED DESCRIPTION OF THE INVENTION

Figure 1:
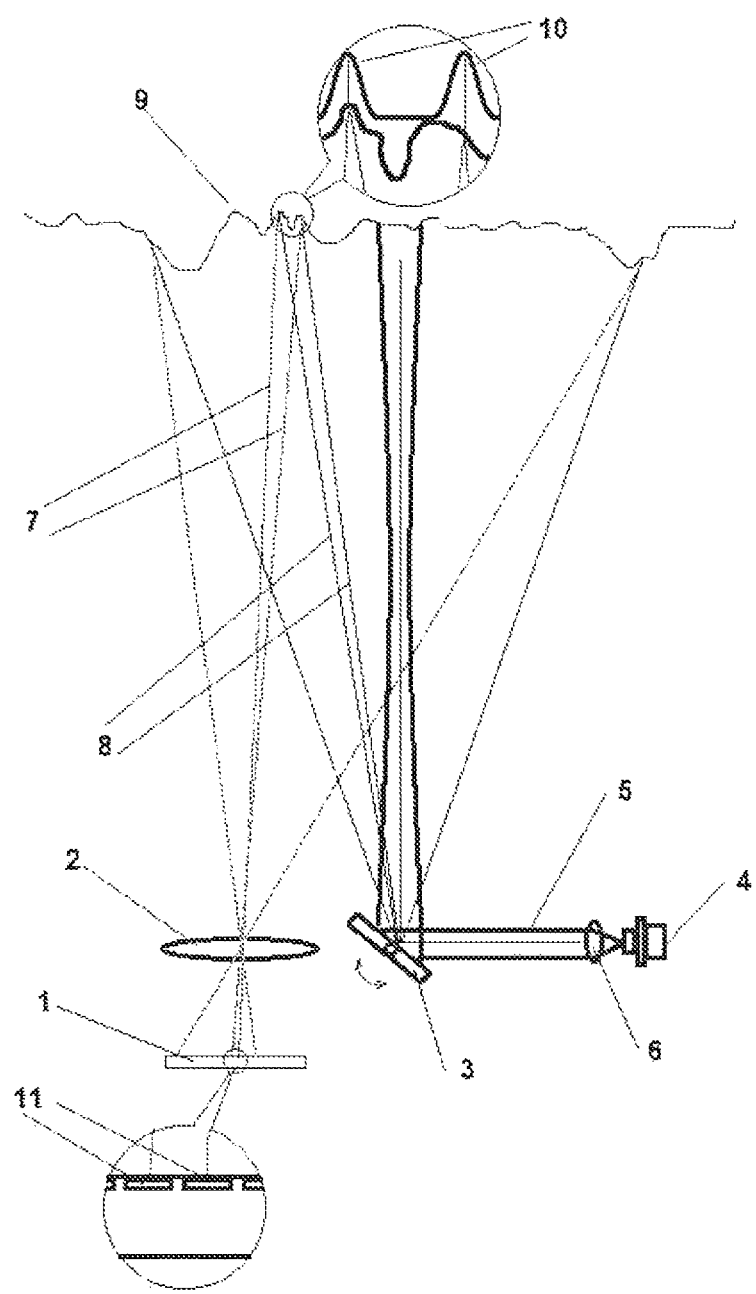
FIG. 1 illustrates a concept for a 1D scanning and imaging hybrid system.

As used throughout this specification, the word "may" is used in a permissive sense (i.e., meaning having the potential to), rather than a mandatory sense (i.e., meaning must), as more than one embodiment of the invention may be disclosed herein. Similarly, the words "include", "including", and "includes" mean including but not limited to.

The phrases "at least one", "one or more", and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference. However, It is noted that the citing of any reference within this disclosure, i.e., any patents, published patent applications, and non-patent literature, is not an admission regarding a determination as to its availability as prior art with respect to the herein disclosed and claimed apparatus/method.

Furthermore, any reference made throughout this specification to "one embodiment" or "an embodiment" means that a particular feature, structure or characteristic described in connection therewith is included in at least that one particular embodiment. Thus, the appearances of the phrases "in one embodiment" or "in an embodiment" in various places throughout this specification are not necessarily all referring to the same embodiment. Therefore, the described features, advantages, and characteristics of any particular aspect of an embodiment disclosed herein may be combined in any suitable manner with any of the other embodiments disclosed herein.

Additionally, any approximating language, as used herein throughout the specification and claims, may be applied to modify any quantitative or qualitative representation that could permissibly vary without resulting in a change in the basic function to which it is related. Accordingly, a value modified by a term such as "about" is not to be limited to the precise value specified, and may include values that differ from the specified value in accordance with applicable case law. Also, in at least some instances, a numerical difference provided by the approximating language may correspond to the precision of an instrument that may be used for measuring the value. A numerical difference provided by the approximating language may also correspond to a manufacturing tolerance associated with production of the aspect/feature being quantified. Furthermore, a numerical difference provided by the approximating language may also correspond to an overall tolerance for the aspect/feature that may be derived from variations resulting from a stack up (i.e., the sum) of a multiplicity of such individual tolerances.

In accordance with at least one embodiment of the hybrid LADAR system disclosed herein, a fast 1D scanner/imager hybrid can collect one line of high-resolution ToF data within tens of microseconds. If needed, that hybrid can also be coupled to a secondary, slow scanning stage, producing raster ToF frames of thousands of lines at high frame rates, with total pixel throughput of tens or even hundreds of megapixels per second.

The following description lists several embodiments of the present invention, which are merely exemplary of many variations and permutations of the subject matter disclosed.

Mention of one or more representative features of a given embodiment is likewise exemplary: an embodiment can exist with or without a given feature, and likewise, a given feature can be part of other embodiments.

A preferable embodiment of a 1D hybrid scanner/imager is illustrated in FIG. 1. It comprises a 1D array of photo-detectors 1, placed in a focal point of a receiving optical system 2, and a scanning mirror 3, its axis of rotation perpendicular to the direction of the detector array. A laser beam 5 generated by the laser 4 is directed onto the scanning mirror 3 through a collimating lens 6. The positions of the optical system 2 and the scanner 3 are adjusted in such way that the fan of imaginary rays 7 emanating from individual pixels of the array, and the fan of real laser rays 8 emanating from the scanning mirror 3 lay in the same plane. Respectively, the laser scan line on the target overlaps with the FOV of the detector array.

Preferably, the scanning mirror 3 is a resonant MEMS mirror. Such mirrors, having dimensions of the reflective area of the order of 1 sq. mm, the resonant frequencies of tens of kHz, and the scan amplitude of tens of degrees, are becoming commercially available. While generally this invention would benefit from the fastest rate of scanning, a general tendency in scanning mirrors is that the faster scanning rate typically leads to narrower scan angle and smaller mirror size, which in turn increases the divergence of the scanned laser beam, thus limiting the number and size of the detectors in the array, and the amount of light that can be collected onto the detectors, especially, at longer ranges.

This invention might further benefit from non-mechanical beam scanners (NMBS) that are undergoing development, although their specifications and commercial availability remain unclear. For example, U.S. Pat. No. 8,829,417 to Krill teaches a phase array scanner, and U.S. Pat. No. 9,366,938 to Anderson teaches an electro-optic beam deflector device. NMBS may allow scan rates, or beam cross-sections, exceeding those of mechanical scanners.

A photo-detector array should preferably consist of high-sensitivity detectors, as the number of photons arriving to each detector, especially from longer ranges, might be exceedingly small. Significant progress has been recently achieved in design and manufacturing of Avalanche Photo Diodes (APD), working in both a linear, and a Geiger mode, which is also known as a Single-Photon Avalanche Detector (SPAD). The former are reported to be able to detect a light pulse consisting of just a few photons, while the latter can actually be triggered by a single photon, and both types would be suitable for embodiments of the present invention. It should be noted, however, that the most advanced detectors are expensive to fabricate, therefore, the present invention that needs only one row of detectors would be very cost-efficient in comparison with flash LADAR that would typically require a 2D array of the same resolution.

One of the problems typically encountered in ground-based and vehicular LADARs intended to be used in a populated area is the eye safety hazard presented by its powerful lasers. Therefore, a preferable embodiment of this invention would use a laser with longer infra-red (IR) wavelength, exceeding approximately 1400 nm. Such longer wavelengths are not well-absorbed by human eyes and therefore don't pose much danger. Respectively, much more powerful lasers might be used in this spectral range.

Figure 2A:
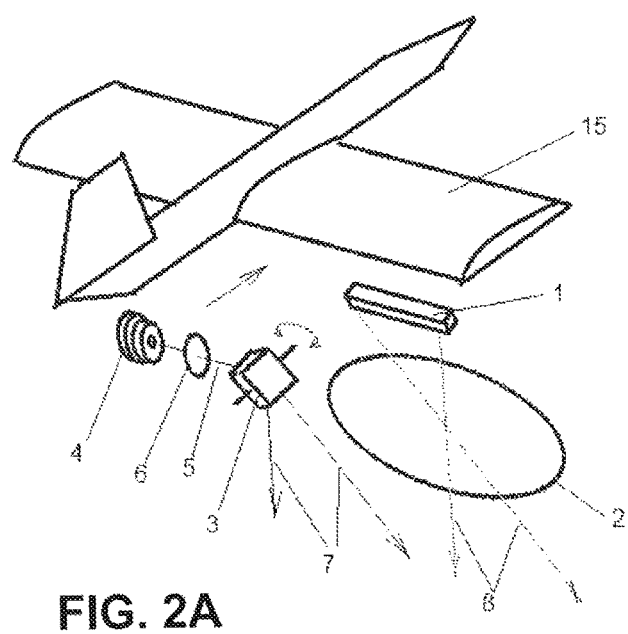
FIG. 2A illustrates a 1D hybrid LADAR installed on a Unmanned Aerial Vehicle (UAV) to obtain 2D ToF data.

Depending on a particular task the hybrid LADAR is optimized for, one of the following configurations of the slow stage may be used for ground surveillance, vehicular navigation and collision avoidance, control of industrial robots, other applications, or alternatively there may not be any slow stage at all. As depicted on FIG. 2A, the hybrid 1D LADAR of FIG. 1 is attached to an aerial platform 15, with the scan direction perpendicular to direction of platform motion.

Figure 2C:
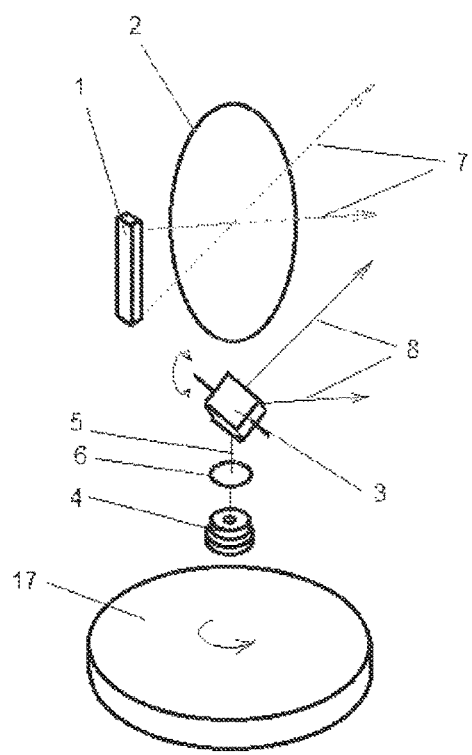
FIG. 2C illustrates a 1D hybrid LADAR installed on a rotating platform to obtain 2D ToF data.
Figure 2B:
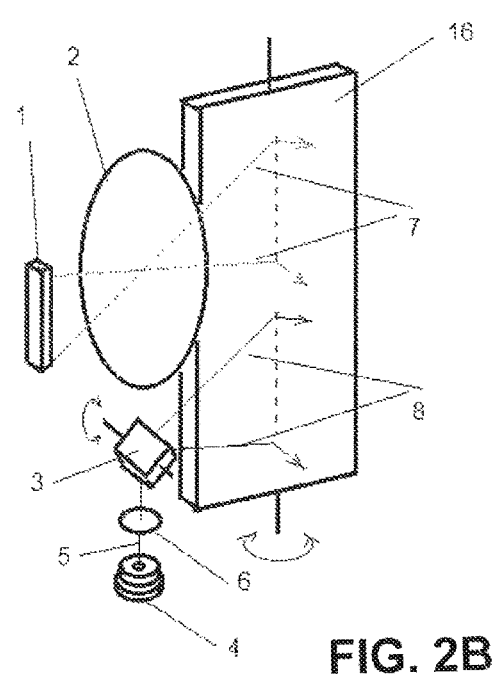
FIG. 2B illustrates a 1D hybrid LADAR coupled to an additional scanning mirror to obtain 2D ToF data.

FIG. 2B illustrates using a scanning mirror 16, with its scanning direction being perpendicular to the scanning direction of the hybrid. Combined, they constitute a 2D LADAR preferably having comparable scan angles in both directions. Finally, FIG. 2C illustrates positioning the hybrid of FIG. 1 on a rotational stage 17, which gives the combined LADAR a 360 degree fOV in a horizontal plane.

If a scanning mirror is used for the slow stage, its area should be sufficiently large to reflect the entire fan of beams emanating from the fast scanner, as well as the entire fan of rays coming to the optical reception system. However, scanning mirrors with active area of square centimeters, frequencies of tens of Hz, and scan angles of tens of degrees are commercially available. Thus, an exemplary combination of a detector array with 300 pixels, a fast scanner of 30 kHz, and a slow scanner of 30 Hz would provide a point cloud of ~18M points a second, assuming that both scanners utilize both scan directions, thus enabling real-time 3D vision with the resolution of approximately 1000×300 pixels at 60 frames a second. Rotation at 60 revolutions per second, or linear motion on board a vehicle would also provide comparable point acquisition rates, without the limitations of the reflective area of the scanning mirror.

Preferably, the optical system 2 is configured to form the FOV of each individual pixel 11 of the detector array to match the divergence angle of the laser beam, which is generally possible and usually not difficult to achieve. In an exemplary embodiment, a laser beam of near-infrared (NIR) light of approximately 1 mm in diameter will have a far-field divergence of approximately 1 milliradian (mrad). A photo-detector pixel 20 um in size will have similar FOV when placed in a focal plane of a lens with 20 mm focal length.

It might also be advantageous to use additional elements in an optical transmission system to shape the laser beam, such as, for example, a cylindrical lens 23, as depicted in FIG. 3A. In this case, the laser may still be nearly-collimated in the scanning direction, but may be tightly focused in the orthogonal direction, as illustrated by FIG. 3B, which shows the view from direction B in FIG. 3A. Cylindrical lens 23 subsequently re-collimates the beam in the orthogonal direction as illustrated on FIG. 3C, which shows the view from direction C in FIG. 3A. The advantage of such an arrangement lies in the possibility to reduce the dimension of the scanning mirror in the tightly-focused laser beam direction, as well as in reduced eye hazard presented by the laser beam expanded in at least one direction.

Figure 4:
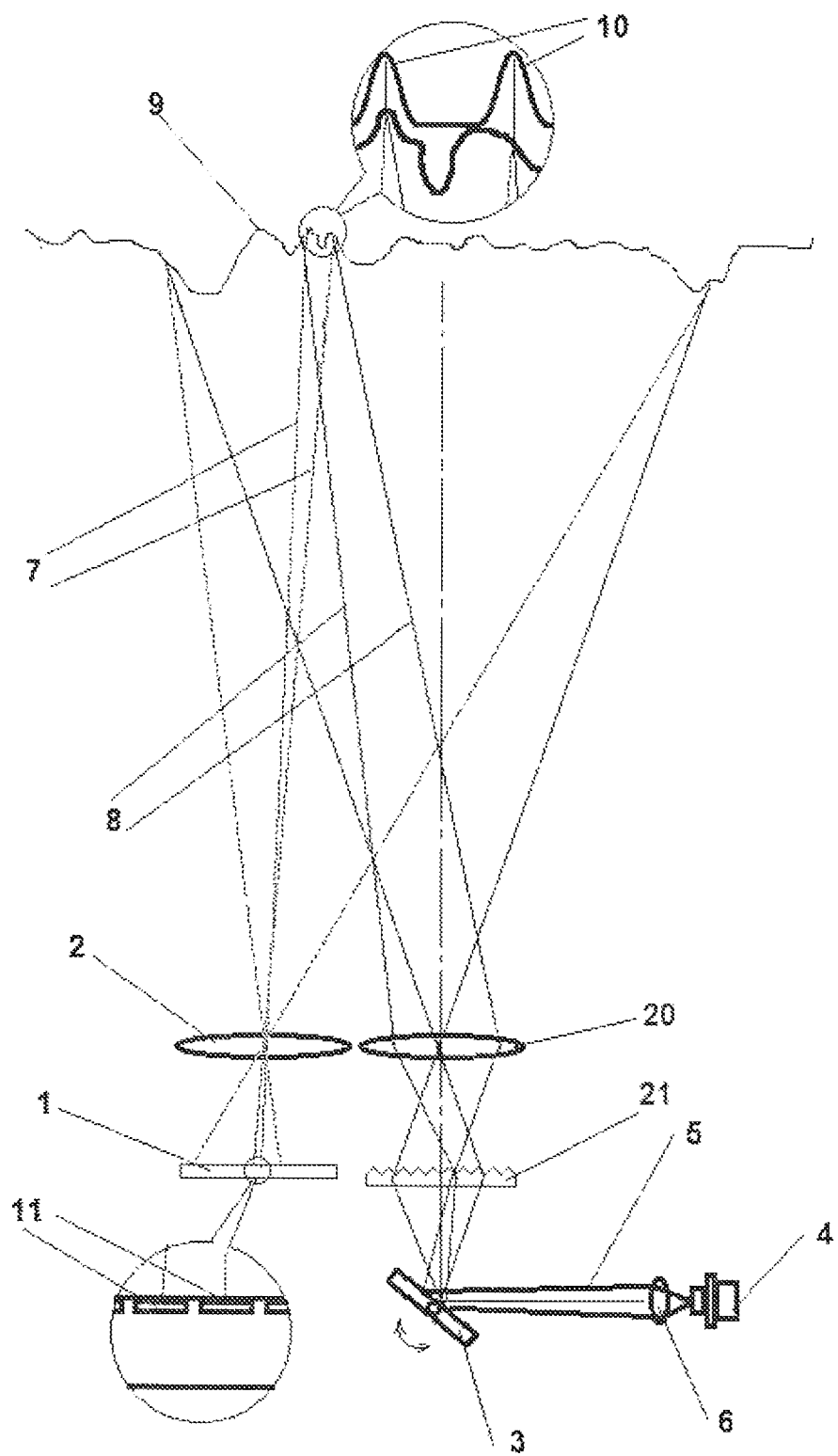
FIG. 4 illustrates forming a scan line on the surface of a diffractive element and imaging the scan line onto the target.
Figure 5A:
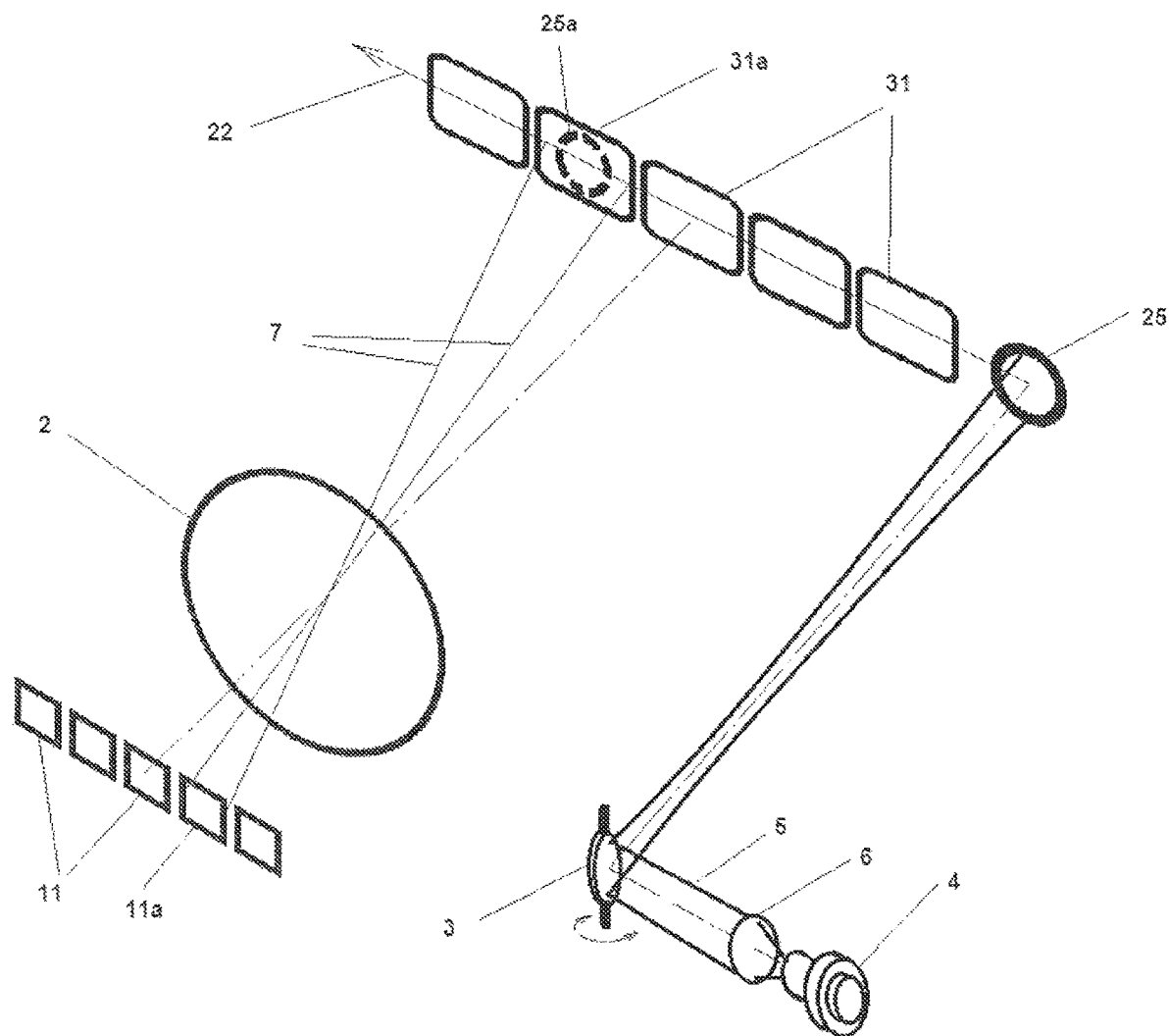
FIG. 5A illustrates a laser spot scanning across virtual detector pixels on the target.

In another embodiment of the present invention, the laser beam can be tightly focused in both directions and be scanned across a diffractive element 21, as illustrated on FIG. 4, forming a thin scan line on its surface. That scan line is subsequently imaged onto the target by the lens 20. The lens 20 may be identical to the lens 2 in the optical reception system in front of the detector array, in which case the dimensions of the scan line on the surface of a diffractive element 21 should be similar to that of the detector array, thus insuring the equal divergence of both FOVs of the illuminating laser and the detector. Alternatively, the lenses 2 and 20 may have different magnification, and respectively, the scan line may have different dimensions from the detector array, however, the design should provide for a good overlap of both FOVs on the target, as further illustrated on FIG. 5A, where virtual pixels 31 denote the projections of the detector pixels 11 onto the target through the optical system 2, while the laser spot 25 scans the same target along the scan line 22, thus sequentially illuminating pixels 11 with light reflected from the target. As shown on the figure for clarity, at the moment when the laser spot assumes position 25a, it illuminates the detector pixel 11a. It should be noted that the desired shape of laser spot 25 may be achieved by a variety of optical methods, as illustrated on FIG. 3 and FIG. 4, or other methods, without limiting the scope of this invention.

Figure 5B:
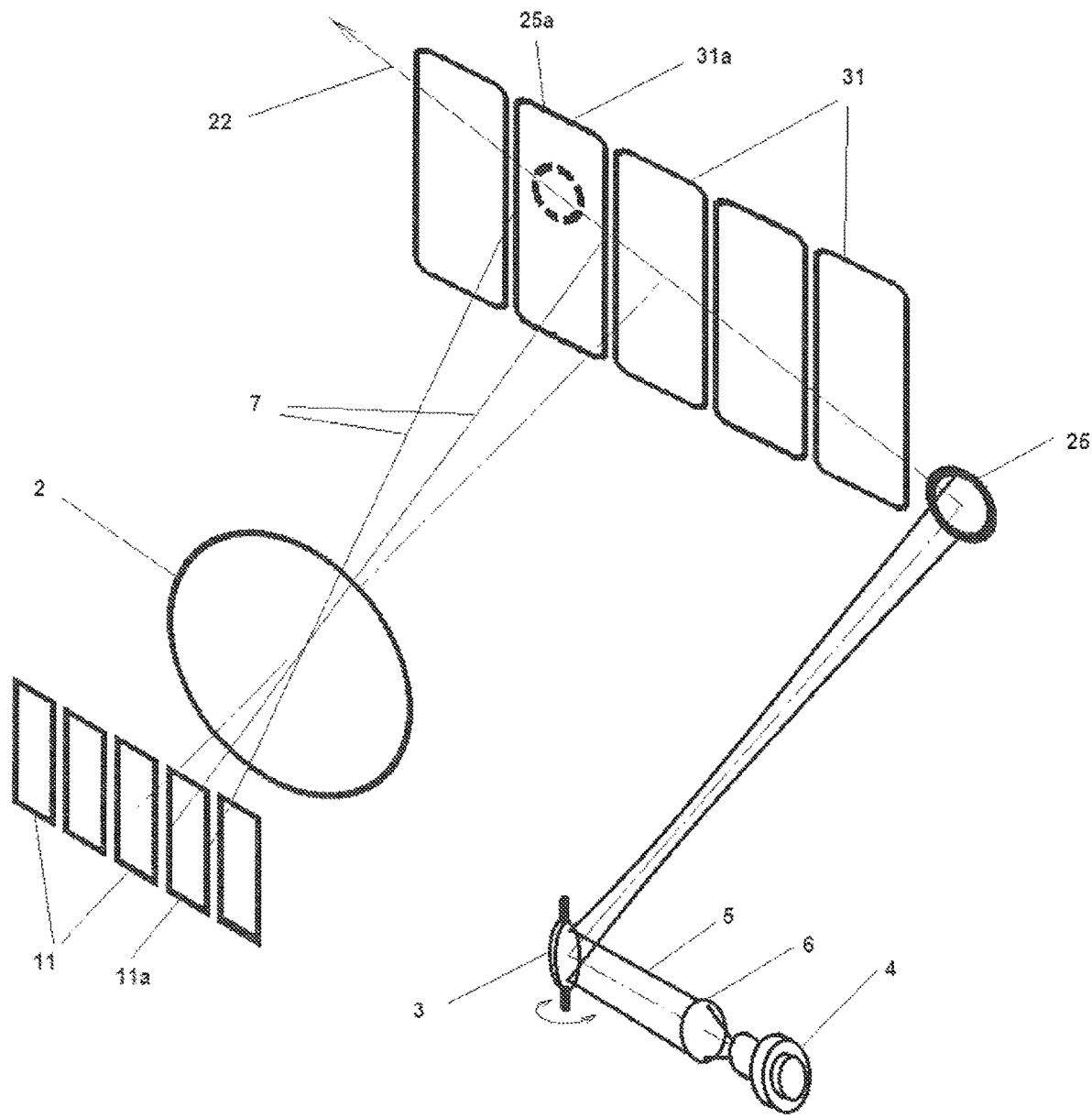
FIG. 5B illustrates permissible misalignment while the laser spot is scanning across tall virtual detector pixels on the target.
Figure 5C:
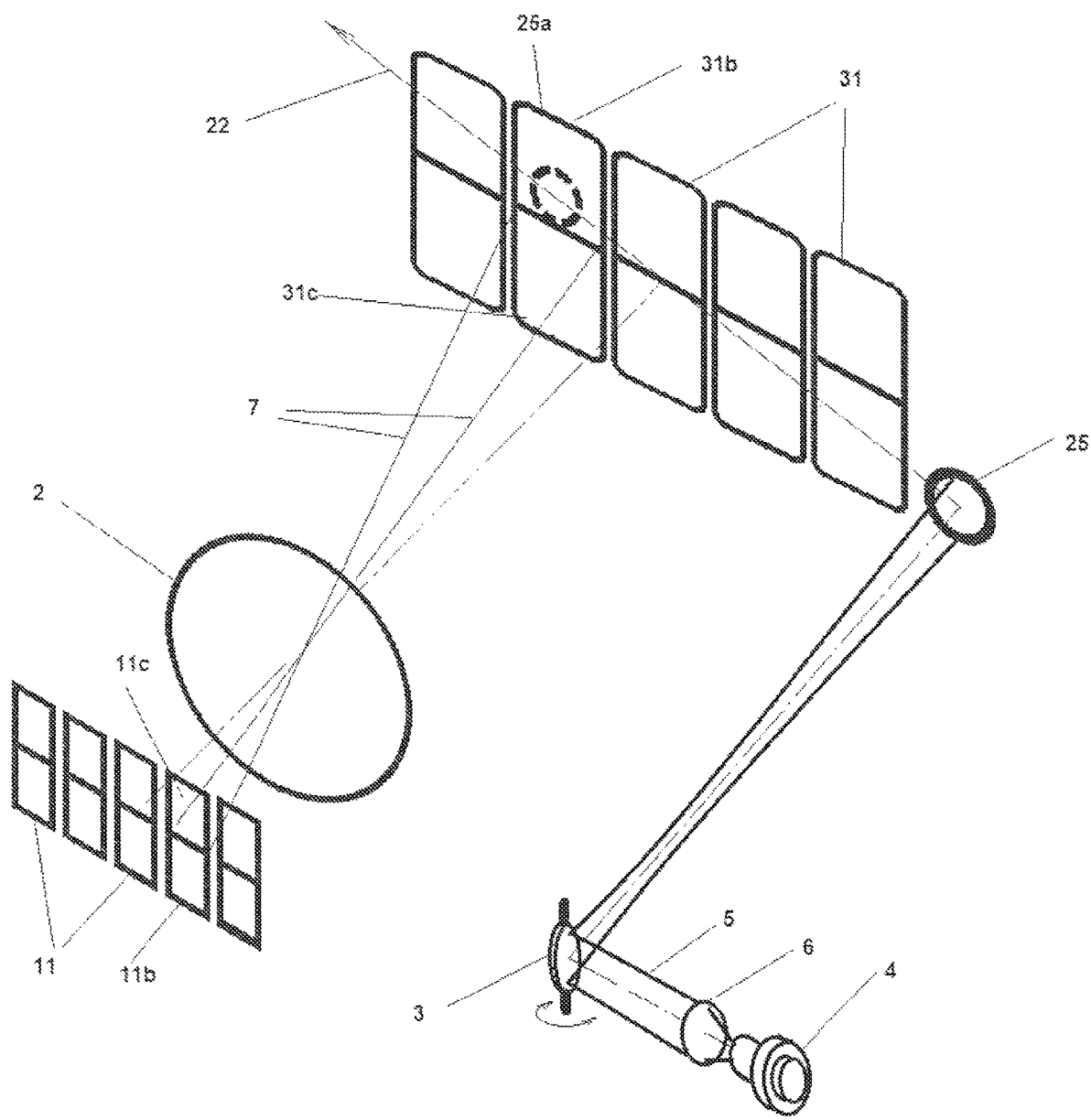
FIG. 5C illustrates splitting each of the pixels shown in FIG. 5B into two sub-pixels.

Pixels 11 may have different shapes: for example, FIG. 5B illustrates pixels with their height exceeding the pitch of the array. For example, pixels of the array may be 20 micrometers wide and 60 micrometers toll. The advantage of such arrangement is that it may accommodate slight misalignment between the laser scan line 22 and the line of virtual pixels 31. Likewise, the laser spot may also be oblong, or have some other desirable shape. It might also be advantageous to split each of the pixels 11 into two or more sub-pixels 11b, 11c, as depicted on FIG. 5C. These sub-pixels would generate redundant information, as the scan spot 25 may cross either of virtual pixels 31b, or 31c, or both of them, at the same time, and the ToA measured by either sub-pixels or both would be treated as one data point. The advantage, however, may come from the fact that smaller sub-pixels would generally have lower noise level, therefore a laser spot of the same power is more likely to generate a response when illuminating a small sub-pixel, than a larger full pixel.

Figure 5D:
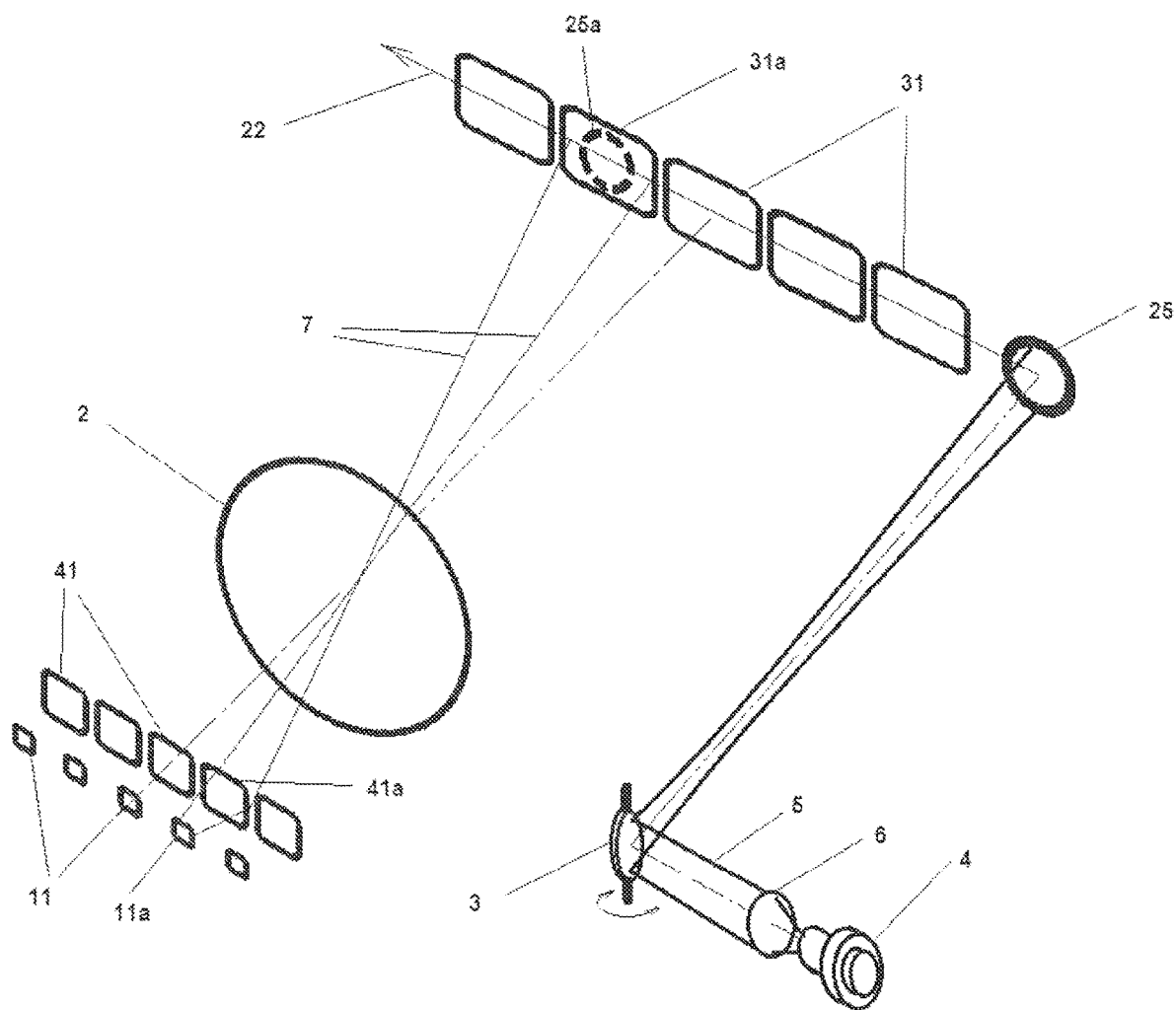
FIG. 5D illustrates positioning an array of micro-lenses in front of the detectors, and further illustrates how a relatively small pixel can be collecting light from a relatively large virtual pixel.

Some types of the high-sensitivity detectors, notably Geiger-mode APDs, are known to need considerable gaps between active pixels to eliminate cross-talk, thus limiting the fill factor of the arrays consisting of such detectors. To alleviate this problem, an array of micro-lenses 12 may be used in front of the detectors 11, as depicted on FIG. 5D, with the micro-lens 12a specifically illustrating how a relatively small pixel 11a can still be collecting light from a relatively large virtual pixel 31a.

It is also preferable to match the total extent of the array's FOV with the total scan angle, for example: 512 pixels, 20 um each, placed behind a 20-mm lens will subtend the angle of ~29°. Respectively, the total scan angle should be the same or slightly greater to utilize every pixel of the array.

Figure 6A:
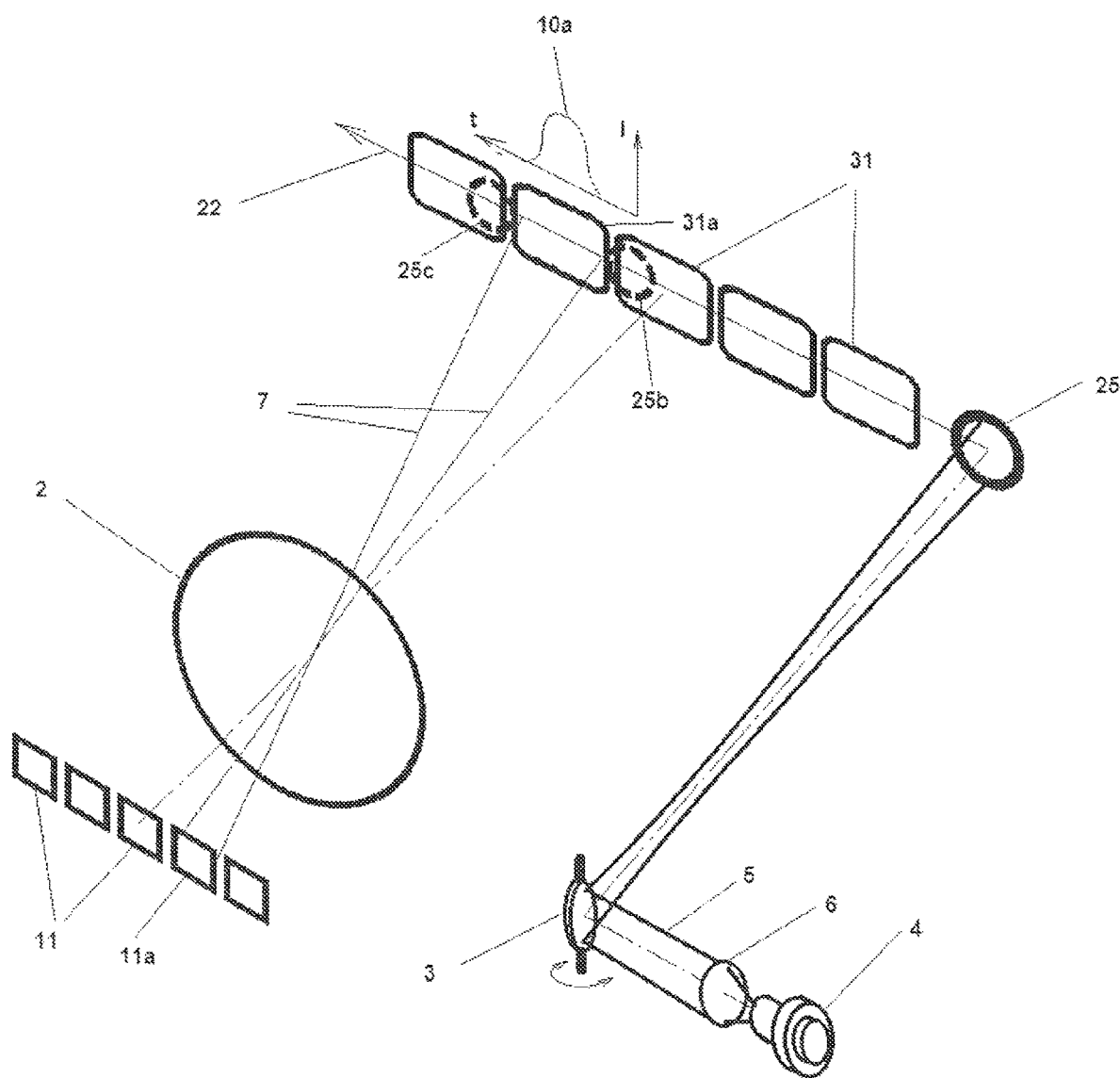

In a further embodiment of this invention, as the laser spot moves along the scan line, it is continuously energized, thus producing a time-domain response in the pixels it crosses, as illustrated on FIG. 6A, where the graph 10A represents the intensity (I) vs. time (t) response in the pixel 11a. The response starts when the laser beam in position 25b just touches the virtual pixel 31a, and ends when the laser beam moves to position 25c, just outside of the virtual pixel 31a.

In such an embodiment, the laser power, and hence, the sensitivity is maximized, however, the precision of ToF measurement may suffer, due to the ambiguity of the Time of Arrival (ToA) of a relatively long light pulse.

Figure 6B:
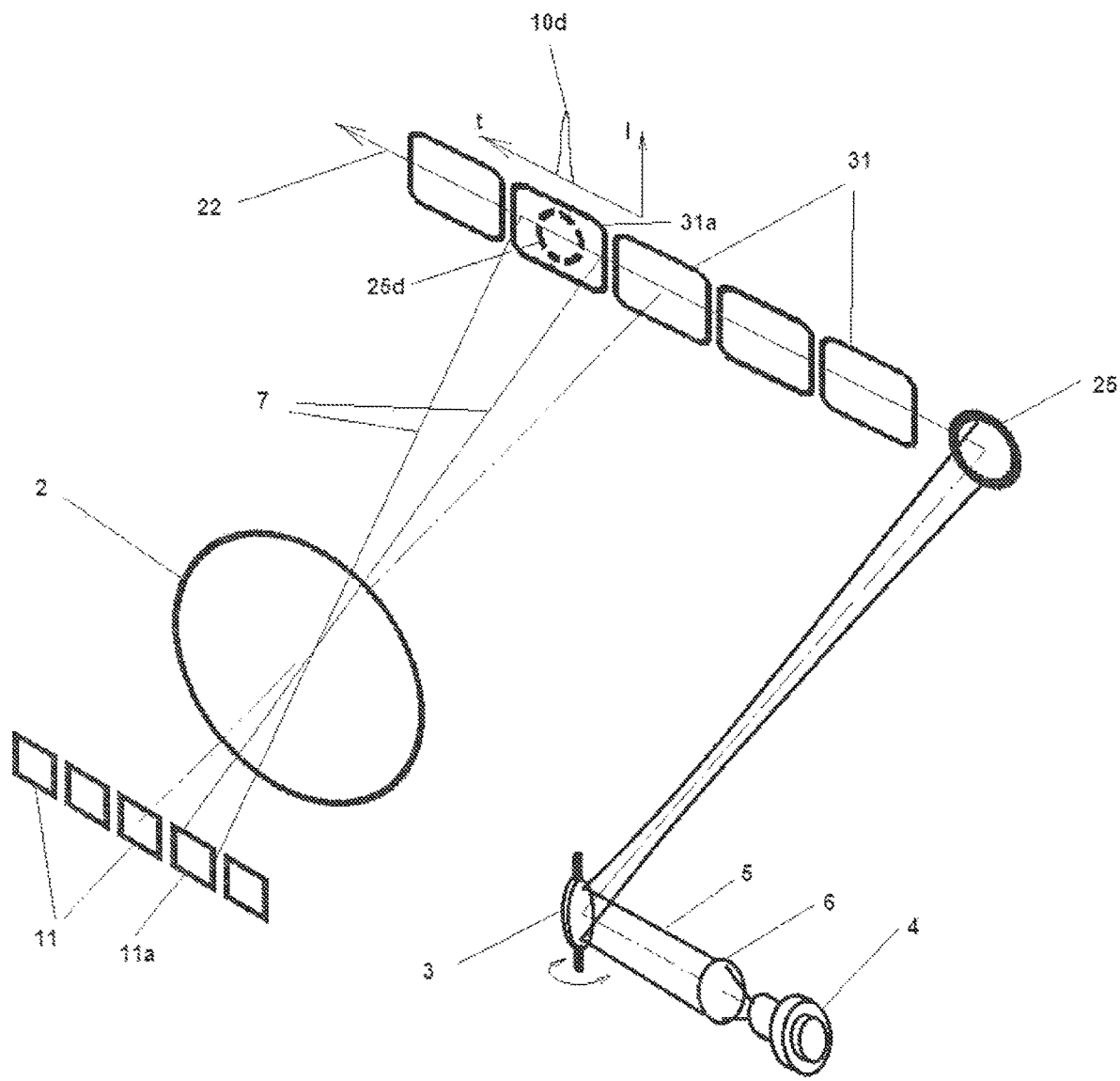
FIG. 6B illustrates the laser being modulated with one short pulse per pixel.
Figure 6C:
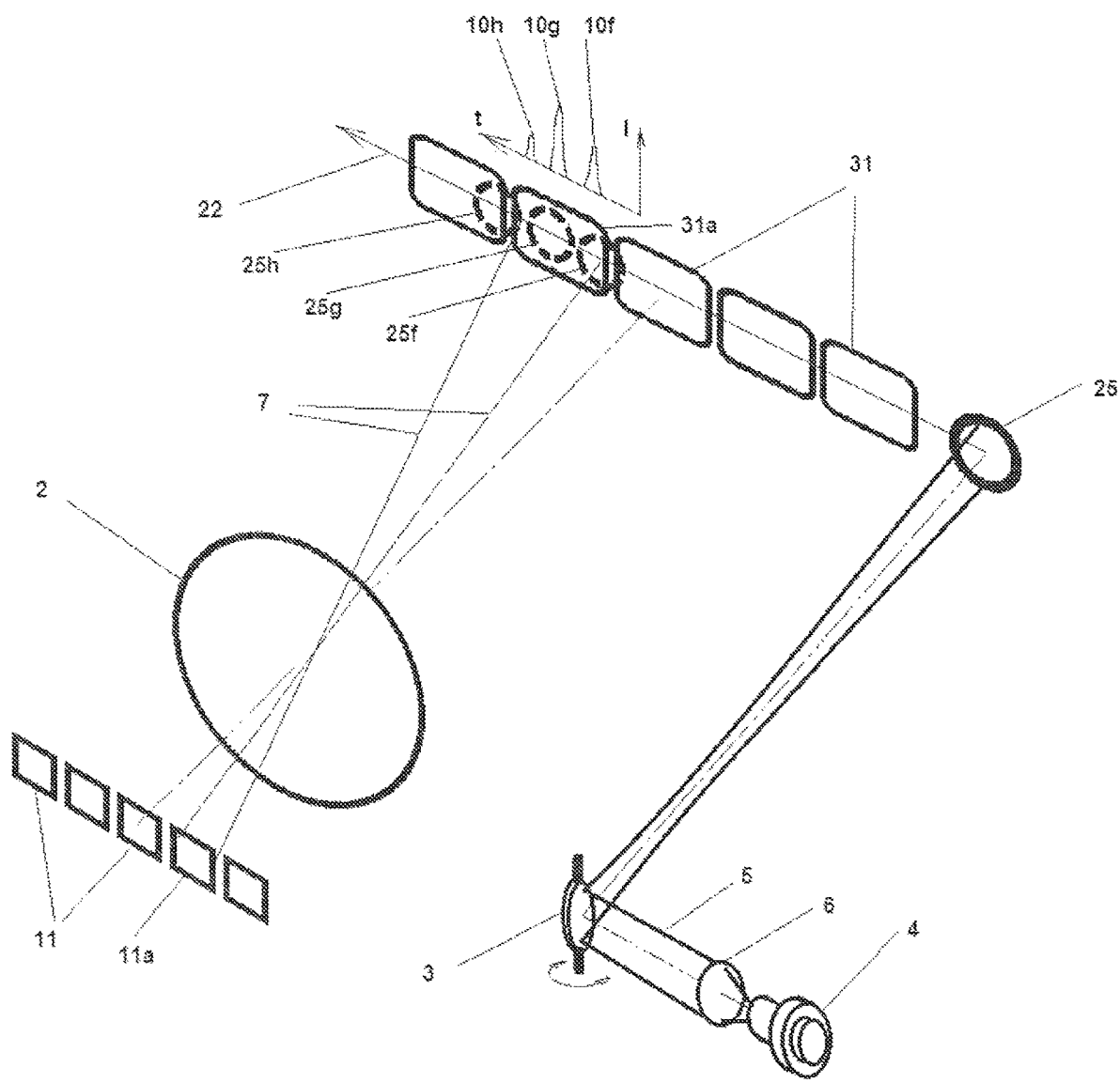
FIG. 6C illustrates the laser being modulated with multiple short pulses per pixel.

To alleviate this problem, the laser can be electrically-modulated with shorter pulses, as illustrated by FIG. 6B. For example, the laser is turned on when the laser spot is in the position 26d, producing the response 10d in the pixel 11a. Since the pulse is narrower, its ToA can be determined with greater precision.

One problem with this modulation method might arise if the laser is energized while its spot falls in between two virtual pixels, therefore each of the real pixels is getting only a fraction of the reflected light. Due to some parallax between the laser scanner and the detector array, the precise overlap between the laser spot and virtual pixels is somewhat dependent on the distance to the target, and hence not entirely predictable. To alleviate this problem, the laser may be modulated with more than one pulse per pixel, as illustrated on FIG. 6B. In this case, at least one of the consecutive modulation pulses emitted with the laser spot in positions 25f, 25g, 25h, would fully overlap with the virtual pixel 31a, thus producing full response 10g in the pixel 11a. Responses from two other pulses 10f and 10h might be shared with adjacent pixels and hence be lower.

Figure 7:
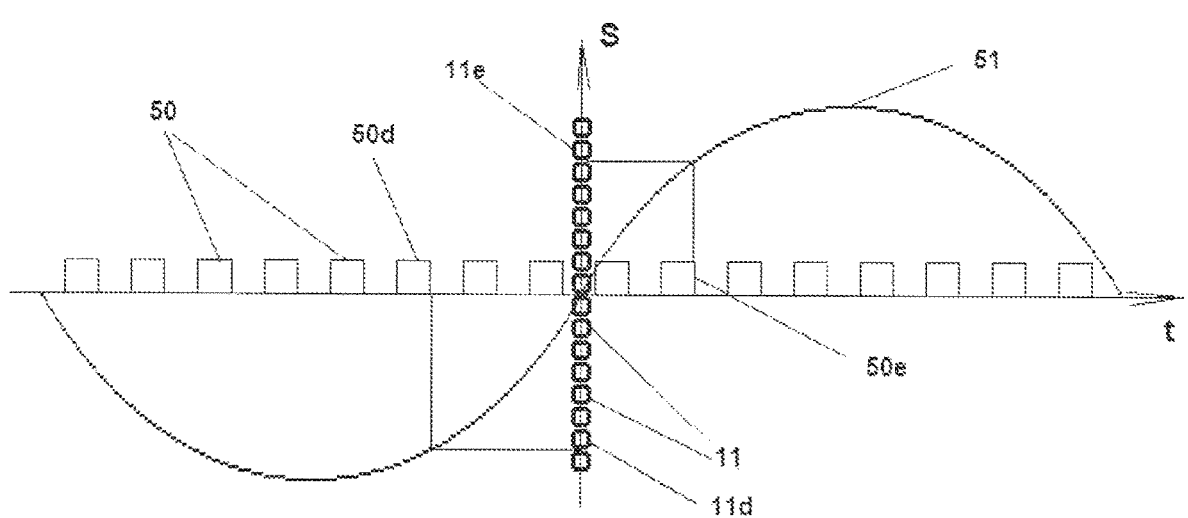
FIG. 7 illustrates synchronizing the clock of an electronic control system with the scanning process, so that there is a constant integer number of clock pulses per scanning cycle.

In any LIDAR system dependent on ToF measurements, it is important to accurately measure the ToA of a light pulse on the detector, as well as the time when the light pulse was emitted. In the present invention, additionally, it is important to precisely know the position of the scanned spot, as it determines which detector pixel will be illuminated. To achieve this, it is preferable to synchronize the clock of the electronic control system, denoted by pulses 50 on FIG. 7, with the scanning process, in such a way that there is a constant integer number of clock pulses per scanning cycle 51. The vertical axis(S) on FIG. 7 illustrates a scan angle, while the horizontal axis (t) illustrates time. Since many resonant scanners have unique, non-tunable resonant frequency, the system clock frequency may be changed instead to keep an integer number of clocks per period, preferably, by means of a Phase-Lock Loop (PLL) circuit. As long as this fixed relationship between the system clock and the scan angle is maintained, the system clock may be easily used for precise detector read-out timing, as well as for timing of the laser modulation pulses, if such modulation is used. Additionally, some types of detectors require quenching after they received a light pulse, and arming, to be able to receive the next pulse. Keeping pixels armed when they are not expected to be illuminated is undesirable, as it carries the risk of false positive due to internal noise. In most flash LADARs with such detectors, they are armed all at once, right before the illuminating laser pulse is emitted. In the present invention, it is preferable to arm detectors one-by-one, in the order they are illuminated by the scanning laser beam. As illustrated on FIG. 7, while the scanning beam proceeds from bottom to top, the pixel 11d would be armed by the system clock pulse 50d, while pixel 11e will be armed considerably later by the system clock pulse 50e.

Figure 8:
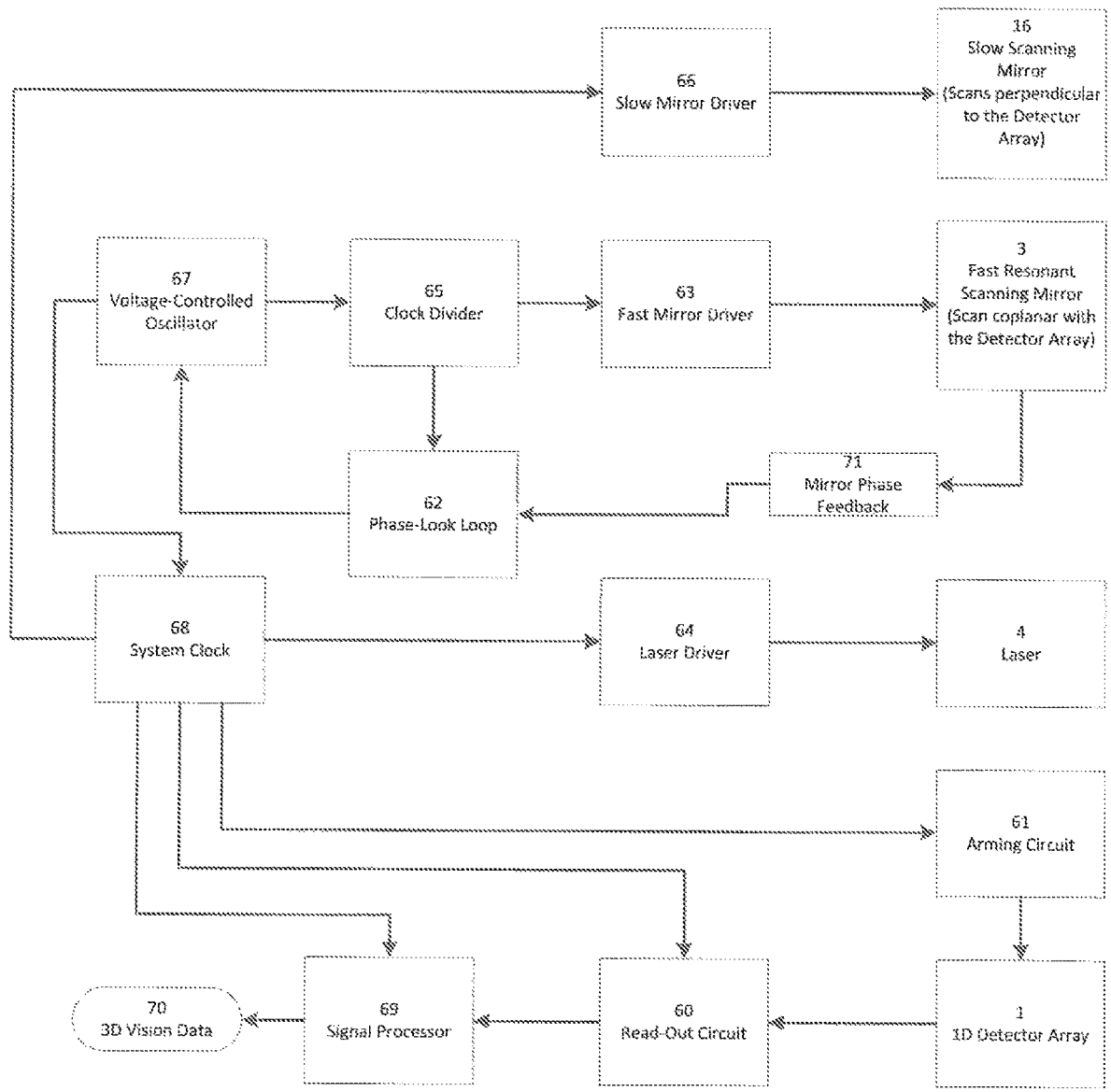
FIG. 8 illustrates the electronic control system of FIG. 7.

A preferred embodiment of the electronic control system is illustrated by FIG. 8. The fast scanning mirror 3 is driven by the driver 63 at the frequency defined by the voltage-controlled oscillator (VCO) 67 through clock divider 65. Being resonant, mirror 3 tends to oscillate at maximum amplitude while driven at its own resonant frequency and in a specific phase with respect to the drive signal. The mirror phase feedback 71 carries the information about the mirror's phase to the phase-locked loop (PLL) 62 that compares it to the phase of the clock divider and adjusts the VCO to eliminate any phase error, thus maintaining mirror oscillations close to its resonant frequency.

System clock 68 is derived from the same VCO, thus insuring that all other timing blocks function in strict synchronization with the mirror motion. Specifically, the arming circuit 61 provides sequential pixel arming and the laser driver 64 generate laser pulses in specific relationship to the scanned laser spot, as discussed above. Likewise, the same system clock synchronizes the motion of the slow mirror 16 through the driver 66 in a fixed relationship with the motion of the fast mirror, for instance, one cycle of the slow mirror per 1024 cycles of the fast mirror. Read-out circuit 60 and signal processor 69 may use the same clock as well, although they, unlike other elements discussed above, don't have to be strictly synchronized with the mirror motion. They must, however, be fast enough to be able to read and process data from all pixels within one scan cycle of the fast mirror. 3D vision data 70 is generated based on the ToF measurement coming from the detector array 1 and then supplied to users, such as navigation system of autonomous vehicles or security surveillance system.

It should be noted that the present invention offers a considerable advantage in efficiency over other types of LADARs, especially flash LADARs, where short laser pulses are used to illuminate the entire scene at relatively long intervals. The advantage comes from the fact that in the present invention the laser is energized either continuously, or with a fairly high duty cycle: for example, a LADAR of the present invention using 10 ns pulses per pixel and generating 18M data points per second would have a duty cycle of approximately 35%. A flash LADAR using the same 10 ns pulses, and having the same frame rate of 60 fps, would have the laser duty cycle of only 0.00006%. Consequently, to generate the same average power and attain comparable range, the laser of that hypothetical flash LADAR would need instantaneous power almost 6 orders of magnitude greater. While pulsed lasers capable of producing very short powerful pulses do exist, they are known to have lower efficiency, larger size and higher cost than continuous lasers of the same average power. Aside from inability to deliver high average power, pulsed sources are typically less efficient, more complex, bulkier and costlier, than continuous or high-duty sources. The general physical explanation of lower efficiency is in the fact that the emitted power of photonic sources—lasers or LEDs—is typically proportional to the current, while parasitic losses on various ohmic resistances inside those sources are proportional to the square of the current.

Additionally, high-power pulsed laser sources are typically more dangerous in terms of eye safety.

It should be noted, that it is difficult (although not impossible) to place the scanner at the center of the optical system. At any other position, there will be some parallax between the FOVs of the optical transmission and the reception systems, hence the detailed mapping of the pixels onto a scan line will depend on the distance to the target. However, in a practical system such parallax can be kept to a minimum by placing the scanner in close proximity to the optical system.

The present invention as illustrated by the above-discussed embodiments, would provide serious advantages over other types of LADAR.

In a typical imaging LADAR, the light source emits a short pulse which illuminates all pixels at once. Respectively, each pixel receives only a small fraction of the total back-scattered signal. In the proposed hybrid, only one pixel receives all the back-scattered light emitted at a given moment. If we assumed that the illumination power is the same, then the signal strength on each pixel would be up by a factor comparable to the number of pixels, i.e. hundreds, if not thousands. In practice, pulsed sources generally have higher instantaneous power than continuous ones, but their average power is still considerably lower.

Conversely, in a typical scanning LADAR, at any given moment only a small portion of the photo-detector is receiving any signal, while the rest only generates noise and contributes to unwanted capacitance. The exception is so-called retro-reflective scanners, where a small detector FOV is directed through the same scanning system. However, this approach only works with large, slow scanners, where the mirrors are large enough to provide sufficient optical collection area for back-scattered light. Contrarily, high-speed scanners are usually tiny, just sufficient to fit the beam of the laser, and are usually of the order of 1 mm.

In either case, as illustrated above, a hybrid appears would have a considerable SNR advantage: higher signal than imaging-only, or lower noise than scanning-only device.

It is anticipated that a hybrid LADAR of the present invention will be able to use a regular laser diode as its illumination source—which is by far the cheapest and most efficient source among those suitable for LADARs.

Also, both cost and power consumption are roughly proportional to the total number of pixels fabricated by a given technology. So, substituting a 2D array by a 1D array is supposed to considerably reduce both cost and power consumption for the detector array, while the cost and power consumption of both fast and slow scan stages may be considerably lower, than that of the array of pixels or the illuminating laser.

The above embodiments, which were originally disclosed in Applicant's patent application Ser. No. 15/432,105, now issued as U.S. Pat. No. 10,571,574, describe LIDAR/LADAR systems wherein a laser beam is scanned by a mirror oscillating about a single axis and directed towards a target, and the light reflected off the target is imaged by a 1D sensor array. The scanner quickly scans the laser beam and therefore the reflected image from the target falls on any given pixel in the array for a very short time. This arrangement eliminates the need for fast pulsing of the lasers thereby drastically simplifying the laser.

There are other issues with LIDAR systems that are addressed by the embodiments disclosed hereinafter. However, to better appreciate some of those issues and solutions, which are subsequently described in a "LIDAR Embodiments" section, a "LIDAR Theory of Operation" section is hereinafter provided.

LIDAR Theory of Operation

The polar coordinate system $\varphi$-$\theta$, as depicted on FIG. 9A, will be used in the following description. With respect to the description of LIDAR elements in a given rotational position, Cartesian x-y-z coordinates will be used, and will assume that the z-axis is horizontal and pointing generally in the azimuthal direction of the laser light.

Figure 9B:
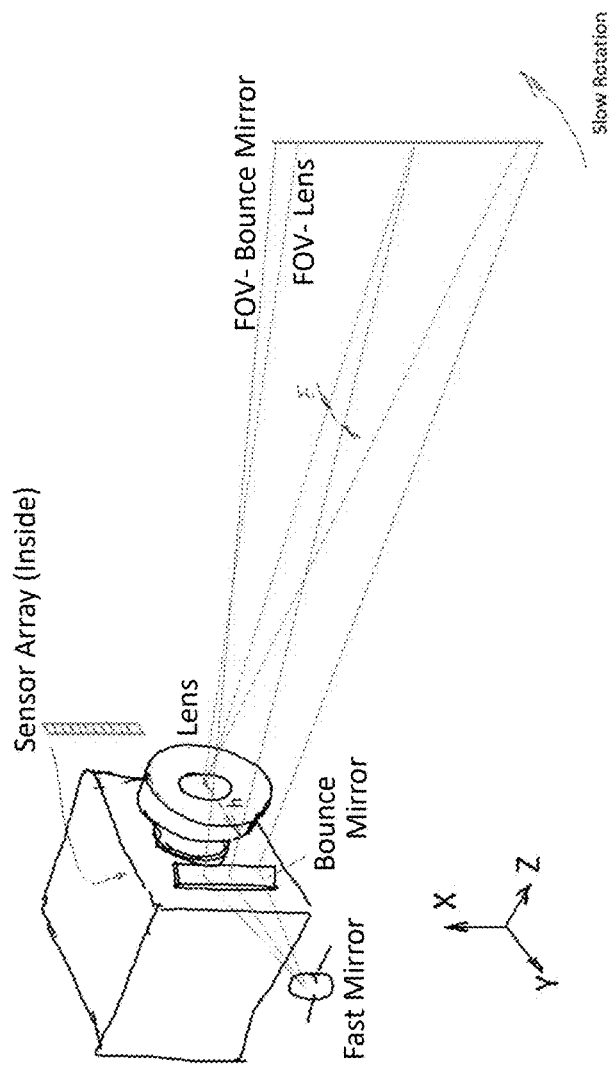
FIG. 9B illustrates a general layout of a LIDAR system.
Figure 9A:
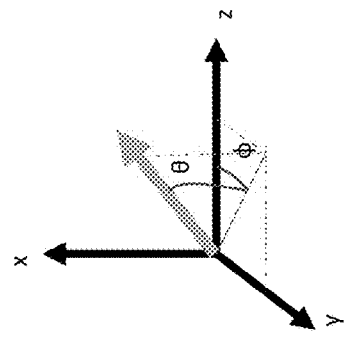
FIG. 9A illustrates an R-θ-Φ coordinate system, and an X-Y-Z Cartesian coordinate system.

The general layout of the LIDAR system is presented in FIG. 9B.

The LIDAR system reflects a collimated laser beam off a fast scanning MEMS mirror to form a narrow tall vertical laser field of view (L-FOV) in the x-z plane. A second, much slower pivoting motion sweeps the L-FOV around the x axis.

The laser is continuously on while the beam is scanned within the laser field of view (L-FOV). The laser spot profile is Gaussian with a spot size largely determined by the size of the fast scan mirror.

A linear sensor array and lens combination also forms a narrow tall vertical sensor field of view (S-FOV), which is nearly coincident with the L-FOV. The planes of S-FOV and L-FOV are both vertical, but slightly tilted toward each other, intersecting at a small angle of convergence δ. The heights (i.e. the X-coordinates) of the origin points of both the L-FOV and S-FOV are the same, so there is no vertical parallax between them. However, there is some parallax h between the origin points in the horizontal direction.

Each pixel of the sensor array images a small FOV within the entire S-FOV. If an object is illuminated with the scan beam, it reflects some laser light back towards the sensor. A focusing lens focuses this energy onto one (or more) sensor pixels. In the vertical direction, the L-FOV is slightly larger than S-FOV, thus ensuring that every pixel is illuminated during each laser scan.

Fast Scan (Vertical)

The scan mirror may be a resonant MEMS structure which oscillates at the frequency $f_1$, and the mechanical amplitude A/2. The optical scan position is twice the mechanical scan position, so the deflected laser beam has the scan amplitude of A. Assuming that in the neutral position of the scan mirror, the laser beam is directed out at the elevation angle $\theta_0$, as a function of time, the elevation angle is:

$$\theta(t) = \theta_0 + A*\sin\left(\omega_1*t - \frac{\pi}{2}\right), \text{ where } \omega_1 = 2*\pi*f_1 \quad (1)$$

The phase offset of π/2 is introduced for convenience, to begin the cycle at t=0, while the scan mirror is in its lowermost position.

The vertical scan velocity is:

$$\theta'(t) = \frac{d\theta(t)}{dt} = A*\omega_1*\cos\left(\omega_1*t - \frac{\pi}{2}\right) \quad (2)$$

As evident from (2) the scan velocity diminishes toward the ends of the scan line. To avoid scanning across some pixels at very low velocity, the mechanical scan angle is chosen so that the L-FOV is smaller than the total optical scan angle 2*A, and the laser is switched off outside of L-FOV.

The elevation angle of the FOV of each individual pixel of the sensor array is defined by the pixel's position x, and lens's focal distance FL. Assuming that the center of the array, i.e. x=0, corresponds to the same elevation angle θ0 of the center beam of the scan:

$$\theta(x) = \theta_0 - \operatorname{atan}\left(\frac{x}{FL}\right) \quad (3)$$

Combining (3) and (1), we can determine the time moment when the laser beam is at the same elevation angle as a given pixel, i.e. θ(t)=θ(x):

$$\theta_0 + A*\sin\left(\omega_1*t - \frac{\pi}{2}\right) = \theta_0 - \operatorname{atan}\left(\frac{x}{FL}\right), \text{ or} \quad (4)$$

$$t(x) = \frac{1}{\omega_1}\left(\operatorname{asin}\left(-\frac{1}{A}\operatorname{atan}\left(\frac{x}{FL}\right)\right) + \frac{\pi}{2}\right) \quad (5)$$

Referring to t(x) as Time of Departure (ToD) for a pixel at position x, as the photons emitted from the laser at that moment may eventually reach the pixel x. Photons emitted at any other moment would either reach other pixels, or be lost. Therefore, if the pixel at position x registers a return pulse at $t_{ToA}$, the distance to the target d at the elevation θ(x) would be:

$$d(\theta)=(t_{ToA}-t(x))*c, \quad (6)$$

where c is the velocity of light in air.

It is assumed that a sync pulse will be sent from the mirror control sub-system to the sensor at some known moment, for example, at t=0, i.e., a lowermost point of the scan. This pulse will start the individual pixel ToA counters, that will be stopped by the arrival of the return light pulses. Then, the target distances for each pixel will be calculated using (6).

The scanned laser beam passes through each elevation angle θ twice per cycle: on the way up and on the way down, with its own departure time t(x) in each case. Respectively, each pixel in the array also receives two pulses per cycle, both of which should be processed according to (6). The equation (5), however, for down scan takes the form:

$$t(x) = \frac{1}{\omega_1}\left(\frac{3*\pi}{2} - \operatorname{asin}\left(-\frac{1}{A}\operatorname{atan}\left(\frac{x}{FL}\right)\right)\right) \quad (7)$$

Figure 18:
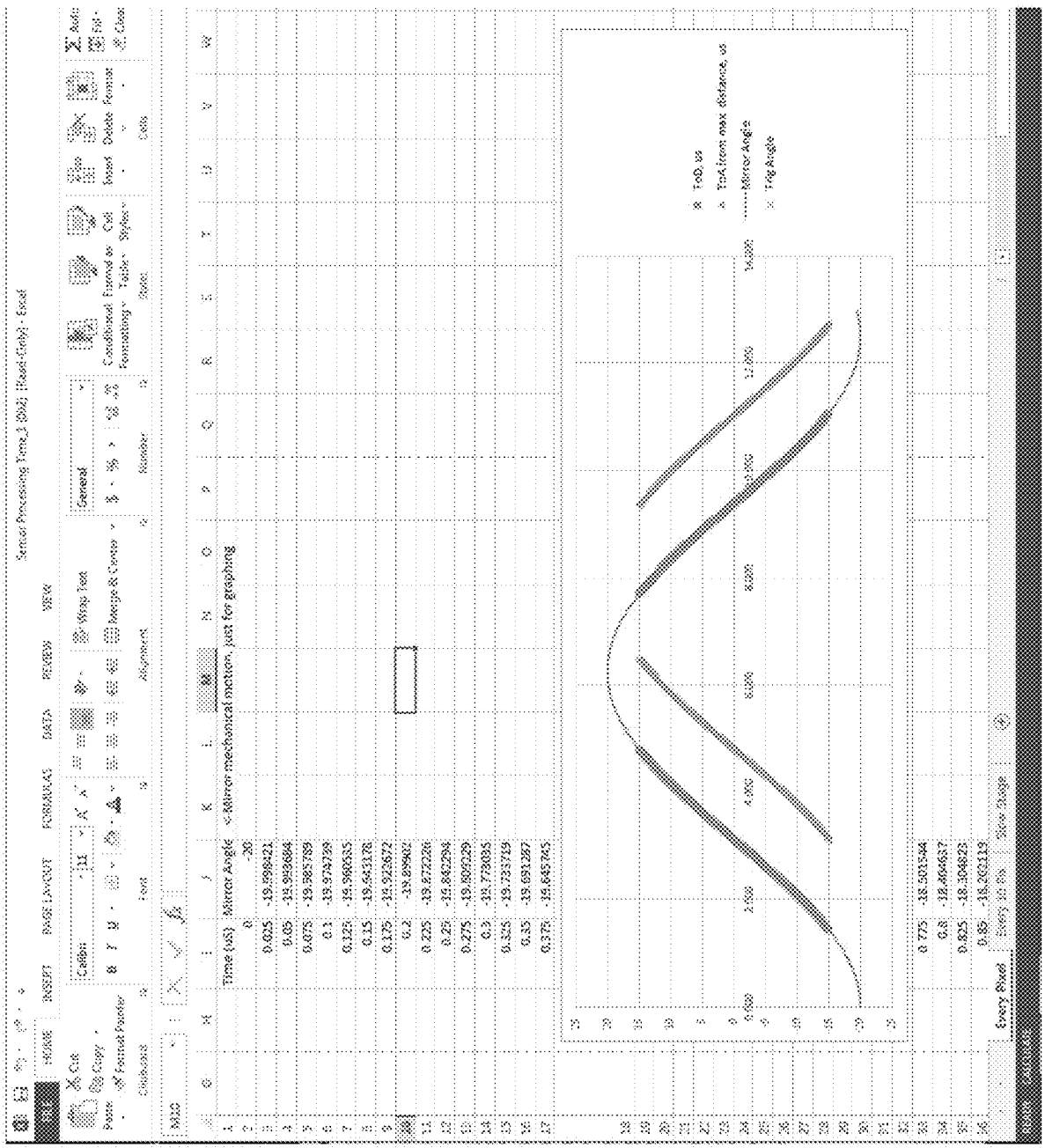
FIG. 18 illustrates a spread sheet that represents the position and timing of two optical pick-off sensors.

As seen in FIG. 18, the spreadsheet <Sensor Processing Time_1.xlsx> offers a numerical illustration of the above equations, for S-FOV equal to +/−15 deg. The maximum scan angle of the mirror is +/−20 degrees with the laser being on for slightly more than +/−15 degrees (L-FOV), and off for the rest of the scan. Column D contains Departure Times calculated according to (5) and (7). Column E contains Time of Arrival (ToA) from maximum distance. In reality, each pixel sees a return pulse somewhere in-between ToD and ToA from maximum distance.

As noted, all times are referenced to the lowermost point of the scan.

Note that for every pixel, there is a minimum "quiet" interval between the latest possible ToA during up-scan, and the ToD (and hence, the earliest possible ToA) during subsequent down-scan. This interval is the shortest for the last pixels of the array, being ~1.3 us.

Additionally, this spread sheet represents the position and timing of two optical pick-off sensors, generating triggers for the fast mirror control. Those sensors are responsible for precise motion control of the fast mirror, and facilitate the generation of the sync pulses, but don't directly affect the LIDAR operation as described above.

Slow Scan (Horizontal)

While the fast mirror scans in vertical direction as described above, a slow rotary stage with frequency $f_2$ provides continuous constant-velocity motion around the vertical axis X, so the azimuthal angle φ of the vertical plane containing L-FOV can be expressed as:

$$\phi(t)=\omega_2*t, \text{ where } \omega_2=2*\pi*f_2 \quad (8)$$

The slow rotation is synchronized with the fast scan, so $$f_2 = \frac{f_1}{N}, \quad (9)$$

where N is a large integer.

Figure 9D:
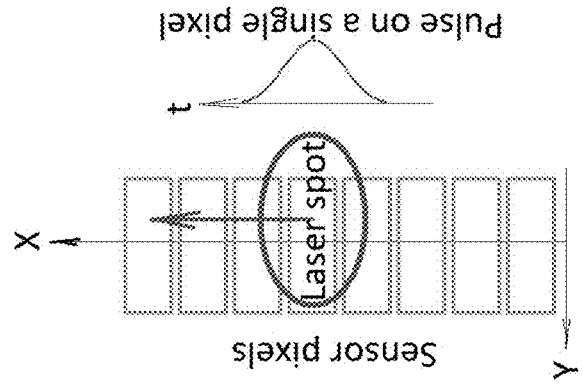
FIG. 9D illustrates a scanned laser spot.
Figure 9C:
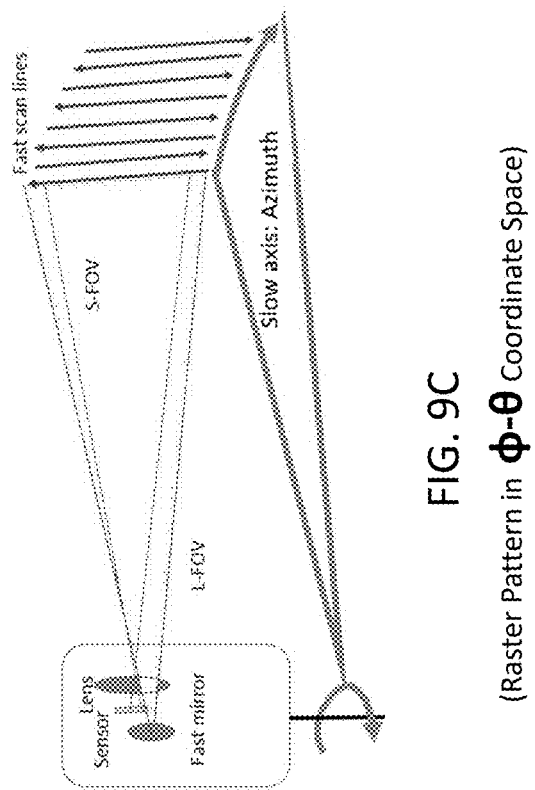
FIG. 9C illustrates a scanned raster pattern in Φ-θ coordinate space.

Such synchronization assures a repeatable raster pattern in φ-θ coordinate space, as illustrated on FIG. 9C. Assuming there is a target within the working range of the LIDAR, each pixel of the sensor receives a return pulse during each scan line, i.e. 2 pulses per each fast mirror cycle.

The scan pattern on FIG. 9C represents the position of the center of the laser spot. However, the laser beam, while notionally-collimated, has finite divergence due to diffraction, and therefore, forms a spot of some shape and size on the target, which moves as the laser beam scans the target. Then, the lens images such moving spot onto the sensor, where it also moves, as illustrated on FIG. 9D, forming pulses of finite duration on the pixels it crosses. While the precise shape of those pulses cannot be described analytically, some "semi-qualitative" explanations are below.

First and foremost, the laser spot moves up and down the sensor array with the fast scan, as shown of FIG. 9D. Since both L-FOV and S-FOV are rotating together and the angle between them does not change, the spot trajectory along the sensor array is generally straight and parallel to the long axis of the array (X-direction). However, the spot position in the Y direction changes with target distance, for two reasons:
1. Once the light leaves the fast mirror, it travels straight to the target, in the plane that was occupied by L-FOV at that moment. However, while the light travels to the target and back, the S-FOV continues to rotate, and by the time the return pulse reaches the sensor, it has already turned by some angle $\varphi_d$;
2. There is some parallax h between the origin points of S-FOV and L-FOV. It is generally small, but if the target is relatively close, it leads to a non-negligible angular deviation of the target from S-FOV plane, and respectively, to the linear displacement of the spot on a pixel in y-direction.

Figure 9E:
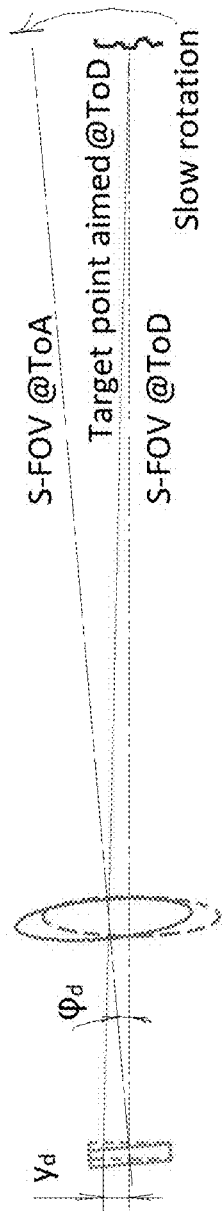
FIGS. 9E and 9F illustrate aspects of the scanner FOV and the laser FOV.
Figure 9F:
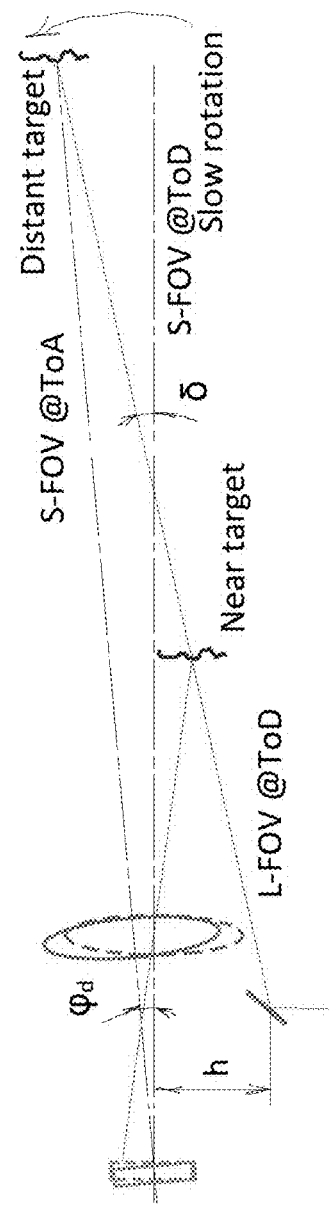

These two effects are illustrated on FIGS. 9E and 9F respectively, showing the top view (z-y plane) of the LIDAR system. Dotted lines show the lens and sensor orientation at the Time of Departure, i.e. the moment when the fast mirror had the same elevation as the depicted pixel. It does not matter exactly which pixel and what elevation those are.

$\varphi_d$ can be expressed as:

$$\phi_d = \omega_2 * t_d = \omega_2 * \frac{2*d}{c}, \quad (9)$$

where d is the distance to the target from which the pulse returned, and $t_d$ is the round-trip ToF to that distance. Respectively, the Y-position of the spot on the pixel (FIG. 9E), would shift by:

$$y_d = FL * \phi_d = FL * \omega_2 * \frac{2*d}{c} \quad (10)$$

While the magnitude of $y_d$ on FIG. 9E is exaggerated with respect to the y-size of the pixel, it is still important to center the image of the laser spot on the pixel when the target is far away, and the return signal is the weakest. Therefore, the angle of convergence δ between S-FOV and L-FOV is chosen in such a way, that the light bouncing from the most distant target would land in the center of the pixel, taken into the account the turn of the S-FOV during the round-trip ToF:

$$\delta = \phi_d + \frac{h}{d} = \omega_2 * \frac{2*d}{c} + \frac{h}{d} \quad (11)$$

Numerically, these relationships are illustrated in the Slow Stage sheet of <Sensor Processing Time_1.xlsx>.

FIG. 9F shows this convergence angle, as well as the effect of the parallax: when the target is relatively near, the image of the laser spot is pushed toward the edge of the sensor and beyond, so at some point it falls off the sensor completely, limiting the short-end range of this type of LIDAR.

Additionally, when the target is sufficiently close, the image of the laser spot on the sensor is getting defocused, and therefore growing larger, since the sensor lens is focused at or near infinity. FIGS. 9G, 9H, 9J, and 9K qualitatively illustrate the laser spot on the sensor at different target distances.

There is only one target distance at which the laser spot is centered on the sensor and the light collection is maximized (FIG. 9J). At any other distance, the spot tends to shift to the right due to the two effects described above, however, this shift is relatively small except for very short distances. So, for distances shorter than maximum, the reduction in light collection is compensated by generally stronger signals, while for distances beyond maximum, the signal would be insufficient anyway.

LIDAR Embodiments

Figure 10:
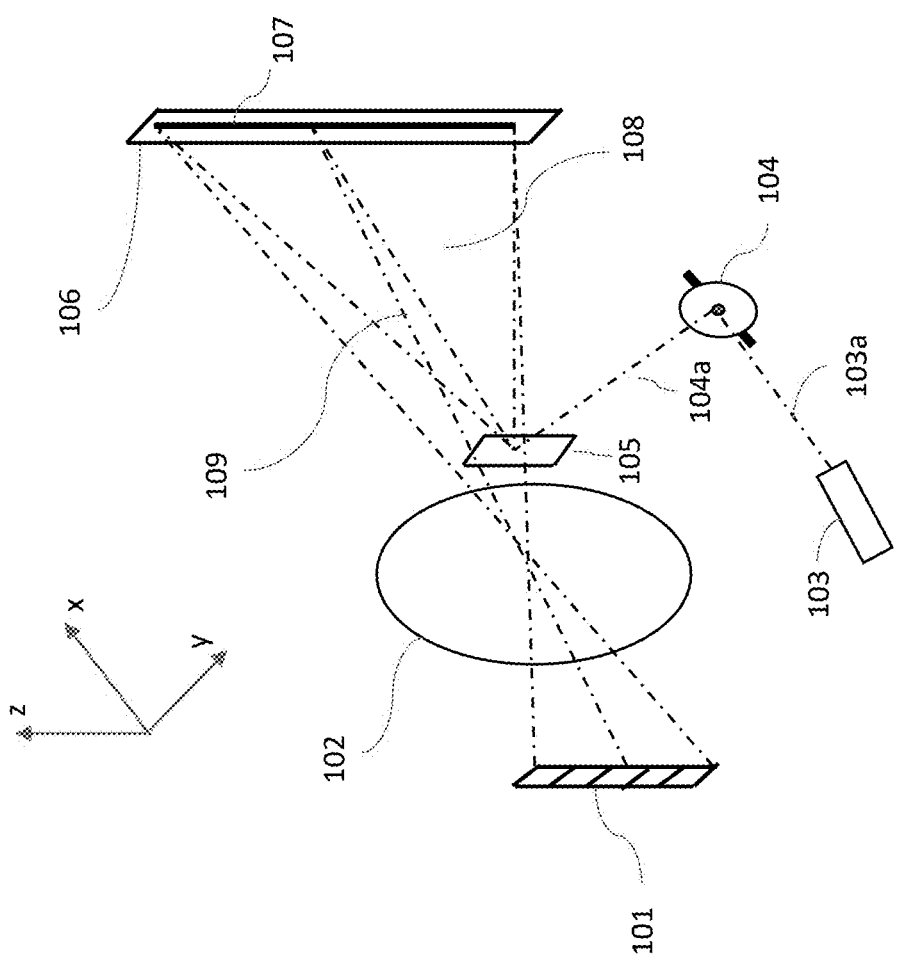
FIG. 10 is a perspective view of one embodiment of an optical system usable in a LIDAR system as disclosed herein, in which the light origin point is directly centered on the target and centered on the sensor array, which may result in parallax.

FIG. 10 is a perspective view of one embodiment of an optical system of a LIDAR system of the present invention. A laser 103 projects an unscanned beam 103a towards a scanning mirror 104 that oscillates about the x-axis, which in turn reflects a scanned beam 104a towards mirror 105 which in turn reflects the scanned laser beam 108 forming a laser scanned line 107 on the target 106. Mirror 105 may be a fold mirror, to make the optical path longer than the size of the optical system. The sensor's field of view with respect to the portion of the target 106 to be imaged is defined by rays 109, which image is received through lens 102 onto a linear sensor array 101. (Note—the lens 102 may be an imaging objective or imaging lens, and may be a single lens or a series of such lenses that focuses the spot on the sensors of the linear array).

In FIG. 10 the laser scanned line 107 is shown being substantially centered on the sensor field of view on target 106. But this arrangement poses problems for LIDAR systems, particularly for one that may be utilized in a moving vehicle where the distance of objects in the vehicle path often vary significantly (e.g., another car suddenly cutting cross-wise across its path/traffic lane), as described above in the LIDAR Theory of Operation section, and which may occur almost instantaneously. One serious problem is that such an event could suddenly cause so much reflected light to be received by the sensor array that the intensity causes damage to the sensors.

For a LIDAR system, it is disadvantageous to have the optical reception path and the optical transmission path for the laser beam of the system be substantially identical (e.g., being co-axial), as objects in the transmission path (e.g., the mirror 105) may also block some portion of the light in the reception path (e.g., blocking some of rays 109—see FIG.

10). Plus the LIDAR system needs to "see" (i.e., image and determine range) from between one meter to about 200-250 meters, and to also reduce or even eliminate parallax.

The LIDAR system embodiments disclosed hereinafter are particularly configured to address these and other issues.

Figure 10B:
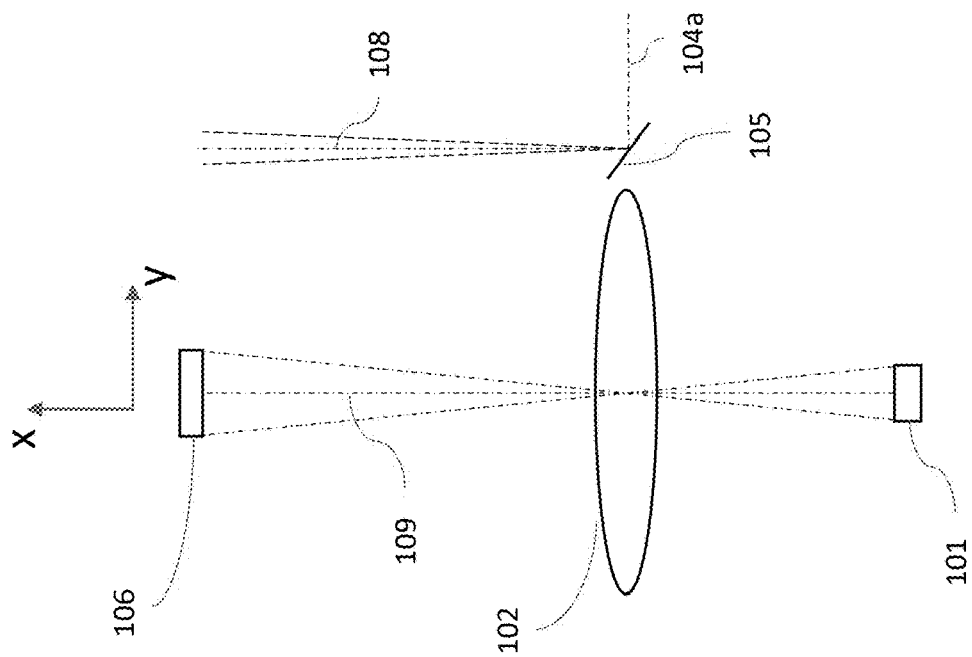
FIG. 10B is a top view of the optical system as shown in FIG. 10A.
Figure 10A:
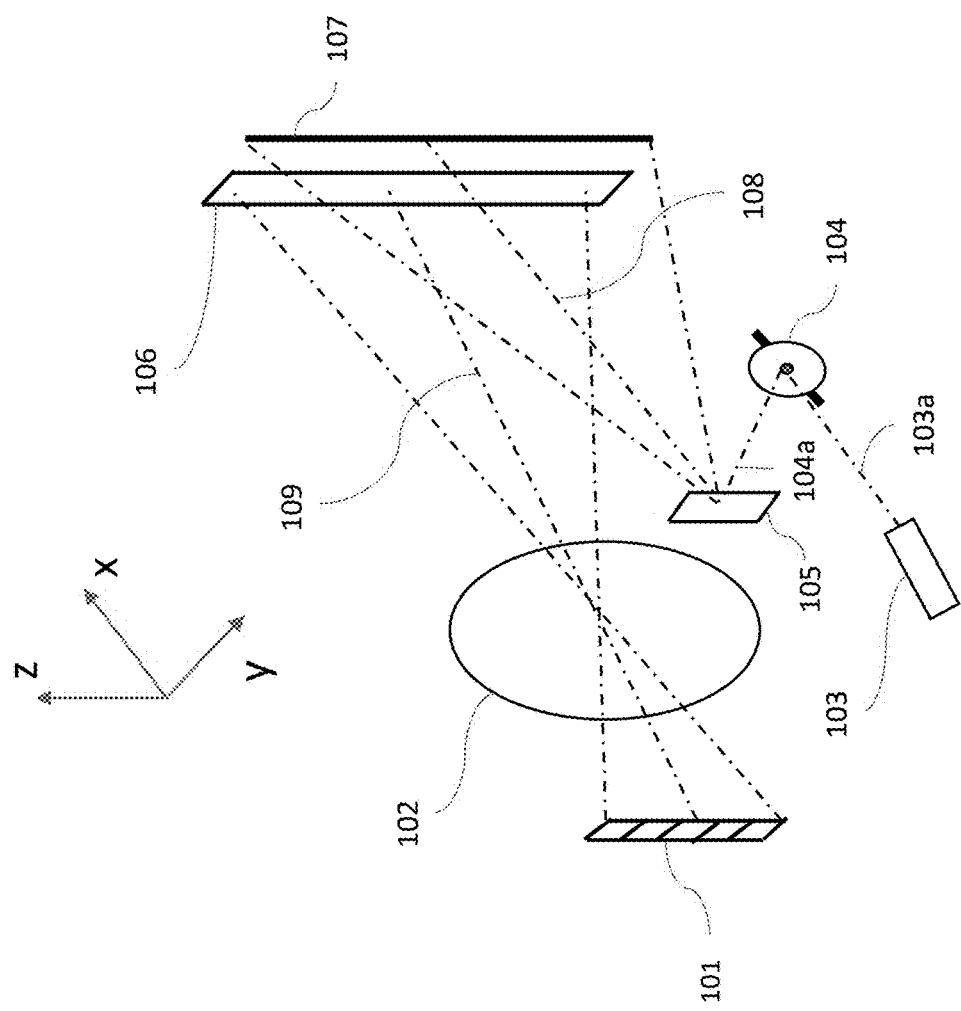
FIG. 10A is the perspective view of FIG. 10, but is shown with the center of the laser-scanned line being offset from the field of view of the sensor with respect to the target.

FIG. 10A shows the optical system of FIG. 10, and FIG. 10B is a two-dimensional image of the optical system of FIG. 10A viewed along the Z axis perspective; however, the arrangement in each of FIG. 10A and FIG. 10B show the scanned laser beam 108 being scanned parallel to the x/z plane with the center of the laser scanned line 107 being somewhat offset from the sensor field of view on target 106. In practice, the scanned laser beam 108 diverges in the direction of the y-axis and z axis (which divergence is shown in FIG. 10B), so as the distance to the target increases, the scanned laser beam increases in size and may partially cover (i.e., may bleed into) the sensor field of view on target 106 when the target is at a sufficient distance away. However, the portion of the scanned laser beam 108 that does not fall on the sensor field of view on target 106 provides no benefit to the LIDAR system. When the distance to the target is reduced, and the amount of overlap is reduced such that none of the scanned laser beam 108 falls on the sensor field of view on target 106, the LIDAR system is essentially blind to objects because of the short distances.

As described, the offset shown in FIG. 10B between the sensor field of view on target 106 and the laser scanned line 107 may be problematic (depending upon the distance of the object from the LIDAR system), and FIG. 10C to FIG. 10J are various embodiments that address this issue, irrespective of the object-to-LIDAR system distance.

Figure 10E:
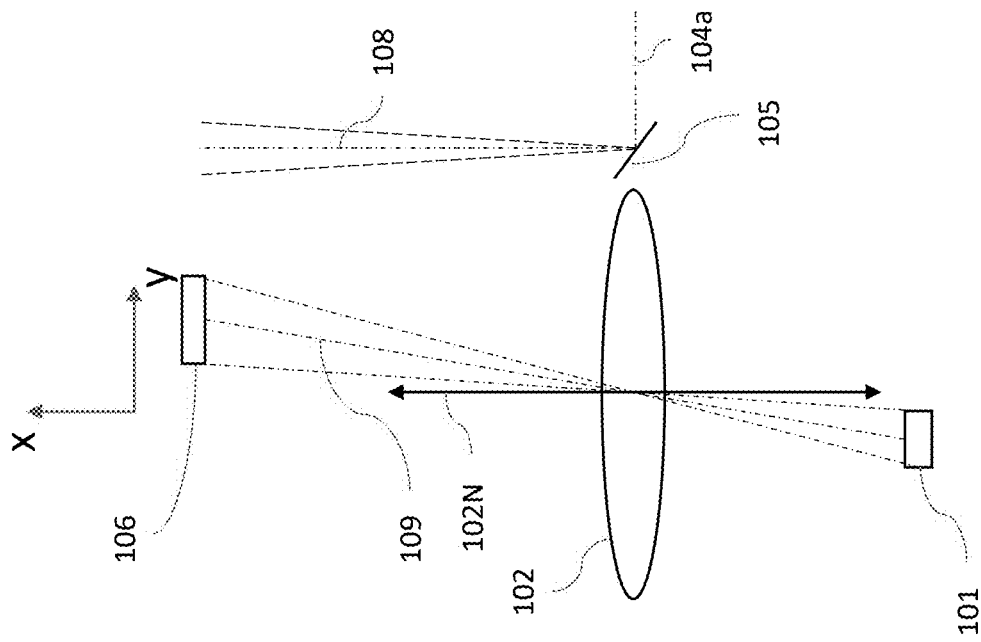
FIG. 10E shows the portion of the optical system seen in FIG. 10D, but where the fold mirror is positioned well outside the field of view of the lens, and the linear sensor array is also positioned offset relative to the normal vector of the lens.
Figure 10D:
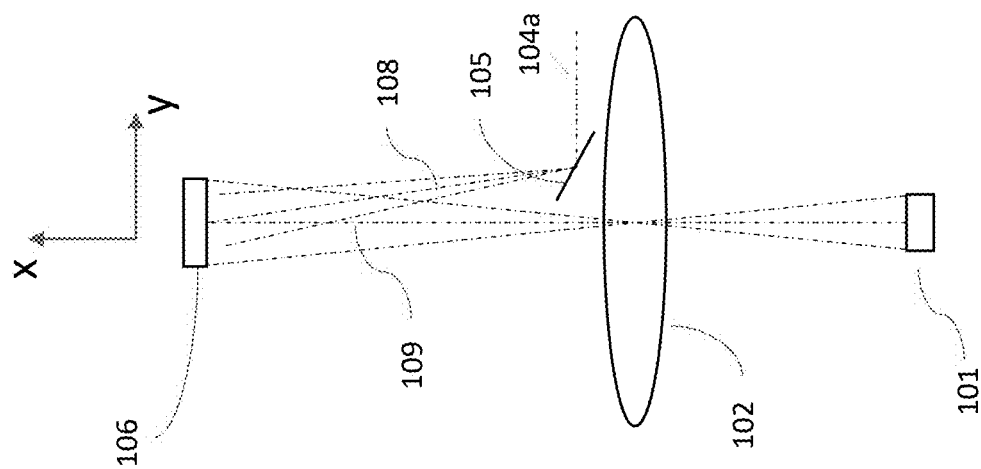
FIG. 10D shows the portion of the optical system seen in FIG. 10C, but where the fold mirror is angled so that the scanned laser beam converges with the sensor field of view.
Figure 10C:
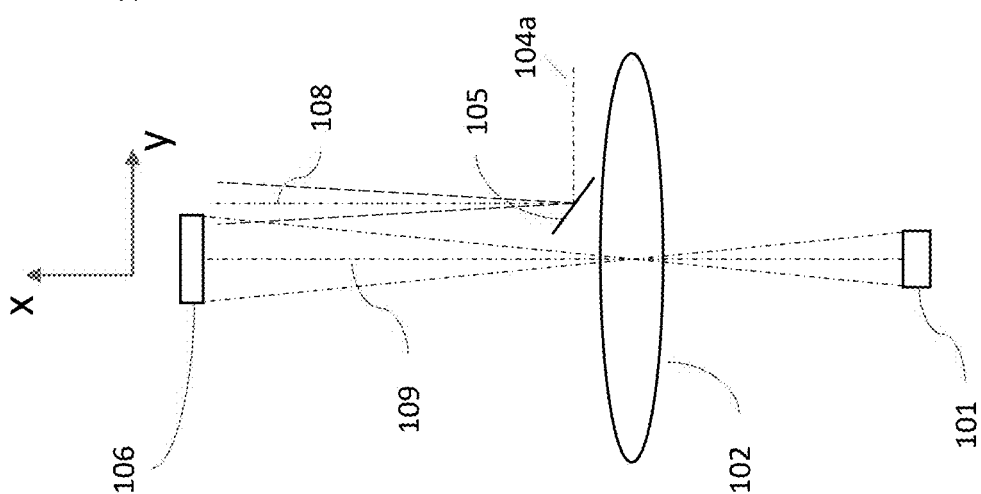
FIG. 10C shows a portion of the optical system of FIG. 10B, in which the fold mirror is moved to a position in front of the lens and is appropriately angled so that the scanned laser beam remains parallel to sensor field of view.

In FIG. 10C, the fold mirror 105 is moved to a position in front of the lens 102 and is appropriately angled so that the center of the scanned laser beam 108 remains parallel to sensor field of view shown by rays 109 (thereby eliminating any parallax issues), however, the distance between the two parallel beams is smaller than that shown in FIG. 10B. Accordingly, given the position of the fold mirror 105 and the described beam divergence, some portion of the diverging scanned laser beam 108 falls on the sensor field of view with respect to target 106, and the mirror does not block reflected light in the reception path. Note that the origin point of the light from the mirror 105 is not on the center (i.e., the normal vector 102N) of the lens 102).

FIG. 10D is a further embodiment of the present invention wherein the fold mirror 105 is angled so that the scanned laser beam 108 converges with the sensor field of view rays 109 at some target distance from lens 102. This distance can be, for example, the maximum working range for the product, for example 200 meters. This would maximize the amount of the scanned laser beam 108 which falls on the sensor field of view (rays 109) at the systems maximum distance. However, this approach is disadvantaged in that the fold mirror 105 may block some of the return signal to the lens 102, and when the distance to the target is reduced, the misalignment increases.

FIG. 10E is a further embodiment of the present invention wherein the fold mirror 105 is positioned well outside the lens 102 field of view and is aligned so the scanned laser beam 108 projects parallel to the normal vector 102N of lens 102. The linear sensor array 101 is also positioned offset relative to the normal vector 102N of lens 102, and as a result of this offset, the sensor field of view (rays 109) is offset in the opposite direction relative to the normal vector of lens 102N. The scanned laser beam 108 converges with the sensor field of view (rays 109) at some target distance from lens 102. This distance can be, for example, the maximum working range for the product, for example 200 meters. This would maximize the amount of the scanned laser beam 108 which falls on the sensor field of view rays 109 at the systems maximum distance. This approach is advantaged as compared with the embodiment in FIG. 10C in that the fold mirror 105 does not partially block the lens 102. However, this embodiment is still disadvantaged in that when the distance is to the target is reduced, the misalignment increases. Note that a combination of the arrangements of FIG. 10D and FIG. 10E could be utilized, wherein the mirror is generally positioned as shown in FIG. 10E to be just beyond the distal edge of the lens 102, but is angled as shown in FIG. 10D to directly light directly at the target and/or to bleed onto the target.

Figure 10G:
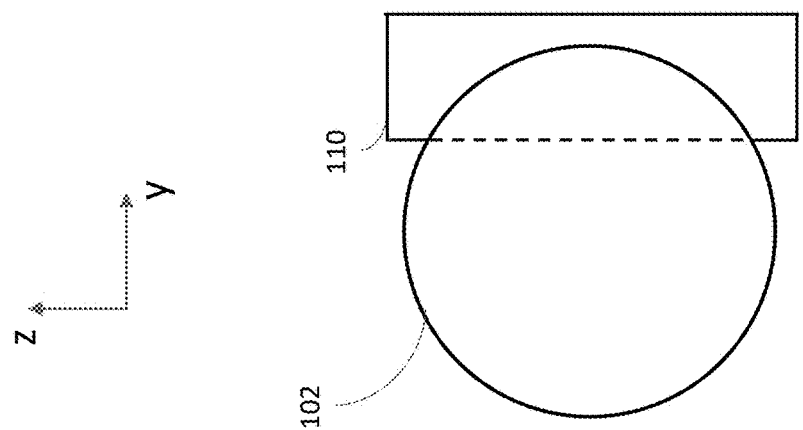
FIG. 10G shows a top view of the main lens and the additional optical element of FIG. 10F.
Figure 10F:
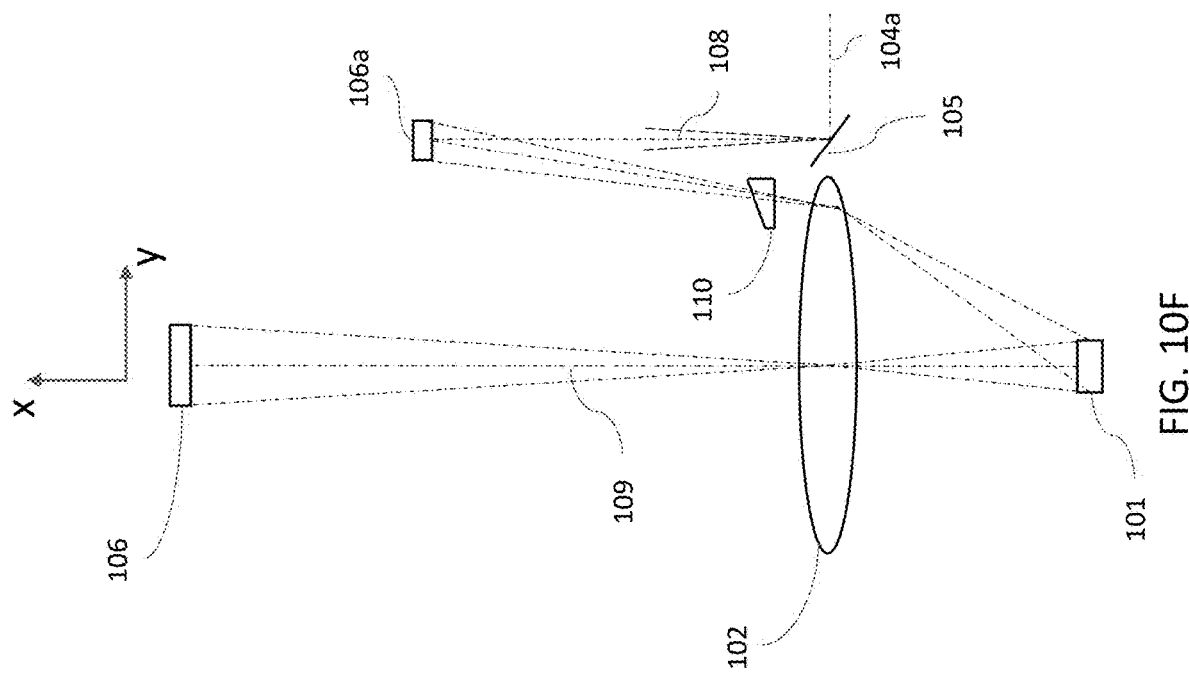
FIG. 10F shows a portion of the optical system of FIG. 10B, in which an additional optical element, such as a negative cylindrical lens, is positioned towards the outside edge of the main lens.

FIG. 10F is a further embodiment of the present invention, which does build in some parallax. Elements 101, 102, 104a, 105, 106, 108, and 109 are all the same as described previously with reference to FIG. 10B. In FIG. 10F, an additional optical element 110, such as a wedge, or negative cylindrical lens, or negative lens with variable cylindrical power, is positioned towards the outside edge of the lens 102 in the direction of the target. (Note that the wedge is shown with a planar surface in FIG. 10F and may instead be a curved surface). This addition optical element 110 creates an auxiliary field of view 106a, scanned light from which would be reflected onto the linear sensor array 101 from nearby targets. This embodiment is advantaged in that when a target is far away from the lens 102, the light reflected from the sensor field of view 106 dominates and very little return is received along the auxiliary field of view 106a. However, when the distance to the target is reduced, the signal along the auxiliary field of view 106a increases, and when the distance gets very short, only the signal along the auxiliary field of view 106a is reflected on the linear sensor array. In this embodiment, appropriate signal is received by linear sensor array 101 over the entire working range of the device. As an example, the additional optical element 110 can be a negative lens, with curvature in the direction perpendicular to the scan direction. The additional optical element 110 can have a width of 7.5 mm and cover ¼ of the main lens 102 (note that as illustrated in FIG. 10F and FIG. 10G, the additional optical element 110 only is shown to cover about one-eighth of the lens 102). The main lens 102 can be focused at 30 m, roughly its hyperfocal distance. The field of view on the target through the additional optical element 110 is offset from the main lens 102 optical axis by 48 mm and tilted towards the lens by 0.0008 mrad. Note that, as an example, if the center of mirror 105 shown in FIG. 10F is offset two inches away from the rays 109 (i.e., the center of mirror 102), then when the target is at a distance of about 200 meters, the laser spot size from the diverging beam may be about 15 inches, Such large laser spot (e.g., a 5 inch spot, a 10 inch spot, a 15 inch spot, etc. will all fall within the sensor FOV). This arrangement uses the disadvantage of the parallax to the benefit of the system, by also allowing the arrangement to take in less light from closer objects.

FIG. 10G shows the lens 102 and the additional optical element 110 as viewed from the perspective of the x-axis. As a further embodiment of the present invention, the transparency of the additional optical element 110 can be reduced, thereby reducing the collection efficiency at close range. This approach can prevent excessive signals from being received at the linear sensor array 101 when the target is extremely close and therefore the reflected signal is very strong.

Figure 10J:
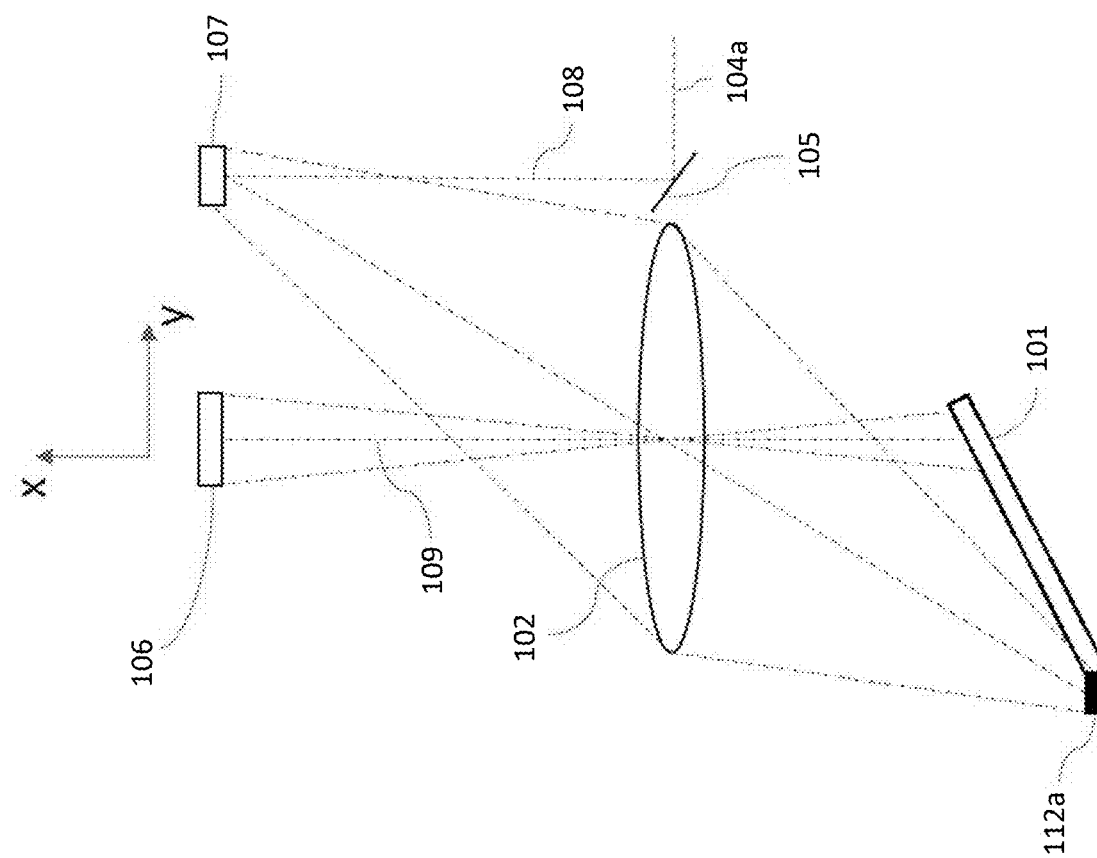
FIG. 10J an embodiment where the sensor is both extended and tilted in the direction of the focused image from the nearby target, such that the light from the target at any range reaches the sensor in a nearly-focused state.
Figure 10H:
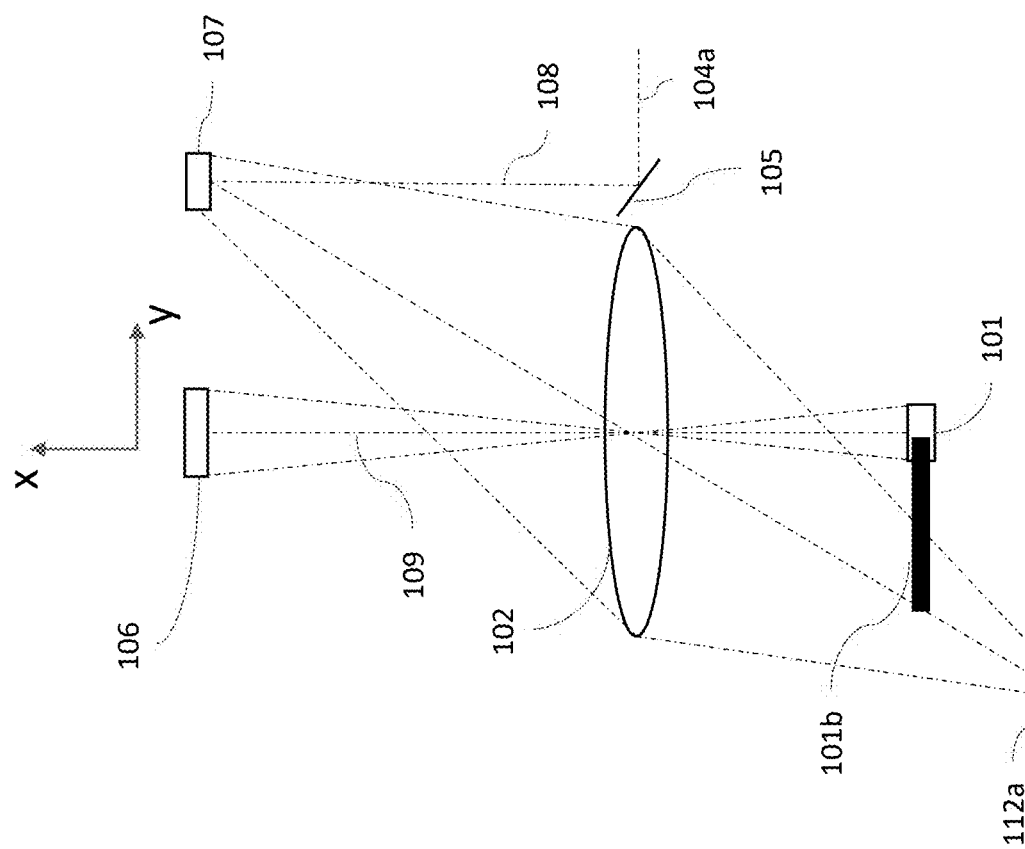
FIG. 10H illustrates the portion of the optical system seen in FIG. 10B, in which the linear sensor array is positioned for light reflected from the main target is focused by the main lens upon the linear sensor array, and light reflected off of a secondary target passes through the main lens, and is defocused at the linear sensor array but is focused at a distal location.

Referring to FIG. 10H, the linear sensor array 101 is positioned such that light reflected from the sensor field of view on target 106 is focused by lens 102 upon the linear sensor array. The light of the laser scan line that is reflected off of target 107 thereafter passes through lens 102, and is defocused at the linear sensor array 101 but is focused at location 112a, which is non-overlapping with the sensor 101. However, as long as the sensor 101 at least partially extends into the defocused light collected from the target 106, it would be able to register the reflected pulse, as the total amount of light collected from a nearby target would be much greater.

FIG. 10J further illustrates an embodiment where the sensor 101 is both extended and tilted (angled) in the direction of the focused image 112a, away from the nearby target 106. In this embodiment, the light from the target at any range reaches the sensor in a nearly-focused state. Additionally, due to more light being collected from nearby targets, the sensitivity of the sensor may be arranged to gradually drop toward its tilted back side. This arrangement simultaneously corrects for offset and the focusing. (A problem with a fixed focused lens is that as the object(s) get closer and closer, not only is the alignment lost, but so too is the focusing).

Figure 10K:
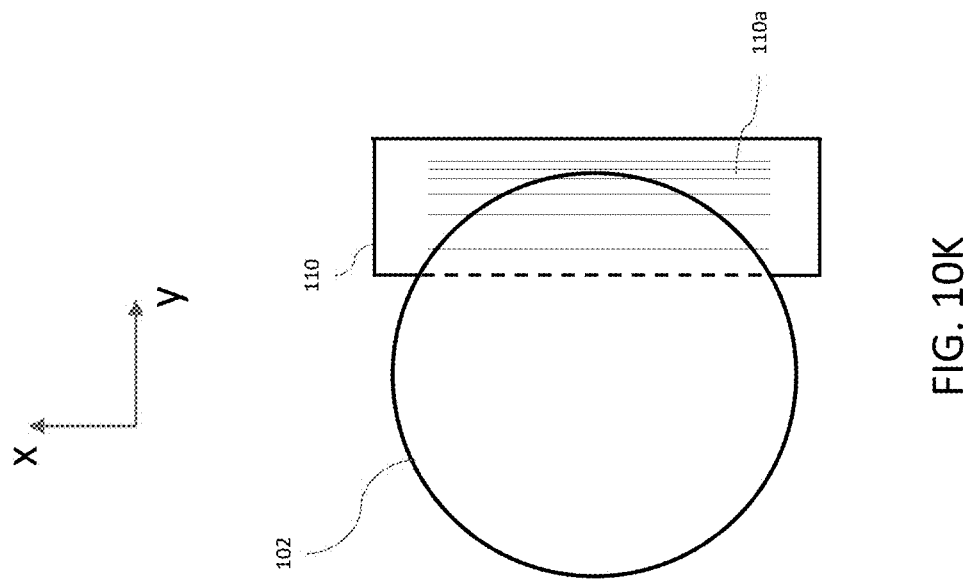
FIG. 10K is an alternative embodiment to that shown in FIG. 10G, wherein the additional optical element has a variable transparency shown by series of lines therein.

FIG. 10K is an alternative embodiment of FIG. 10G wherein the additional optical element 110 has variable transparency (shown by lines 110a). For example, the transparency of the additional optical element 110 can be more transparent in the direction of the center of the lens 102, and becomes less transparent as the distance from the center of the lens 102 increased.

Figure 11A:
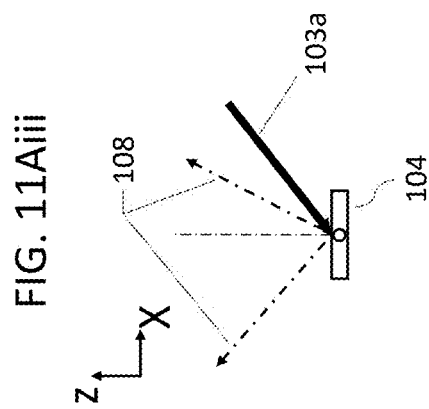
FIGS. 11Ai-11Aiii are a series of orthogonal views showing an unscanned laser beam, a scanning mirror 104, the scanned laser beam, and the resulting laser scan line on the target, where the unscanned laser beam 103a falls solely within the Z-Y plane, where the laser scan line on the target is linear and matches a linear sensor FOV.
Figure 11A:
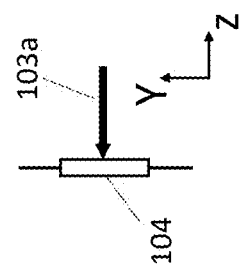
Figure 11A:
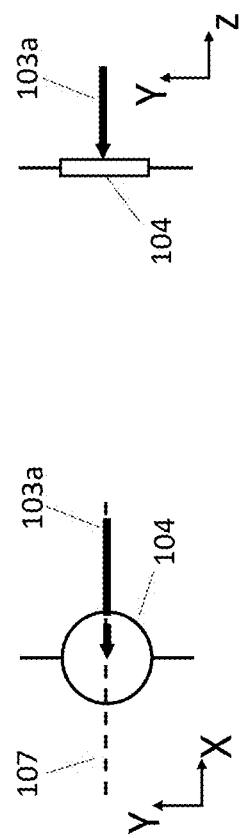

In a scanned LIDAR system, care must be taken to make certain that the shape of the projected scan line on the target 107 matches (i.e., is properly aligned with) the sensor FOV on the target. FIG. 11Ai to FIG. 11E are various embodiments for insuring proper alignment.

FIGS. 11Ai-11Aiii are a series of orthogonal illustrations showing the unscanned laser beam 103a, the scanning mirror 104, the laser scan line on target 107, and the scanned laser beam 108 from FIG. 10Ai. In this example, the unscanned laser beam 103a falls solely within the Z-Y plane (has no X axis component) and hits the mirror 104 at a position along the axis of rotation. This arrangement results in the laser scan line on the target 107 being linear and therefore matches the linear sensor FOV 109 from FIG. 10A, which is desired for the LIDAR system. However, a potential drawback of this type of arrangement is that the scanned laser beam 108 must never be perpendicular to the mirror, to avoid reflecting directly back into the laser 103, therefore the total angle of the scanned laser beams 108 must be substantially reduced to avoid reflecting back into the laser. To expand the angle of the scanned laser beam and avoid this problem, the components may be arranged to always project at an angle to the mirror's normal (i.e., by not projecting perpendicular to the pivot axis), as discussed in the following embodiments (e.g., compare FIG. 11Aii and FIG. 11Bii).

Figure 11B:
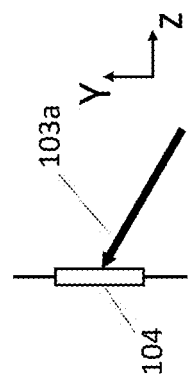
FIGS. 11Bi-11Biii are a series of orthogonal views showing an unscanned laser beam that has a Y-plane offset, a scanning mirror, a scanned laser beam, and the resulting laser scan line on target.
Figure 11B:
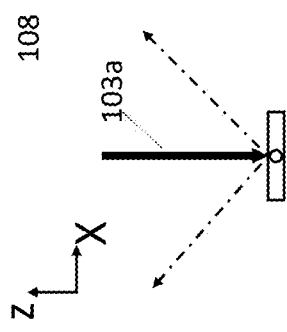
Figure 11B:
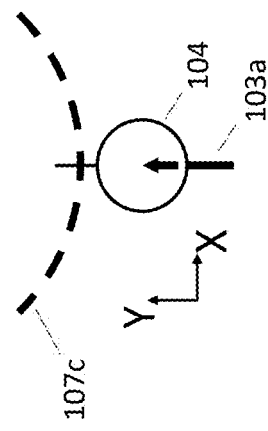
Figure 11D:
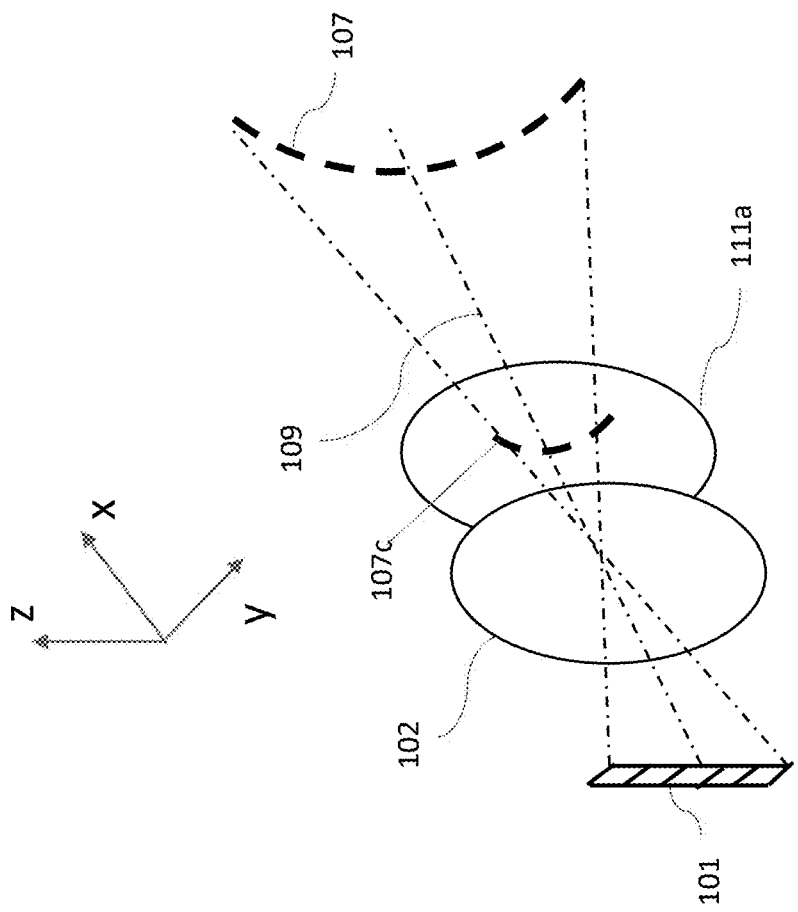
FIG. 11D illustrates the scanning arrangement of FIG. 11C, but where an additional optical element with variable curvature is placed between the lens and the target to correct for the curvature of the scan line transmitted by a lens, to form a curved scan line.

FIGS. 11Bi-11Biii are a series of orthogonal illustrations showing the unscanned laser beam 103a, the scanning mirror 104, the laser scan line on target 107, and the scanned laser beam 108 from FIG. 10A. In this example, the origin of the unscanned laser beam 103a has a Y-plane offset and hits the mirror 104 at a position along the axis of rotation. In this arrangement the scanned laser beam 108 can be symmetrical about the normal of the mirror 104 without reflecting back into the laser 103. However, with this arrangement, the laser scan line on the target 107 is non-linear (a curved ("smiley") shape shown as 107c).

Figure 11C:
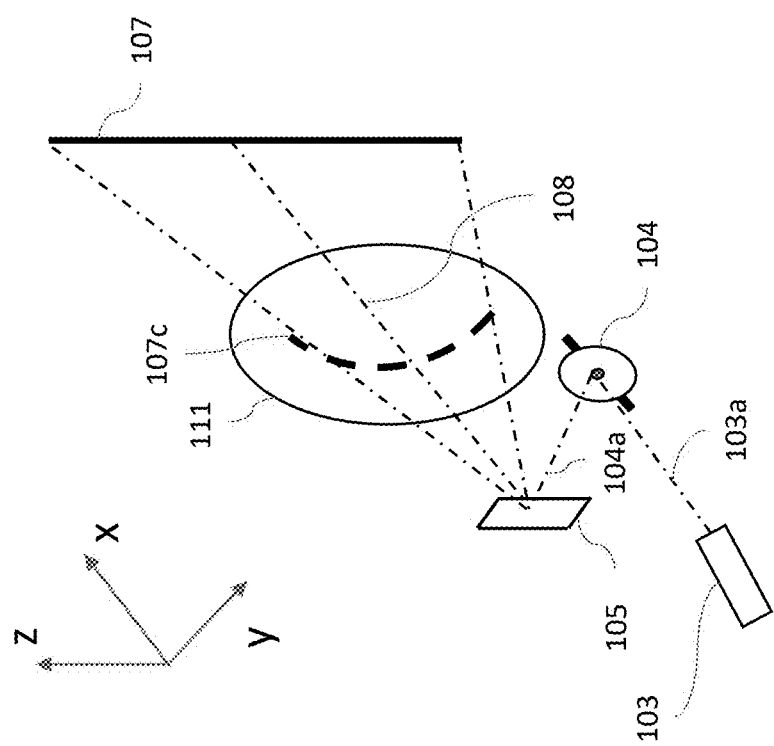
FIG. 11C is an embodiment that is the same as shown in FIG. 11B, but which includes an additional optical element with variable curvature to straighten the curved smiley shaped scan line.
Figure 11E:
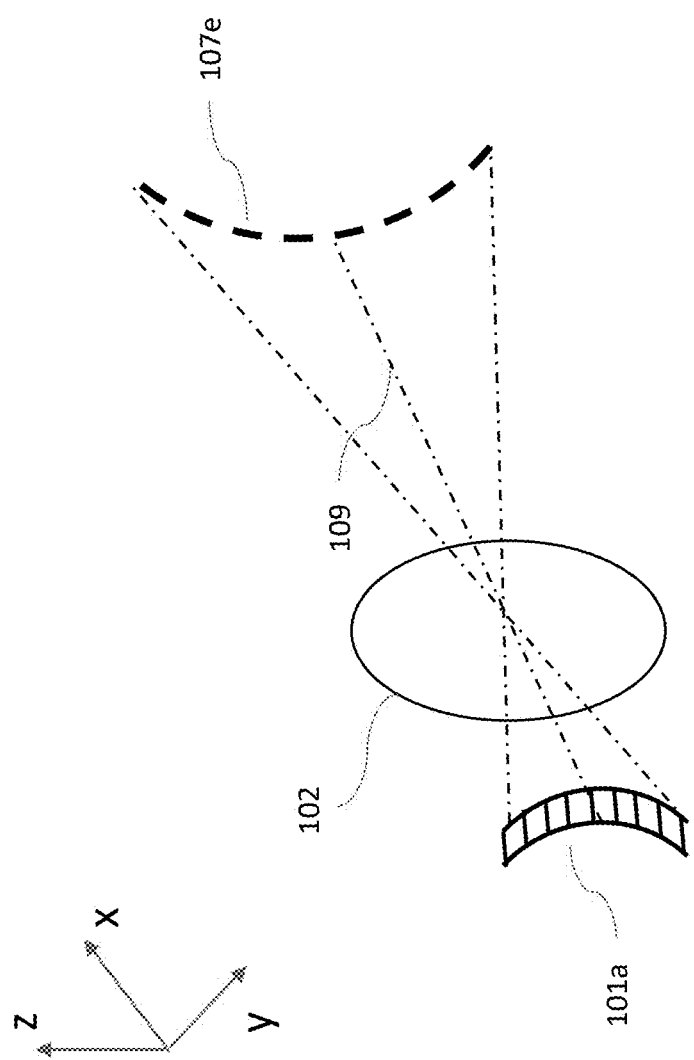
FIG. 11E illustrates the scanning arrangement of FIG. 11B, but where the pixels on the sensor are arranged in a curved pattern to match the curvature of the received reflection of a curved shaped scan line.

FIG. 10C 11C is an embodiment that is the same as the embodiment shown in FIG. 11B, but which includes an additional optical element 102 with variable curvature to straighten the curved smiley shaped scan line 107c into the linear scan line 107 for transmission onto target 106. In this arrangement, the "smiley" is straightened on the outbound path (before reaching the target).

FIG. 11D illustrates the scanning arrangement of FIG. 11C wherein the output is a curved smiley shaped scan line 107c. In this arrangement an additional optical element 11a with variable curvature is placed between the lens 102 and the target and corrects for the curvature of the scan line 107c transmitted by lens 102. Accordingly, the sensor 101 receives a linear reflection of the curved smiley shaped scan line 107C. In this arrangement, the "smiley" is straightened on the inbound path (before reaching the sensor array).

FIG. 11E illustrates the scanning arrangement of FIG. 11B wherein the output is a curved smiley shaped scan line 107c. In this arrangement the pixels on the sensor 101a are arranged in a curved pattern to match the curvature of the received reflection of the curved smiley shaped scan line 107C. In this arrangement, the "smiley" is straightened upon reaching the sensor array, by the configuration of the sensors of the array.

In a LIDAR system, it is desirable to move the mirror 80,000 times per second, and a deterrent to such rapid mirror movement is the mass of the mirror itself. So it is desirable to have the mirror be as light as possible, but it is also undesirable to have the mirror flexing while undergoing such movement. The following embodiments provide improvements to the mirror to better enable the desired mirror speeds.

The Applicant's co-pending patent application Ser. No. 17/000,464, filed Aug. 24, 2020, having the title "Distally Actuated Scanning Mirror," includes a FIG. 8B which describes as a mirror structure wherein material was strategically removed on the backside to reduce its weight.

FIG. 12Ai herein shows such a mirror before processing, where the mirror has been formed out of a silicon on insulator (SOI) wafer, having a handle layer 301a and a device layer 301b. A photo resist mask 303 is deposited at locations where the handle layer 301a is to remain intact. The photo resist mask 303 is not affected by etchants. An etchant 305 is temporally applied and removes a very well defined depth of the handle layer 301a except at the positions where photo resist mask 303 is located. The resulting mirror structure is shown in FIG. 12Aii.

FIG. 12Bi shows the mirror before processing, where the mirror has been formed out of a single layer silicon wafer 302. An oxide mask 304, which etches at a slower rate than silicon, is deposited at locations where the silicon wafer 302 is to remain intact. An etchant 305 is applied and removes the silicon wafer 302 except at the positions where the oxide mask 304 is located. The resulting mirror structure is shown in FIG. 12Bii. In one embodiment, the etchant 305 can be selected such that it etches the silicon 302 at a rate of seven times faster than the rate it that it etches the oxide mask 304.

FIG. 12Ci is an embodiment wherein the mirror shown in FIG. 12Bii is processed a second time. During this second processes step, an oxide mask 304, which etches at a slower rate than silicon, is deposited at locations where the silicon wafer 302 is to remain intact. An etchant 305 is applied and removes the silicon wafer 302 except at the positions where the oxide mask 304 is located. The resulting mirror is shown in FIG. 12Cii. As can be seen, the silicon material removed is at various depths thereby permitting mirror structures that are lighter while maintaining structural integrity. This process can be repeated multiple times to achieve even more variations in the various different depths to which the material is removed.

Figure 12D:
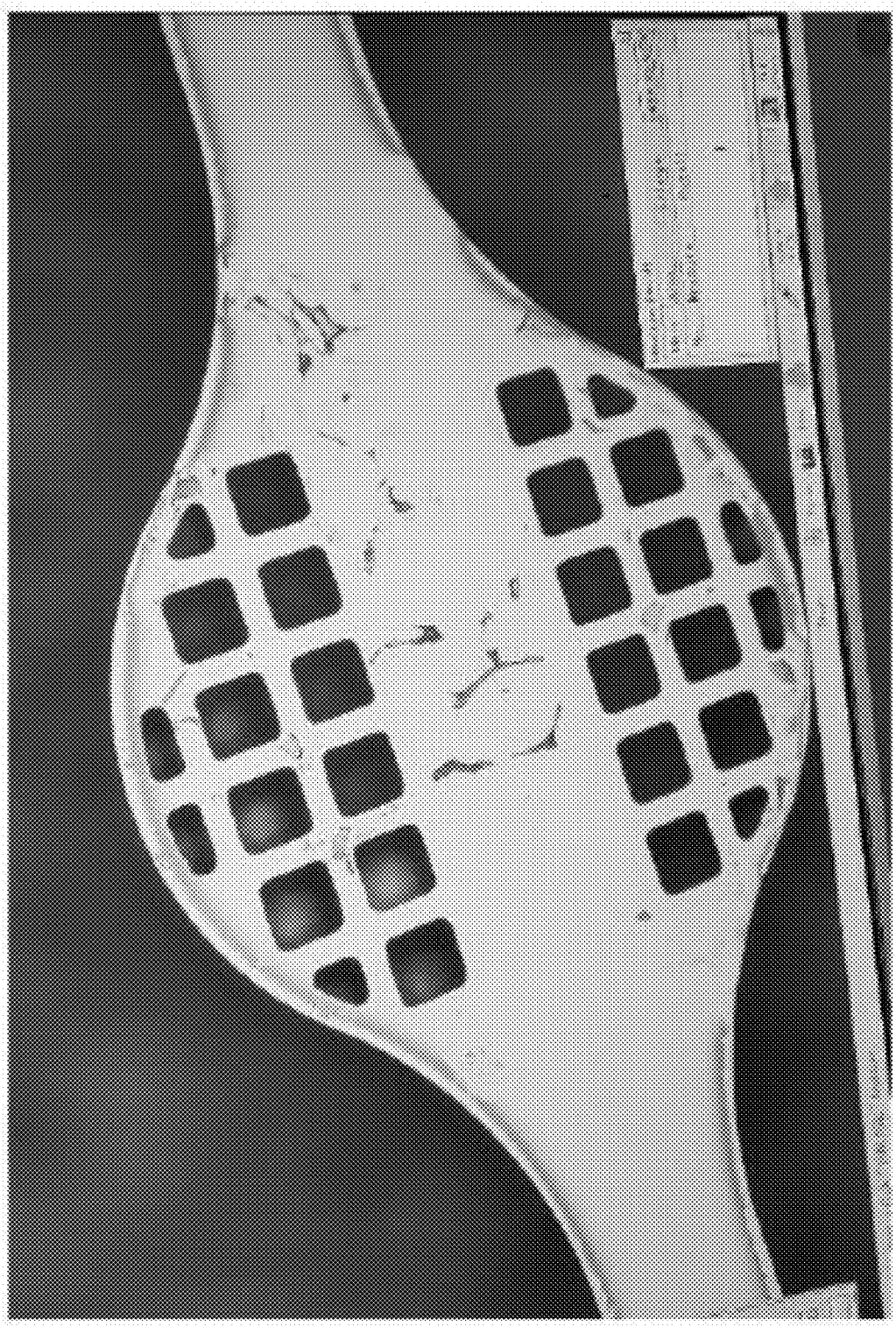
FIG. 12D is an image of a scan mirror after an etchant has removed portions thereof.

FIG. 12D is an image of a scan mirror after an etchant has selectively removed portions thereof, and forms a honeycomb structure (i.e., which may include the depth steps of FIG. 12Cii), which has most of the material removed at the periphery (i.e., the "wings"), and not from the center section between the hinges, which transmits the torque from the hinges to the outer areas. The wings may progressively get thinner and lighter the more distal from the center, being limited by stress, fatigue, and other design considerations.

FIG. 2 of the Applicant's co-pending patent application Ser. No. 17/000,464 shows a mirror including a mirror block 201 and a hinge 202.

Figure 12F:
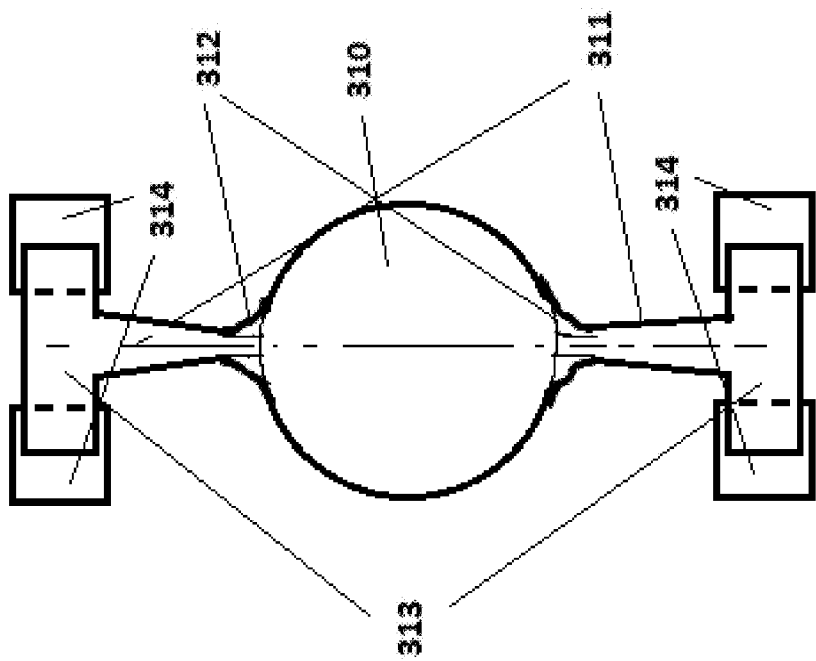
FIG. 12F illustrates another improved mirror embodiment, in which torsional hinges taper down toward the mirror active surface.
Figure 12E:
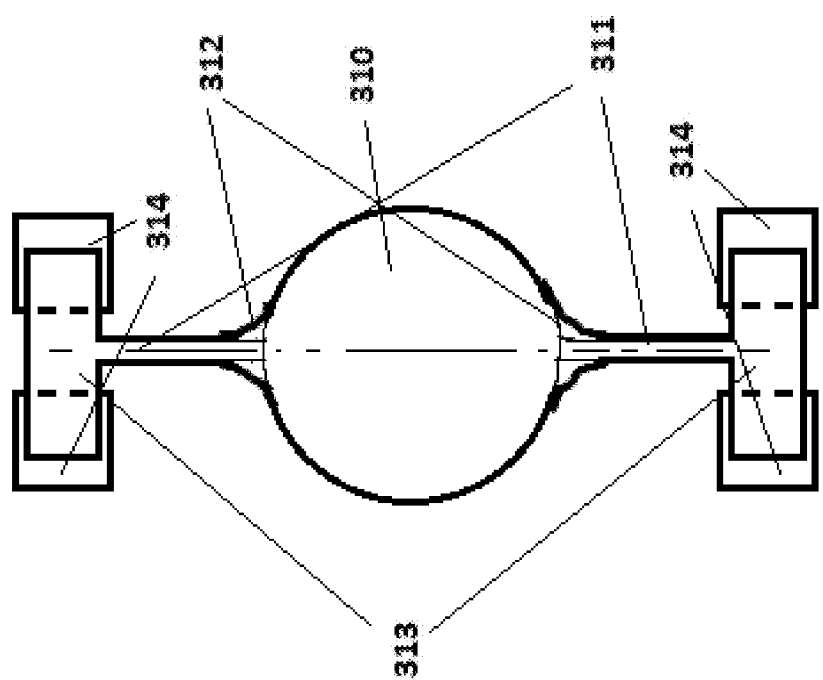
FIG. 12E is a view of an improved mirror arrangement that includes torsional hinges that connect to a flexure that is mounted to piezoelectric elements.

FIG. 12E shown herein is an embodiment providing an improvement to the mirrors of the '464 patent application, which mirror includes a mirror active surface 310 and torsional hinges 311. The torsional hinges 311 connect to a flexure 313 which is mounted to piezoelectric elements 314. The piezo elements 314 are electrically driven to induce oscillation of the mirror active surface about the axis of the hinges. Curved transition areas 312 are located where the mirror active surface 310 connects to the hinge 311. The transition area 312 is tapered and provides significantly more strength as compared to a right-angle transition area. This increased strength permits mirror active surface 310 to be oscillated at a higher frequency and/or driven at a wide angle.

FIG. 12F illustrates another improved embodiment, where torsional hinges 311 taper down toward the mirror active surface 310. Since hinges themselves may have a considerable amount of inertia being comparable to the mass of the active surface, and oscillate synchronously with the active surface, the inertia of the proximal parts of the hinges contributes to the torque in their distal parts, and therefore concentrates the stress and creates a possible failure point at the distal ends. Tapered hinges alleviate this problem, by restoring a nearly-uniform stress distribution, where the hinges are thicker at the root, and have a curved transition 312 to reduce a stress concentration at the joining to the active mirror surface and to the piezo elements 314.

Figures 12K, 12L:
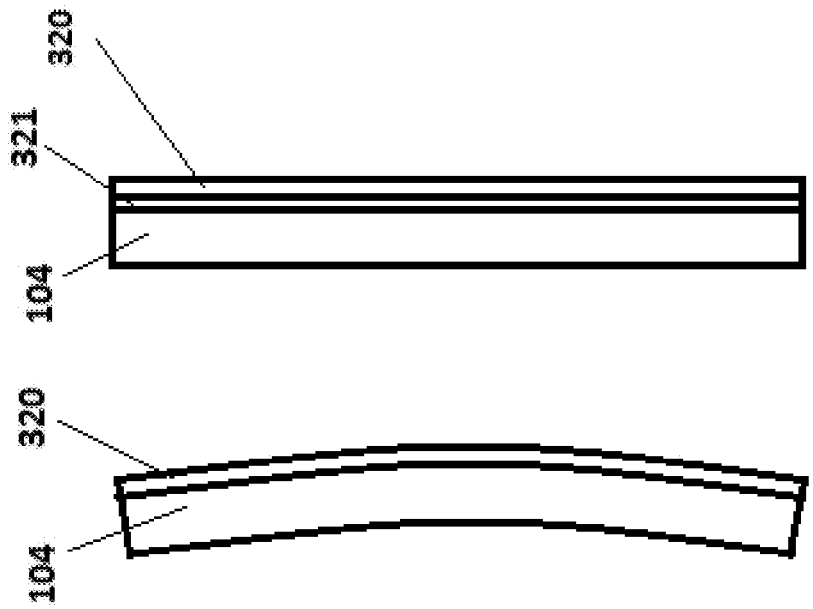
FIG. 12K is a cross section through the mirror of FIGS. 12E and 12F, but where a high-reflectivity dielectric coating has been applied, which bows the mirror.
FIG. 12L is a cross section through the mirror of FIGS. 12K, but where a stress-relief sub-layer such as chromium has been deposited between the high-reflectivity dielectric coating and the mirror, which bows the mirror in the opposite direction, and cancels out the bowing from the high-reflectivity dielectric coating.
Figure 12J:
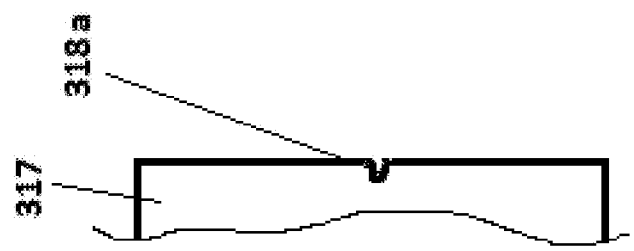
FIG. 12J shows the hinge of FIG. 12H after the oxidization layer is removed, showing a reduction in size of the treated microcrack.
Figure 12H:
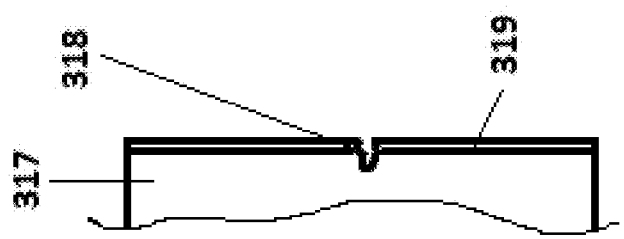
FIG. 12H illustrates a hinge embodiment adapted to reduce the microcracks, which includes application of an oxidization layer over the structure, including the microcrack.
Figure 12G:
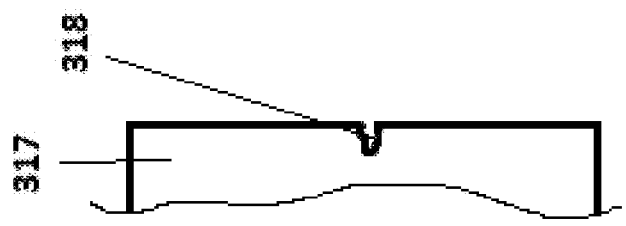
FIG. 12G shows a cross section through the hinge of one of the mirrors of FIGS. 12E and 12F, illustrating the formation of microcracks in the high-stress silicon MEMS structure.
Figure 12Q:
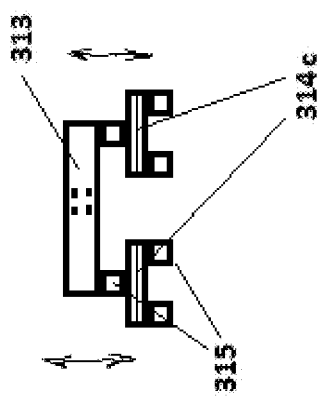
FIGS. 12M, 12N, 12P, and 12Q illustrate different ways to drive the scan mirror.
Figure 12P:
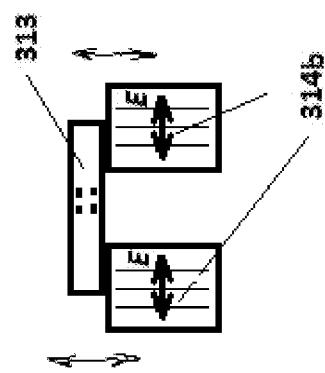
Figure 12N:
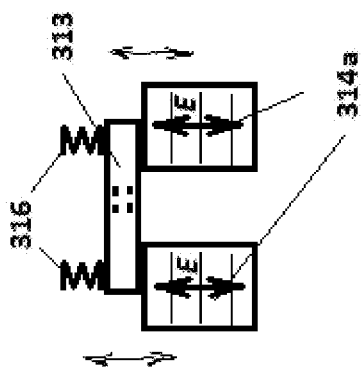
Figure 12M:
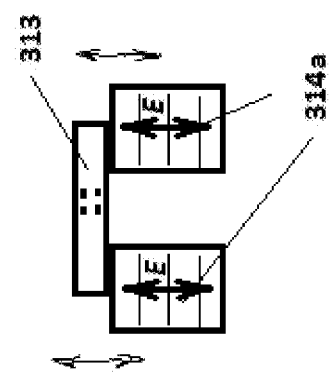

During formation of the mirror (i.e., silicon processing), micro imperfections may be formed and may remain in the surface. FIG. 12G shows a cross section of a hinge 317 which is a high stress silicon MEMS structure. The microcracks 318 that can be present have a detrimental effect on the strength and lifetime of the hinge. FIG. 12H is an embodiment illustrating an approach to reduce the size of the imperfection, i.e., reduce the size of any microcracks 318. The structure is oxidized thereby providing an oxidization layer 319 over the structure as well as the microcrack 318. FIG. 12J shows the hinge of FIG. 12H after the oxidization layer is removed. The microcrack is reduced in size and is shown as reduced microcrack 318*a*. This process of FIGS. 12H and 12J can be repeated several times to reduce the microcracks down to a negligible size.

The mirror surface is required to reflect the laser light with a high degree of efficiency, and silicon does not transmit the frequency of light that is desirably utilized in the LIDAR system disclosed herein; thus a coating for the mirror is needed, which may be a dielectric coating or gold plating. The dielectric coating may be most advantageous as it may transmit 99.9 percent of the desired wavelength, whereas the gold plating is only about 98 percent reflective, which can produce a detrimental amount of heat when using 10 watts of power to satisfy of design considerations of the LIDAR system. FIG. 12K shows a cross section of the mirror 310 with a high-reflectivity (e.g., dielectric) coating 320 applied. The coating acts like a Bragg reflector reflecting the specific laser frequency applied. A multilayer dielectric coating can provide reflectivity of 99.8%, however, the thickness of such coating is on the order of 4.5 um thick and has a tendency to bow the entire mirror, by introducing mechanical stress.

FIG. 12L shows an embodiment wherein a stress-relief sub-layer 321 (for example, chromium) is deposited between the high-reflectivity dielectric coating 320 and the mirror 310. The stress-relief sub-layer 321 bows the mirror in the opposite direction of the bow caused by the high-reflectivity dielectric coating 320. The bows cancel each other out and the resulting mirror is flat.

An alternate embodiment for a silicon mirror wherein the laser light is at 1500 nm is to use a gold plating to provide about 98% reflectivity. Silicon does not absorb 1500 nm light and most of the 2% of the laser light that does not get reflected will simply pass through the silicon mirror, thereby limiting any heating effects. In this embodiment, care must be taken to make certain that any photons passing through the silicon mirror do not interfere with other aspects of the design. Light catches can be included in the design to capture any stray photons that are not reflected.

FIGS. 12M and 12N, and 12P and 12Q schematically illustrate different ways to drive the mirror shown in FIGS. 12E and 12F, using piezoelectric elements 314*a* and 314*b*, respectively, which are driven in different directions. (Note, elements 314*c* are piezo benders, and elements 315 are spacers of any solid material).

Figure 12S:
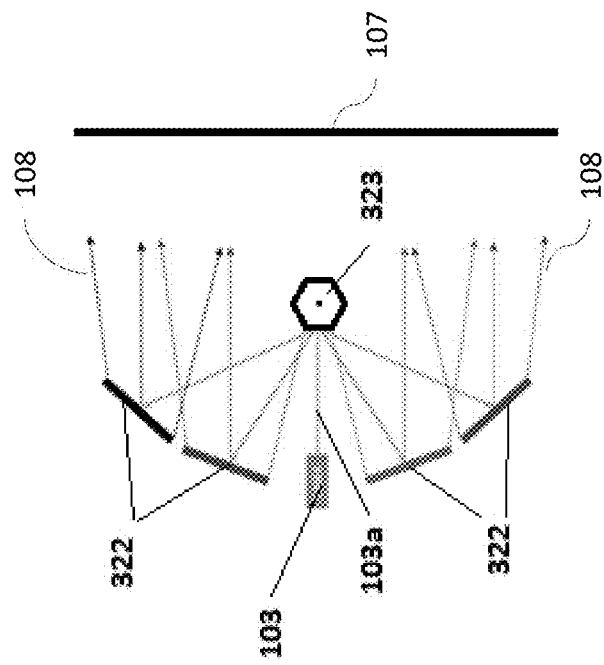
FIG. 12S illustrates a laser projecting an unscanned beam towards a rotating polygon which scans the beam towards mirrors that are arranged to reflect the beam towards a target and form a scan line thereon.
Figure 12R:
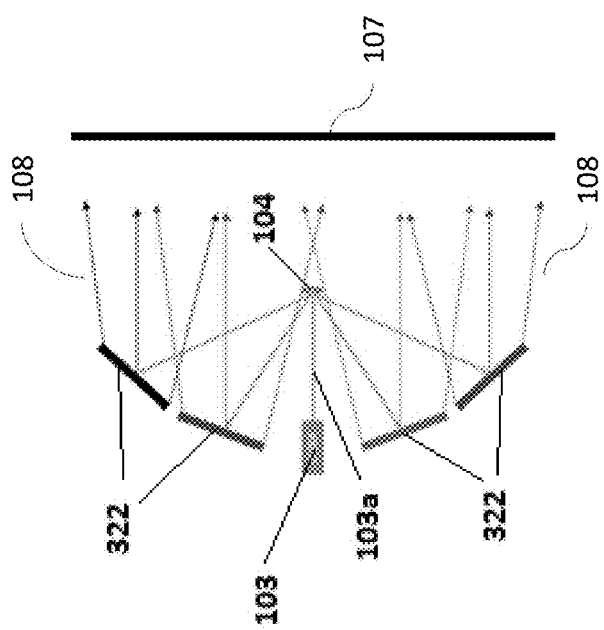
FIG. 12R illustrates a laser projecting an unscanned beam towards a mirror which scans the beam towards mirrors that are arranged to reflect the beam towards a target and form a scan line thereon.

FIG. 12R illustrates a laser 103 projecting an unscanned beam 103*a* towards a mirror 104 which scans the beam towards mirrors 322 which are arranged in the arcuate pattern shown to reflect the beam towards a target as the scanned laser beam 108 in turn forms the laser scan line on target 107. FIG. 12S illustrates a laser 103 projecting an unscanned beam 103*a* towards a rotating polygon 323 which scans the beam towards mirrors 322 which are arranged to reflect the beam towards a target as the scanned laser beam 108 with in turn forms the straight laser scan line on target 107. The arrangements shown in FIG. 12R and FIG. 12S can be utilized in the prior embodiments to form the laser scan line on target 107. The arrangements of FIG. 12R and FIG. 12S each utilize a mirror with relatively small frequency, but very high scan angle, and it splits the large scan angle into several small sub-angles that subsequently overlap, resulting in a high scan frequency at modest angles, as needed, but using the mirror with lower frequency and higher scan angle.

Figure 12T:
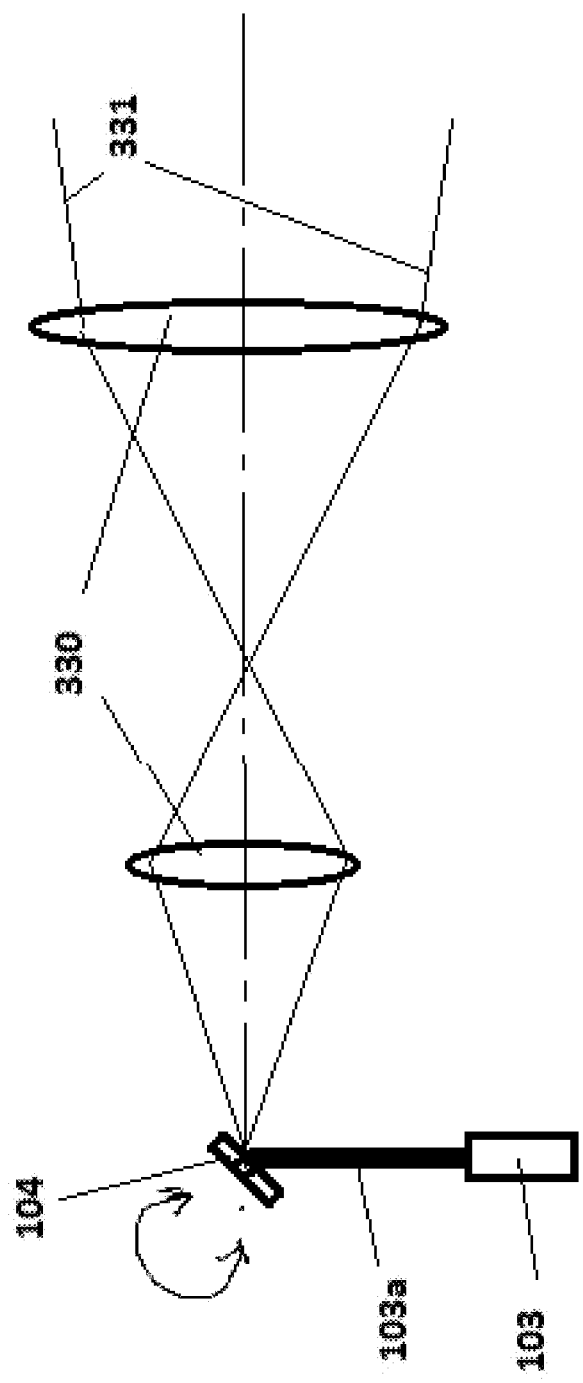
FIG. 12T illustrates an arrangement in which the mirror scans a laser beam through a telescopic lens elements having power either one or two dimensionally.

FIG. 12T illustrates an arrangement whereby the mirror 104 scans unscanned laser beam 103*a* through telescopic lens elements 330 having power either one or two dimensionally. The selection of the telescopic lens elements 330 permits a tradeoff between the scanned laser spot size and the effective angle of the scan. This arrangement creates a scanning telescope, ending up with a smaller FOV and a higher optical resolution within the FOV. So greater range is obtained that keeps the same resolution. For example, in a LIDAR system that uses 512 pixels to cover a 30 degree fOV, use of this arrangement may use the same 512 pixels to obtain the same resolution, but would only cover a 10 degree fOV. This arrangement in FIG. 12T also provides a longer range for the optical system of the LIDAR apparatus (i.e., it trades angle for range).

FIGS. 13A-13H show various embodiments for generating the slow speed scan stage of the present invention, which are alternatives to having 360 degrees of rotation, and also relates to correcting the curved "smiley" scan line discussed hereinabove. In each figure, the laser transmitter 401 is shown which produces the vertical high-speed fan of rays 335 and a receiver 402 is shown with a vertically-oriented sensor array. The laser transmitter 401 and the receiver 402 are optically arranged in each case so that the target field of view illuminated by the vertical high-speed fan of rays 335 corresponds to the field of view of the receiver 402. The arrangement may have a limited scan angle, being within plus or minus 30 degrees or plus or minus 120 degrees in the forward direction. Also, both the laser beam and the FOV of the receiver may be passing through the same slow mirror.

Figure 13B:
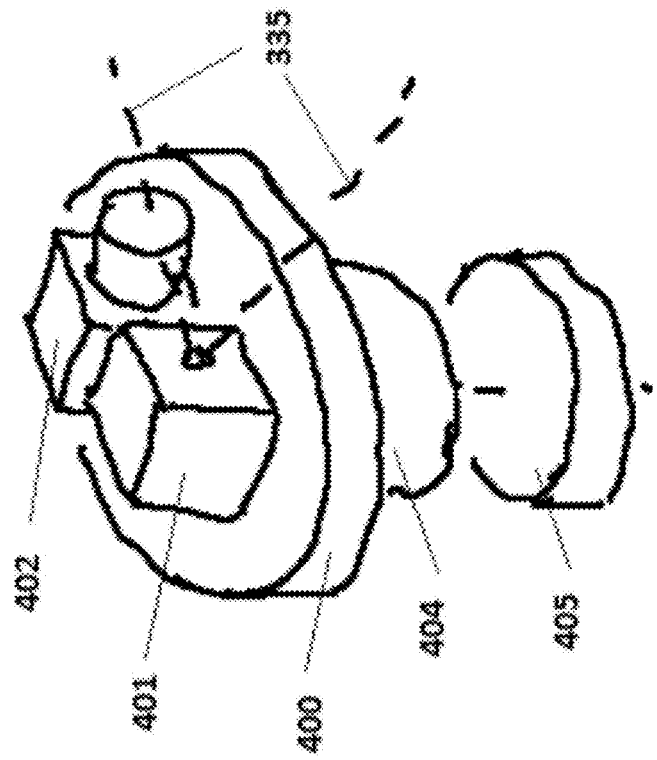
FIGS. 13A-13H show various embodiments for generating a slow speed scan stage for an optical system of the LIDAR disclosed herein.
Figure 13A:
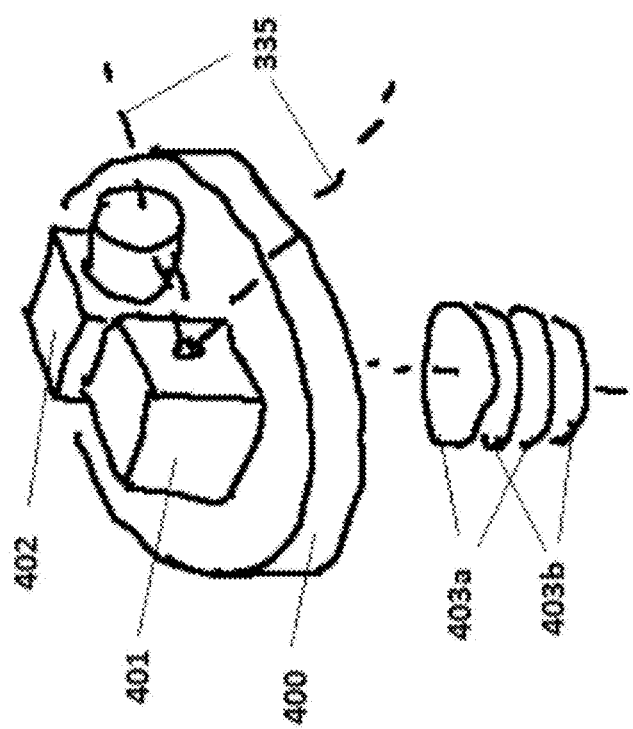

FIG. 13A show the transmitter 401 and the receiver 402 mounted to a rotating platform 400. Electrical signals are transmitted from the components on the rotating platform through slip rings 403a and 403b. In this case slip ring 403a is mounted to the platform and rotates therewith and slip ring 403b is fixed. FIG. 13B shows an embodiment wherein the slip rings of FIG. 13A are replaced by wireless communications, such as, for example, radio communication, optical communication or magnetic communications. In this embodiment, the wireless transmitter/receivers are shown as 404 and 405.

Figure 13D:
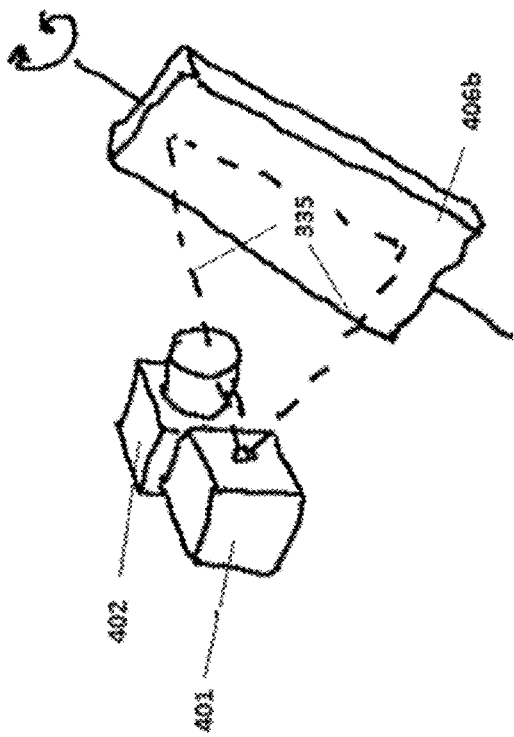
Figure 13C:
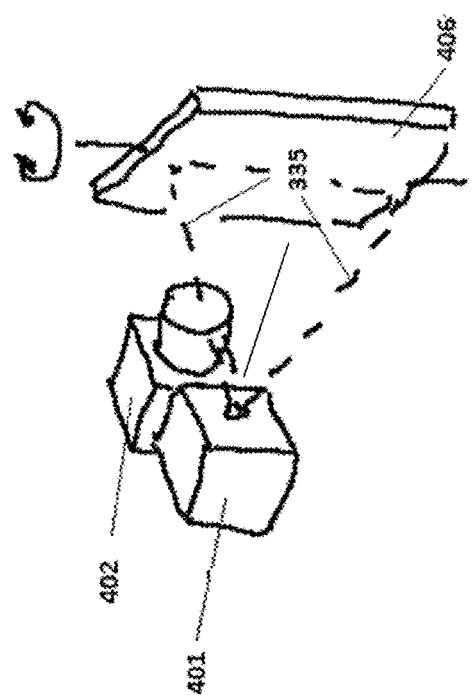

FIGS. 13C-13H show embodiments wherein the transmitter 401 and the receiver 402 are rigidly mounted and the motion in the slow speed direction (orthogonal to the vertical high-speed fan of rays 335) is generated by moving mirrors. In FIG. 13C, a mirror 406, which is large enough to receive/accommodate both the vertical high-speed fan of rays 335 and the optical field of view of receiver 402, is positioned with the axial direction of its face to be perpendicular to the center axis of the vertical high-speed fan of rays 335. The axis of rotation of the mirror 406 is along the axis or the direction of the scan of the high-speed fan of rays 335. In this embodiment it should be noted, the two-dimensional field of view is not bowed (no smiley), however, the scanning of the mirror 406 cannot be symmetrical about the plane formed by the high-speed fan of rays 335, in order to avoid projecting directly back at the transmitter 401 and receiver 402.

FIG. 13D shows an embodiment similar to the one shown in FIG. 13C, but wherein the mirror 406b has an axis of rotation that is not perpendicular to the center ray of the high-speed fan of rays 335. In this case, the mirror can oscillate symmetrically as the scan of the high-speed fan of rays 335 of the mirror 406b misses both the transmitter 401 and the receiver 402. However, this approach is disadvantaged in that the optical arrangement results in the two-dimensional field of view being bowed (has a smiley). According, post processing of the image is required to correct for the bowed field of view.

Figure 13E:
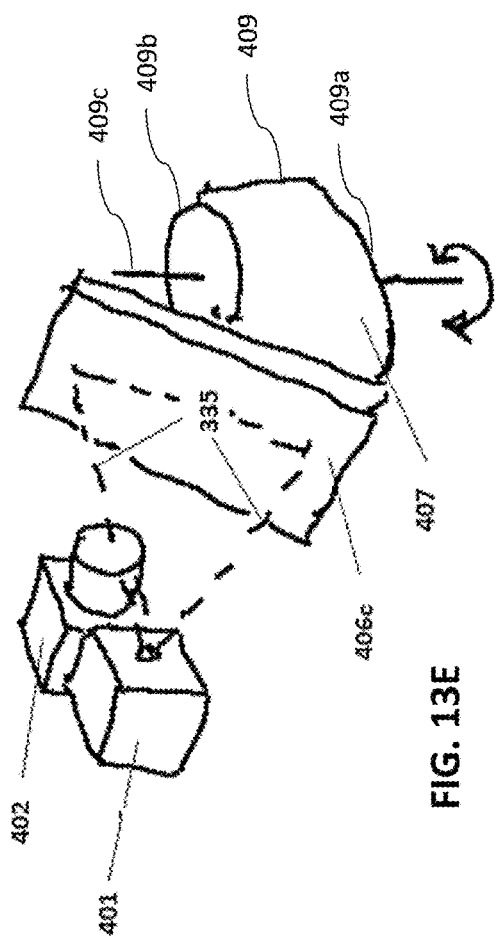

FIG. 13E shows a further embodiment that is similar to the one shown in FIG. 13C, but where the mirror 406c has an axis of rotation which is non-parallel to the mirror 406c plane (i.e., being at an acute angle thereto). In this embodiment, the mirror 406C is shown mounted to a cone 409 having a larger diameter on the bottom 409a and a smaller diameter 409b on the top. The axis of rotation 409c of the cone 409 is vertically through the center of the cone 409. This approach is advantaged in that the scan can be symmetrical about the high-speed fan of rays 335 since the mirror 406c is tilted, so that the outgoing rays do not reflect directly back into the transmitter 401 and the receiver 402. Further, the approach is advantaged in that there is no bowing or smiley due to the optical geometry. While this embodiment shows the mirror 406c mounted on a cone 409, other mechanical embodiments can be utilized to provide that the axis of rotation is non-parallel to the mirror 406c plane. For example, the mirror can be mounted on a triangle wedge which in turn oscillates.

Figure 13G:
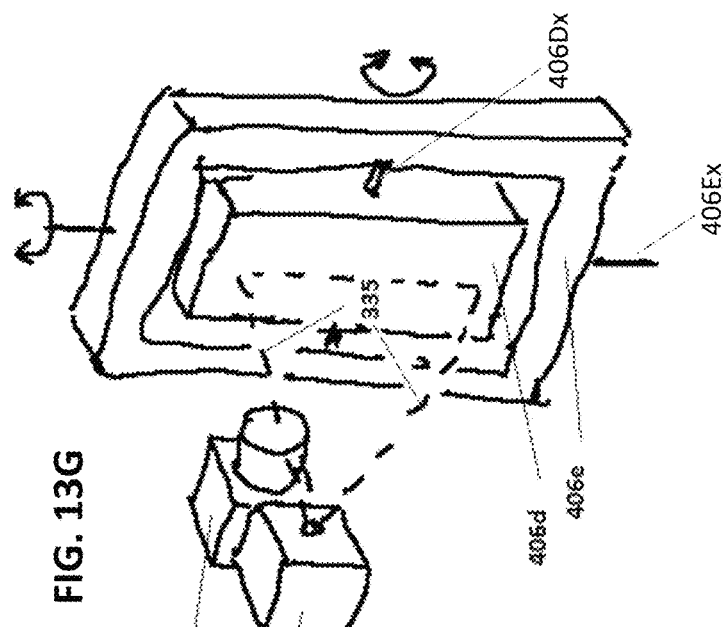
Figure 13H:
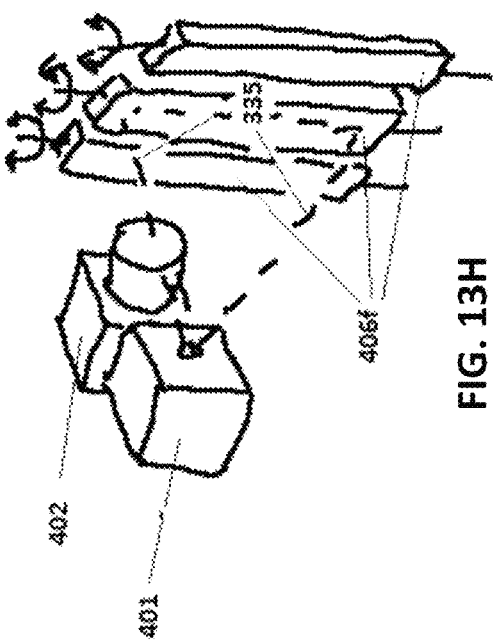
Figure 13F:
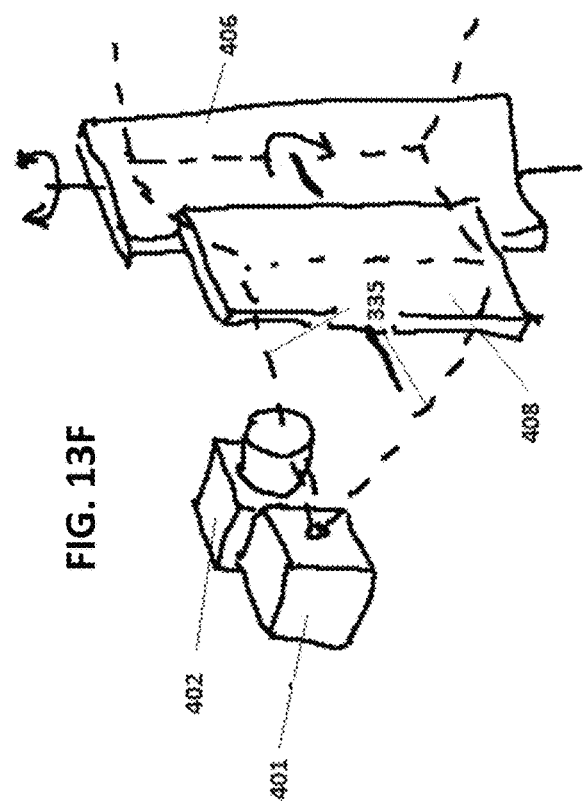

FIG. 13F shows a further embodiment wherein an additional slow speed mirror 408 rotates about an axis perpendicular to the high-speed fan of rays 335, and also prevents having the leaser beam being directed back upon itself. The additional slow speed mirror is positioned to receive the high-speed fan of rays 335 and directs it towards mirror 406 which rotates about an axis that is coplanar with the fan of rays 335. The oscillation speed of the additional low speed mirror 408 may in one embodiment be twice as fast as the oscillation of mirror 406. This embodiment is advantaged in that there is no bowing (no smiley).

FIG. 13G shows a further embodiment wherein a gimbled mirror comprises a mirror portion 406d which scans about with respect to a first axis 406Dx that is perpendicular to the high-speed fan of rays 335. An outer frame portion 406e scans the mirror portion about a second axis 405Ex which is coplanar with respect to the fan of rays 335. The oscillation speed of the mirror portion 406d may in one embodiment be twice as fast as the oscillation of outer frame portion 406e. This embodiment is advantaged in that there is no bowing (no smiley).

FIG. 13H shows a further embodiment wherein multiple segmented mirrors 406F are vertically positioned wherein each scans about an axis oriented in line with the fan of rays 335. One of the segmented mirrors 406F, such as for example the most centered segment mirror is arranged to receive the high-speed fan of rays 335 and directs it towards the target. The remainder of the segmented mirror 406f optically transmit the return signals from the field of view to the receiver 402. This approach is advantaged in that there is no bowing (no smiley). Furthermore, each section of the segmented mirror is much smaller than a single mirror, and therefore has less mass that needs to be rotated.

FIGS. 14A through 14Dii show various embodiments of the sensor arrays that may be used in the LIDAR system disclosed herein.

The sensor arrangement of FIG. 14A is configured to address the an issue that occurs during the scanning of the laser beam as discussed herein, whereby the scanner moves at different speeds at the center of the scan than at the end of the scan (i.e., the scanner must slow down at it reaches the extent of the oscillation in each direction, and may be at a maximum speed in the center). Thus, there is more signal obtained when in the center, and is not perfectly uniform. The sensor arrangement of FIG. 14A compensates for those differences in scan speed for the outbound laser light. In FIG. 14A, the individual pixels 101b of sensor array 101 vary in size and shape, but have each center positioned in a line. In this embodiment the middle pixels are approximately square and each successive pixel in moving outwardly from the middle is shaped to be longer and narrower. The actual laser spot when being mechanically scanned can vary in shape and scan speed, as the scanning progresses out from the center point of the scan, the middle pixels are the widest for when the scanned beams moves the fastest, and the width of each successive pixel gets narrow as the slowing laser beam increasingly spends more time on the narrower sensor. The variations of the pixels 101b can be set to compensate for such changes in the scan spot size and speed, thereby providing uniform detection outputs. As a further embodiment, the spacing between the individual pixels 101b can also be varied to match the actual scanning patterns and scan speed.

FIG. 14B describes a sensor array 101 wherein the individual pixel sensors 101b are arranged in a bowed (smiley) arrangement. As previously described, there are embodiments wherein the scanned laser line 107 is bowed. By bowing the individual sensor 101b positions on the sensor array 101 to match the bowed laser line 107, the LIDAR system does not need to perform any post image processing to correct for such bowing of the laser line 107.

As previously described, there are some situations wherein there is parallax between the scanned laser and the optical field of view. FIG. 14C shows an embodiment for dealing with this parallax effect/error. In this embodiment, the image sensor 101 is formed by a column of smaller linear sensors 101b and a second column of larger sensors 101c. The smaller linear sensors 101b can be positioned so that the field of view is in focus at a far field positions, for example 25-200 meter from the sensor. The larger sensors 101c can be positioned so that the field of view is in focus at a near field positions, for example 0-25 meter from the sensor. As a further embodiment, the small sensors 101b can be a different type of sensors as compared to the larger sensors. For example, it is often required that the smaller sensors 101b detecting the far field object are more sensitive. According, the smaller sensors 101b could be either APDs, SPADs or other high sensitive sensors. The larger sensors 101c for detecting the objects in the near field generally receive larger reflection signals, due to the objects being relatively close, and therefore do not need to be as sensitive. Accordingly, the larger sensors 101c can be conventional photodiodes.

A challenge when utilizing high powered scanning lasers with very sensitive image sensors is that the sensors can be damaged if a strong reflection from the scanned laser beam is received or if another laser system shines its laser light directly into the image sensor pixels. FIG. 14Di is another embodiment of the image sensor 101 that includes guard rail sensors 101d that surround the individual sensors 101b of the array. The guard rail sensors 101d can be configured to have low sensitivity and a high immunity to damage when laser light is received. Generally, in order for a scanned laser to reach the highly sensitive individual sensors 101b, the laser light would first pass over the guard rails sensors 101d. Electronics are also provided that detect the laser light falling on the guard rail sensors 101d that exceeds a threshold intensity level, and temporarily shuts down the individual pixels 101b, thereby avoiding damage as the laser moves over the highly sensitive individual pixels 101b. The guard rail sensors 101d can be formed by standard photodiodes. The spacing between the guard rail sensors should be less than the extent of the laser spot produced by an offending LIDAR system or other system. Assuming that the spot is well-focused, which is unlikely, but not impossible, the guard rail sensors would need to be spaced apart no more than about tens of um.

As a further embodiment (see FIG. 14Dii), the plurality of guard rail sensors 101d that number greater than the sensors of the linear array in FIG. 14Di can be replaced by four photodiodes that surround the individual pixel sensors 101b, two long ones for the lengthwise direction and two short ones to cover the width of the sensor 101. Still further, the guard rail can be formed by a single sensor shaped to surround the individual sensors 101b.

Figure 14E:
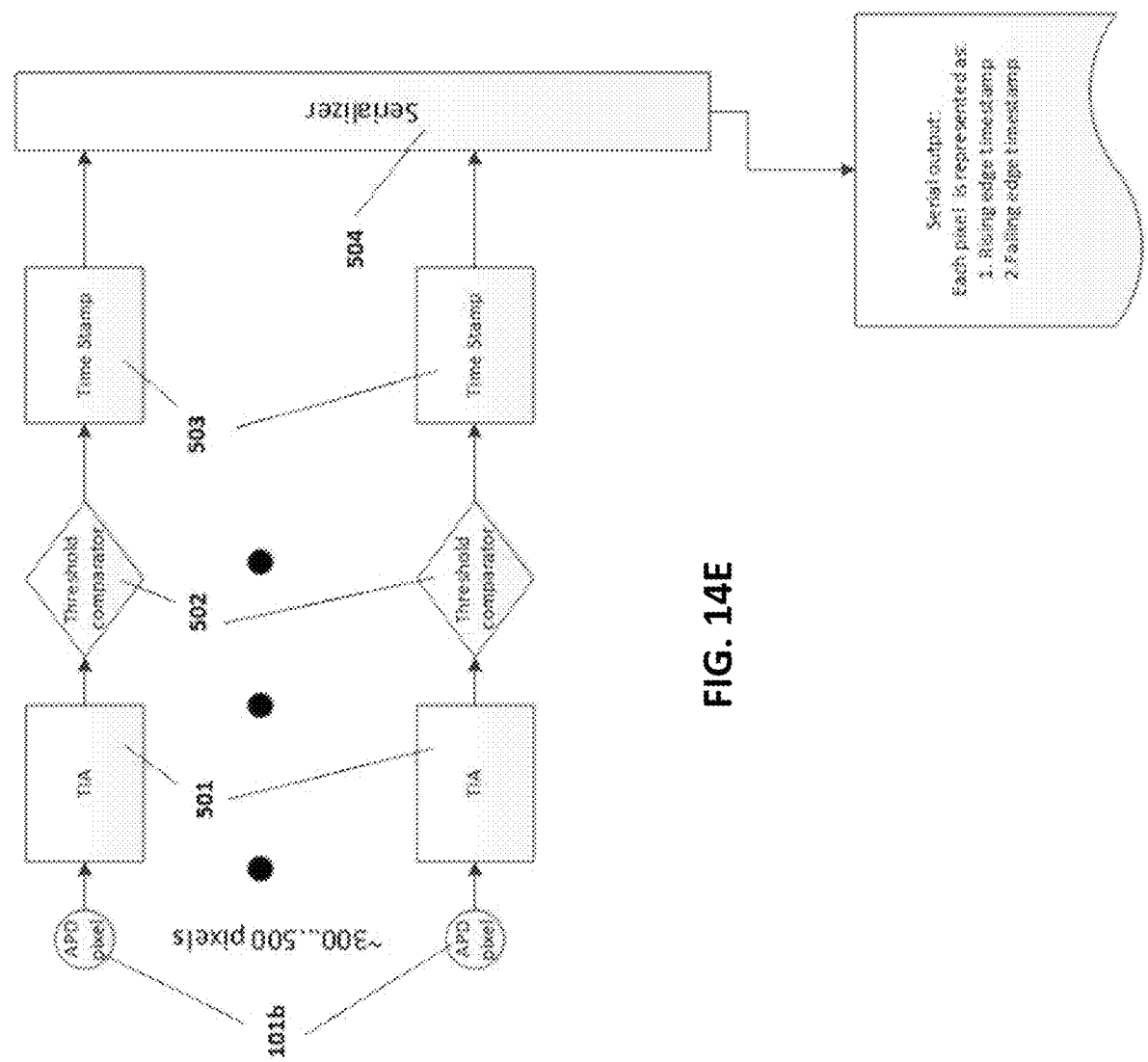
FIG. 14E is a diagram illustrating that each individual sensor shown in FIG. 14Di and FIG. 14Dii may be connected to a trans-impedance amplifier that is connected to a threshold comparator which is connected to a time stamp circuit.

FIG. 14E illustrates each that each individual APD pixel 101b shown in FIG. 14Di and FIG. 14Dii may be connected to a transimpedance amplifier (TIA) 501 that is connected in turn to a threshold comparator 502 which in turn connects to a time stamp 503 circuit. When a rising edge signal (i.e., detected laser light) is detected as being above a preset threshold by the threshold comparator 502, the time stamp 503 circuit records the rising edge time. When a falling edge signal is detected below a preset threshold by the threshold comparator 502, the time stamp 503 circuit records the falling edge time. The rising edge time and the falling edge times are communicated to a serializer which provides a serial output including the rising edge time and the falling edge time for each APD pixel 101b.

Figure 14F:
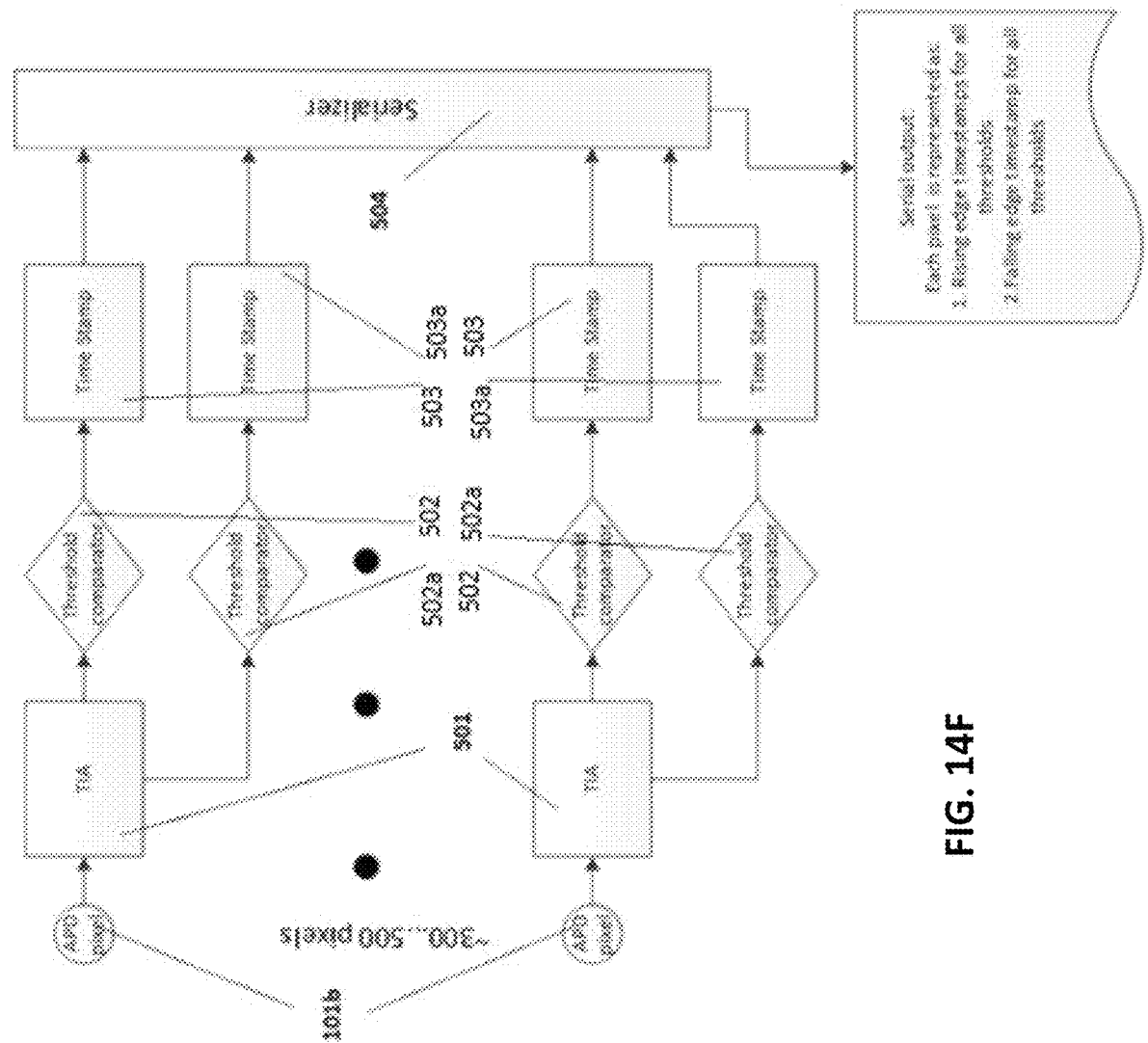
FIG. 14F is a diagram illustrating an embodiment similar to the one shown in FIG. 14E, except that a second threshold comparator and a second time stamp are added to the processing channel for each APD pixel.

The embodiment shown in FIG. 14F is similar to the one shown in FIG. 14E except that a second threshold comparator 502a and a second time stamp 503a are added to the processing channel for each APD pixel 101b. The threshold setting for the second threshold comparator 502a is different than the threshold setting for threshold comparator 502. When a rising edge signal is detected above a preset threshold by the threshold comparator 502a, the time stamp 503a circuit records the rising edge time. When a falling edge signal is detected below a preset threshold by the threshold comparator 502a, the time stamp 503a circuit records the falling edge time. The rising edge time and the falling edge times from both time stamp 503 and second time stamp 503a are communicated to a serializer which provides a serial output including the rising edge times and the falling edge times associated with threshold comparators 502 and 502a. While this embodiment is shown with two threshold comparators and two time stamps for each pixel channel, it is possible to add still further threshold comparators and time stamps to each pixel channel.

Figure 14G:
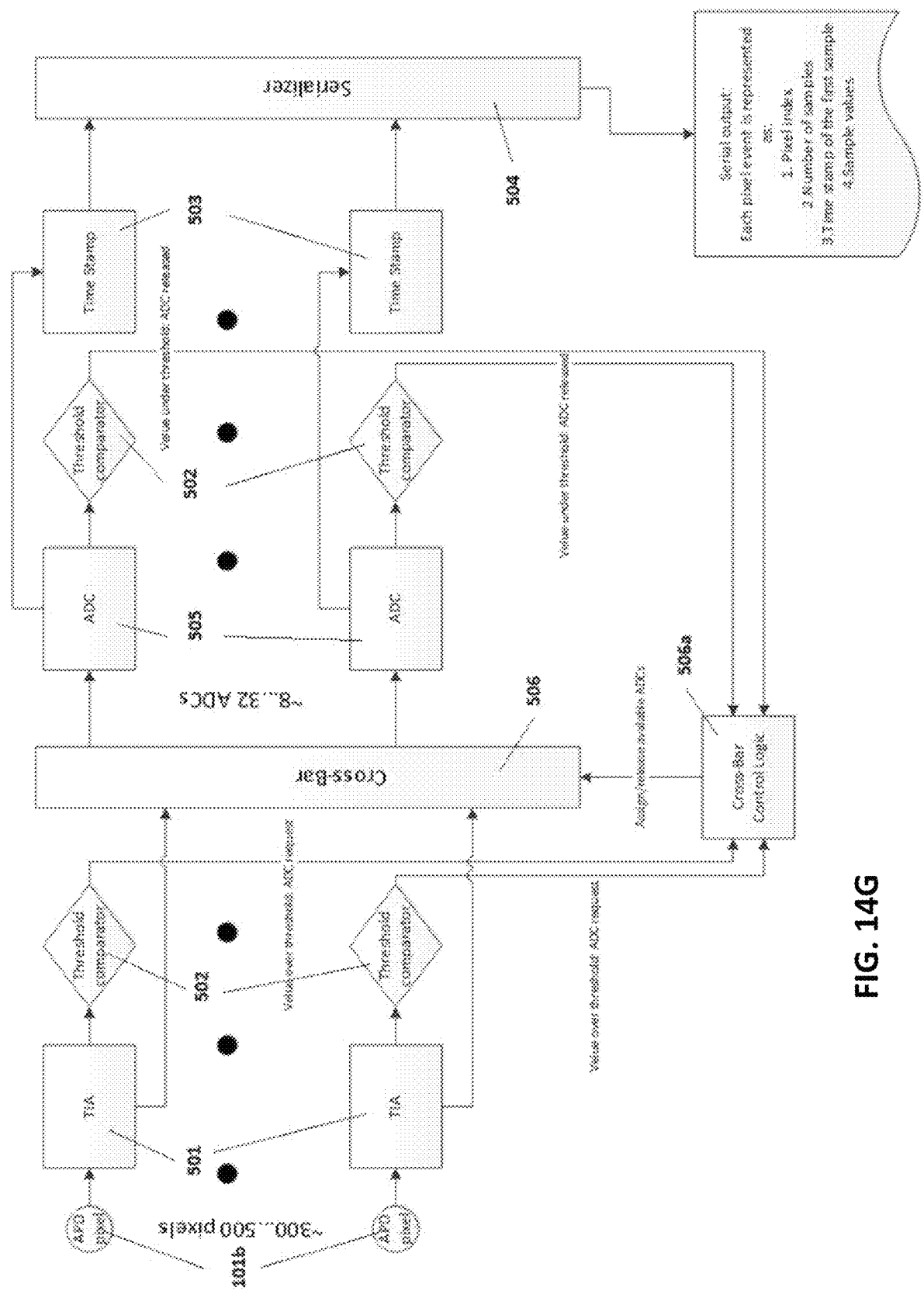
FIG. 14G is a diagram illustrating an embodiment similar to the one shown in FIG. 14E, except that the amplified signals from pixels are not just compared to one or more preset threshold values, but are also digitized as sequences of samples using analog-to-digital converters.

FIG. 14G is an embodiment wherein the amplified signals from pixels 101b are not just compared to one or more preset threshold values, but are also digitized as sequences of samples using analog-to-digital converters (ADC) 503. The threshold comparators 502 are still present, however their role is limited to detecting the beginning of a pulse from a pixel and assigning one of the available ADC channels to that pixel via cross-bar 506. The ADC channel remains assigned until the signal drops below the threshold on the comparator 502, upon which the ADC channel is freed up and become available to other pixels. Since return pulses detected by pixels 101b are generally short and infrequent, the number of ADC channels may be substantially smaller than the number of pixels. The serializer 504 provides a serial output where each pixel event is represented as: a pixel index, number of samples, time stamp of the first sample and sample values.

Fiber laser outputs are typically circular and non-astigmatic, and therefore require relatively simple collimation arrangements.

Figure 15A:
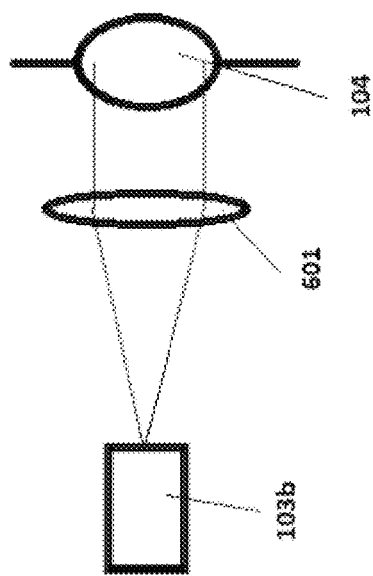
FIG. 15A illustrates circular and non-astigmatic light from a fiber laser passing through an aspheric lens and then being scanned by mirror.

FIG. 15A illustrates light from a fiber laser 103b passing through an aspheric lens 601 and then being scanned by mirror 104.

Conversely, diode lasers typically produce highly elliptical beams, and therefore additional circularizing optics are required to shape such a beam to fill a circular mirror. For example, FIGS. 15Bi and 15Bii illustrates light emitted from a diode laser 103c passing through cylindrical lens 602 and then through an aspheric lens 601 and then being scanned by mirror 104.

The output beam of a Master Oscillator Power Amplifier (MOPA) laser is typically not only elliptical, but also astigmatic, therefore even more complex optics is needed for collimation.

Figure 15C:
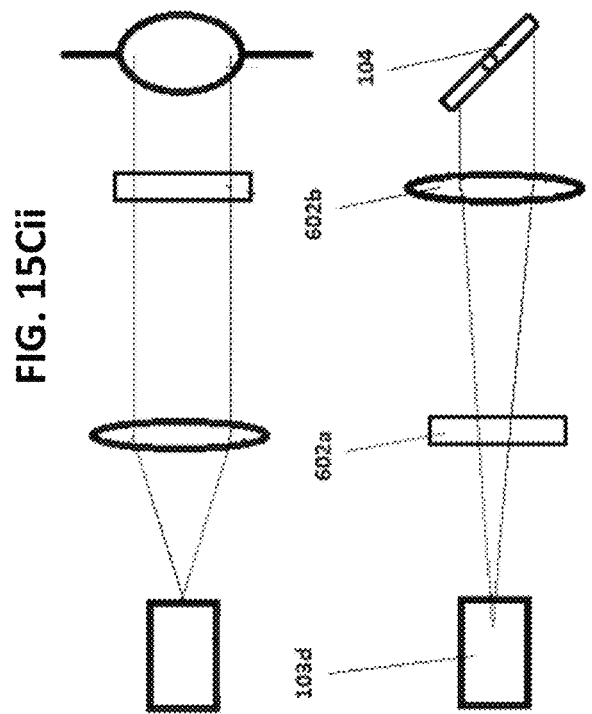
FIG. 15Ci and FIG. 15Cii illustrate another embodiment for focusing a MOPA laser with one aspheric and one cylindrical lens.
Figure 15B:
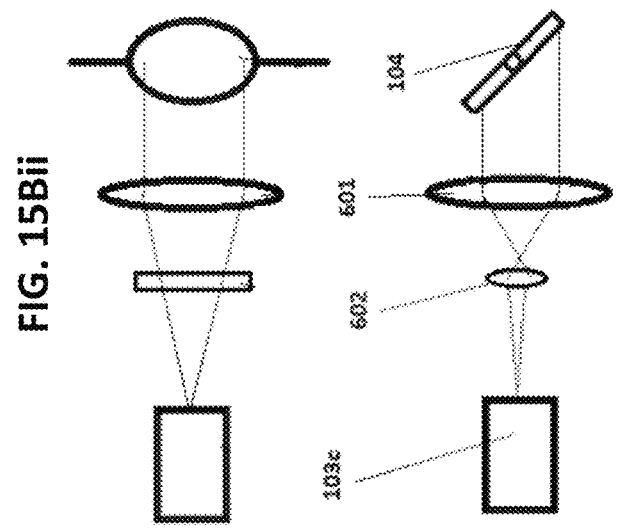
FIG. 15Bi and FIG. 15Bii are top and side views illustrating light from a MOPA laser passing through a cylindrical lens for fast direction MOPA collimation and then passing through a cylindrical lens for slow direction MOPA collimation, and then being scanned by mirror.

FIG. 15Ci and FIG. 15Cii illustrate light from a MOPA laser 103d passing through a cylindrical lens 602a for fast direction MOPA collimation and then passing through cylindrical lens 602b for slow direction MOPA collimation, and then being scanned by mirror 104.

FIG. 15Di and FIG. 15Dii illustrate a more detailed embodiment for focusing a MOPA laser with one aspheric and one cylindrical lens.

Figure 15E:
FIGS. 15Ei and 15Eii illustrate the addition of a dynamic sensor that may be used to detect astigmatism, and can adjust the signal.
Figure 15E:
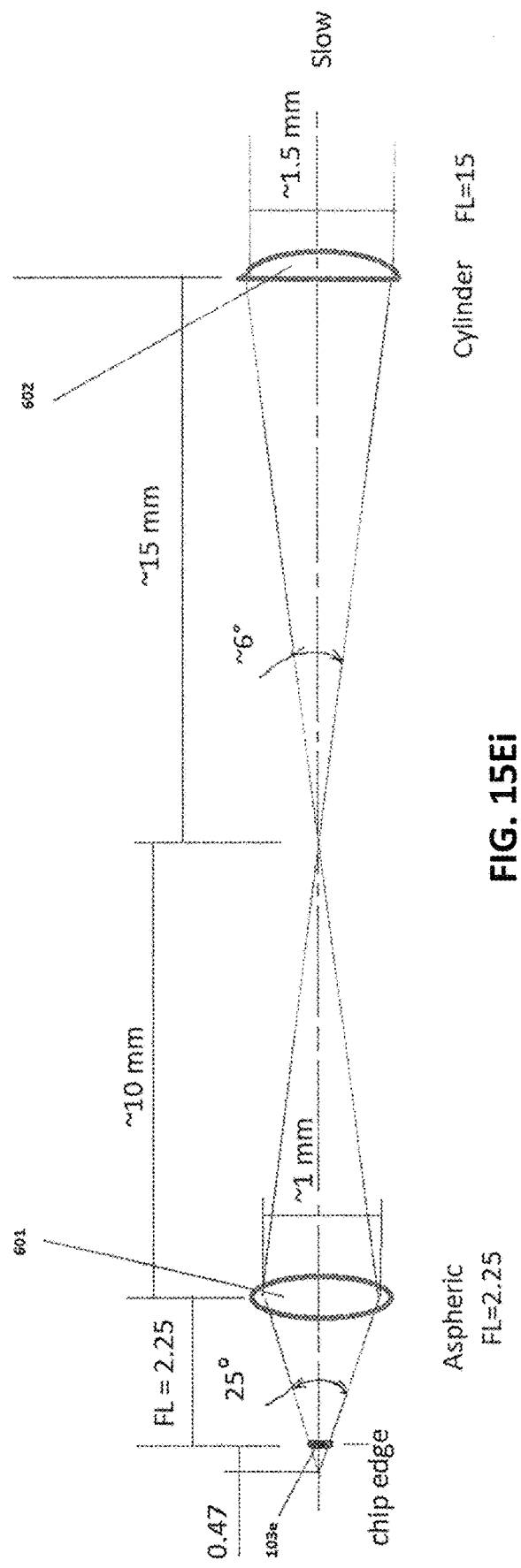

The embodiment shown in FIG. 15Ei and FIG. 15Eii is similar to the one shown in FIG. 15Ci and FIG. 15Cii, but with the addition of a low-reflectance signal sampling mirror 603 which diverts some of the light beam coming out from the cylindrical lens 602a. The diverted light beam is imaged by a dynamic imaging optical sensor 604 for astigmatism control. Accordingly, the system can be adjusted based upon the detected astigmatism so as to appropriately shape the beam to be scanned by mirror 104. A possible adjustment method is through the current injected into the Amplifier section of the MOPA laser. Changing the current utilized typically changes the astigmatism, so that it may be brought back to a more acceptable amount. Alternatively, the astigmatism could be adjusted mechanically/optically by moving one or both of the lenses, rather than adjusting it electronically.

FIG. 16A is a control system embodiment that may be used for accurate control of the motion of the high-speed scanning mirror 104, which includes, in addition to the main laser, a pickoff laser 701, which has much lower power and emits visible light rather than IR light, which visible light is reflected off the same mirror 104 and forms a scanned laser beam 702 which is detected by two end pickoff sensors 704a and a center pickoff sensor 704b. The signals from the pickoff sensors can be utilized to determine the angular position of the mirror 104. The pickoff laser 701 is positioned in a way that makes its fan of scanned rays out of the plane with the fan of the rays 335 from the main scanning laser 103. FIG. 16B shows the mirror scan profile 705 and the pulses from the end pickoff sensors 706a and the pulses for the center pickoff sensors 706b. FIG. 16C is the same a FIG. 16B but includes a digital representation of the laser on interval 707 and the laser off interval 708.

Figure 16D:
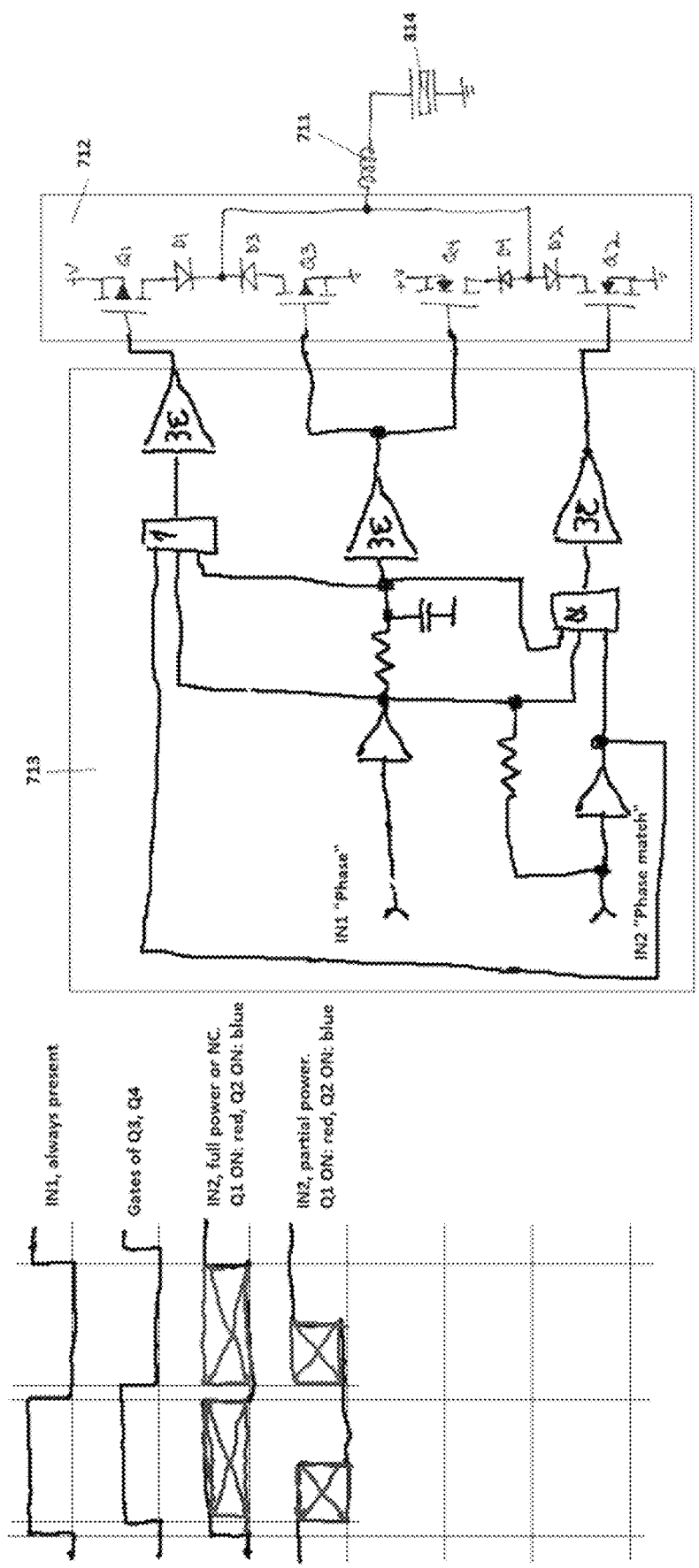
FIG. 16D is a piezo drive that includes a control circuit connected to a resonant power driver, which connects through an inductor to the piezoelectric element, which in turn drives the mirror.

FIG. 16D is a piezo drive comprising a control circuit 713 connected to a resonant power driver 712 which connects through inductor 711 to the piezoelectric element 314 which in turn drives the mirror. The same circuit can drive multiple piezoelectric elements connected in series or in parallel.

Some types of piezoelectric elements that may be used to drive movement of the scanning mirrors disclosed herein, for example, multi-layer stacks working in d33 mode, require biased electrical drive signals, so that the applied voltage is never negative with respect to the polarity of the piezoelectric element.

Figure 16E:
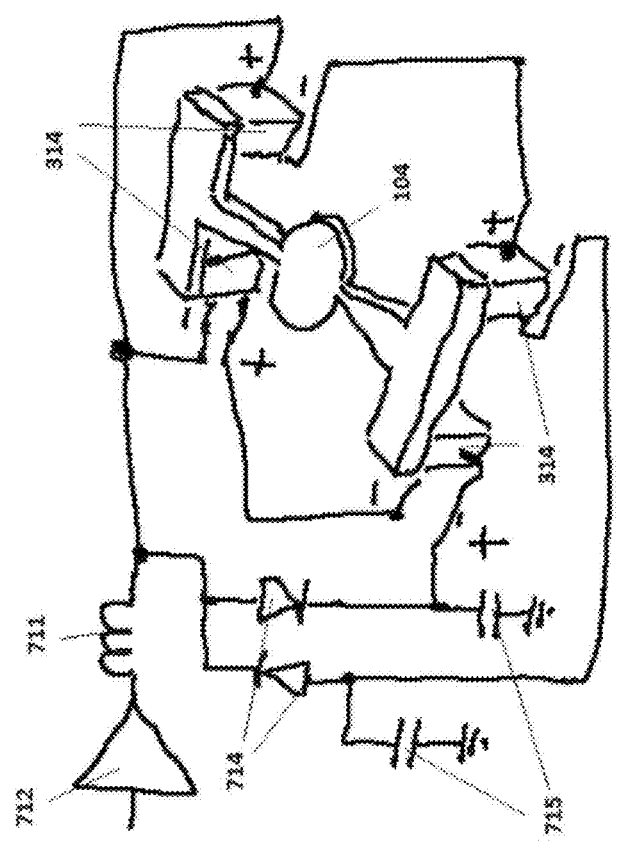
FIG. 16E illustrates a biased drive circuit that may be used to drive the piezoelectric elements that cause oscillation of the mirror of one of the herein disclosed optical scanning systems.

FIG. 16E is an example of a biased drive circuit wherein the resonant power driver 712 connects through inductor 711 to two diodes 714, having opposite polarities, which connect in turn to two capacitors 71 which in turn drive the piezoelectric elements 314 of the mirror.

Figure 16F:
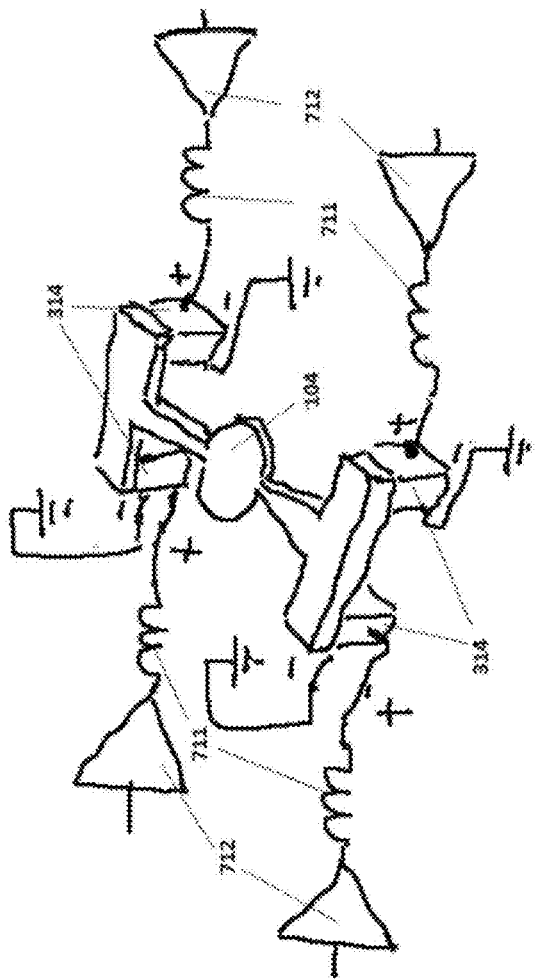
FIG. 16F is a drive circuit configured such that different piezo elements used to drive the mirror to oscillate are driven at different phases.

FIG. 16F is an arrangement wherein different piezo elements 314 are driven at different phase. In this case, each of four piezo elements 314 are connected through an inductor 711 to the output of a resonant power driver 712. Since different pixels are illuminated by reflected light that was emitted at different positions of the scanning mirror, the sensor electronics responsible for ToF measurement must be synchronized with the mirror movement.

FIG. 16G is an arrangement wherein the sensor timing is driven off the end pickoff pulse 706a. Since the actual time that elapses from the moment when the mirror is pointing toward the pickoff sensor, to the moment it is pointing toward the target point visible to the given pixel indexed by pixel position 724, the sensor electronics responsible for ToF measurement must also be aware of the current frequency of the mirror 725, which may change somewhat during operation Mirror current frequency 725 and pixel position 724 are provided as input to the scan profile LUT 722, resulting in the accurate measurement of the ToF.

FIG. 16H is an arrangement where a PLL 723 is utilized to smooth the pickoff pulse 706 in the event that any jitter occurred in the pickoff pulse 706.

Figure 17A:
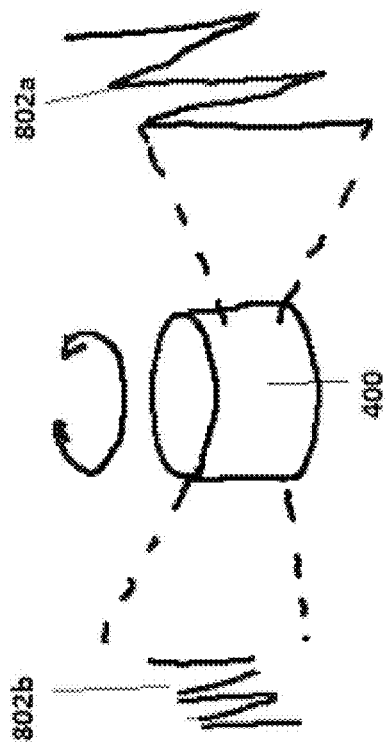
FIGS. 17A-17E illustrate optical arrangements where the horizontal slow stage of scanning is implemented by rotating a high-speed linear scanned column.

As previously described, the high speed scanned column has a slow stage component for providing the horizontal direction of scanning. FIGS. 17A-17E illustrate examples wherein the horizontal slow stage of scanning is implemented by rotating the high-speed linear scanned column. In FIG. 17A an embodiment is illustrated wherein the range of the device is selectively altered during various stages of the image. In this example 801a represents the forward scans in the 0-180 degrees of a 360-degree scanner, and 801b represents the rear scans in the 180-360 degrees of the 360-degree scanner. The laser power output when forward scanning 801a can be increased thereby increasing the laser energy falling on the target, and thereby effectively increasing the range of the LIDAR system. This might be desirable, for example, in a car, where the system wants maximum range forward of the car. The laser power output when rear scanning 801b can be decreased thereby decreasing the laser energy falling on the target, and thereby effectively reducing the range of the LIDAR system. This might be desirable, for example, in a car, where the information to the rear of the car is less critical and a lesser range is required. Reducing the laser power during portions of the scan has the effect of reducing the overall power consumed by the LIDAR system.

Figure 17B:
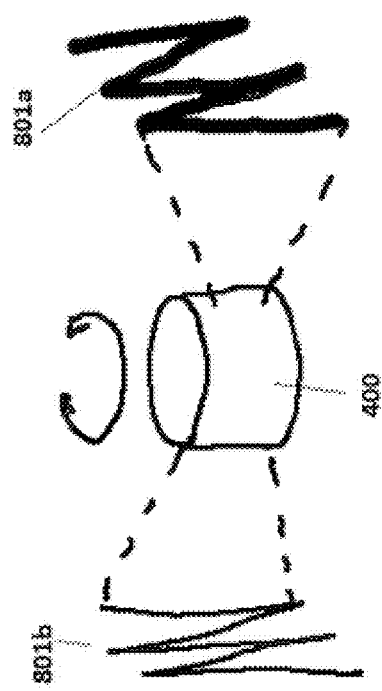

In FIG. 17B an embodiment is illustrated wherein the effective vertical FOV of the device is selectively altered during various stages of the image, by altering the time during which the laser is on. In this example 802a represents the forward scans in the 0-180 degrees of a 360-degree scan, and 802b represents the rear scans in the 180-360 degrees of the 360-degree scan. When forward scanning that produces forward scans 802a, the laser is energized for a longer time, thereby maximizing the number of pixels in each column scanned, and thereby effectively maximizing the resolution of the LIDAR system. This might be desirable, for example, in a car, where the system wants maximum resolution in the direction forward of the car (i.e., the direction of travel). When rear scanning that produces scans 802b, the laser is on for a smaller portion of the vertical high-speed scans thereby decreasing the number of illuminated pixels and respectively, the vertical resolution of the system. This might be desirable, for example, in a car, where the information to the rear of the car is less critical and a high resolution is not required. Turning off the laser power for shorter periods during vertical high speed has the effect of reducing the overall power consumed by the LIDAR system.

Figure 17C:
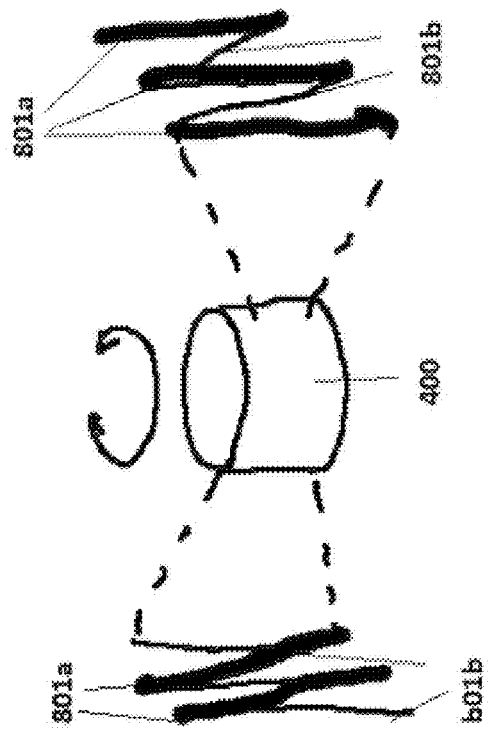

FIG. 17C is an embodiment where the laser power applied during various high-speed vertical scans is varied. For example, every 4th vertical scan can be high powered and the remaining vertical scans can be at low power. In this manner the entire image field has interlaced long and short range scans. Turning down the laser power during some of the vertical high speed scans has the effect of reducing the overall power consumed by the LIDAR system.

Figure 17E:
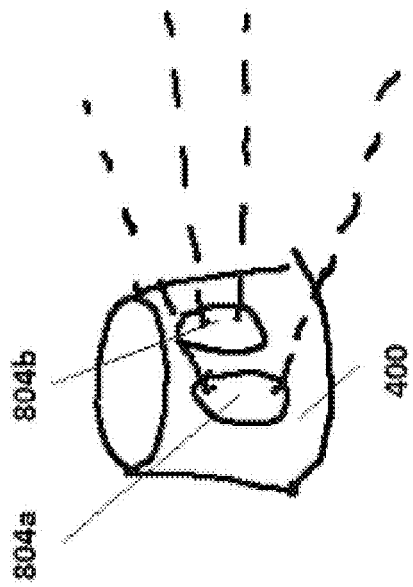
Figure 17D:
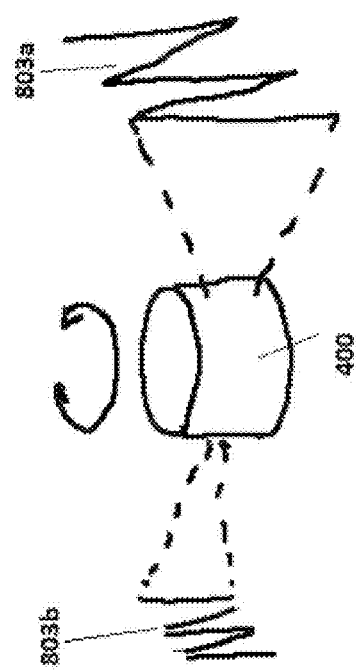

In FIG. 17D an embodiment is illustrated wherein the vertical scan angle of the device is selectively altered during various stages of the image. In this example 803a represents the forward scans in the 0-180 degrees of a 360-degree scan, and 803b represents the rear scans in the 180-360 degrees of the 360-degree scan. When forward scanning results in scans 803a, the maximum angle of scan in the vertical direction is enable. When rear scanning 803*b*, the scan angel of the vertical high-speed scans is reduced.

The embodiments shown with respect to 17A-17D were illustrated with 360-degree horizontal devices. The concepts presented herein could equally apply to other horizontal fields of view, such a 120-degree or 180-degree fOV LIDAR system. Further, while just two zones were shown (front facing and rear facing), this invention is not so limited. Multiple zones could be implemented, each have a varied field of view. Each zone can have its own range and/or resolution. Furthermore, each of the inventions shown in FIGS. 17A-17D can be combined in any combination into a single LIDAR system. For example, the forward-facing view can have both increased laser power and the maximum resolution, while the rear facing view can have both the reduced laser power and the reduced resolution.

FIG. 17E is an embodiment wherein two LIDAR systems are incorporated into one LIDAR package. A narrow vertical angle device with long range 804*b* can be combined with a wide vertical angle short range device 804*a*.

Figure 17F:
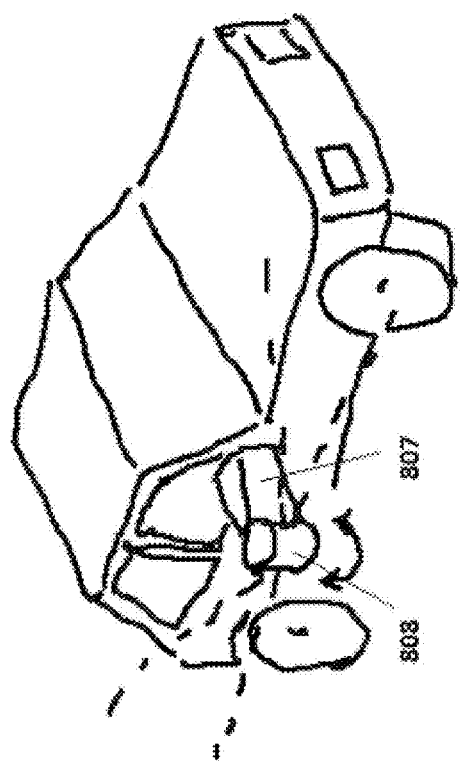
FIG. 17F shows a car that uses mounting structure to support a LIDAR system as disclosed herein.

FIG. 17F shows a car that uses mounting structure 807 to support a LIDAR system 808 as disclosed herein, which LIDAR system may, for example, be configured to have a forward facing view and forward scans, and a rear facing view and rear scans.

What is claimed is:

1. An optical system for a light detection and ranging (LIDAR) system comprising:
   a laser configured to emit a beam of light at a wavelength;
   an optical transmission system configured to shape the beam of light emitted by said laser, said optical transmission system comprising:
      a first mirror, said first mirror configured to pivot about an axis to scan said beam of light; and
      a fold mirror, said fold mirror positioned to reflect said scanned beam of light along a fan of transmission light paths toward a target;
   an optical reception system configured to collect said laser light reflected from the target along a fan of reception light paths, said optical reception system comprising:
      a lens; and
      a sensor array, said sensor array having a field of view (FOV) on at least a portion of the target
   a wedge-shaped optical element configured to create an auxiliary field of view;
   wherein said wedge-shaped optical element is positioned proximate to an outside edge of said lens; and
   wherein said fold mirror is positioned proximate to, but beyond said outside edge of said lens.

2. The optical system according to claim 1, wherein said wedge-shaped optical element comprises a width configured to cover one-quarter of said lens.

3. The optical system according to claim 2, wherein said wedge-shaped optical element comprises a variable transparency, having increasing transparency with increasing distance from a center of said first lens.

4. The optical system according to claim 3, wherein said scanner comprises a mirror configured to pivot about an axis to scan said beam of light toward said fold mirror.

5. The optical system according to claim 4, wherein said fold mirror comprises a plurality of mirrors arranged in an arcuate pattern to reflect said scanned beam of light toward the target.

6. The optical system according to claim 5, wherein said scanner comprises a polygonal reflector configured to rotate about an axis to sequentially scan said beam of light toward each of said plurality of mirrors arranged in said arcuate pattern.

7. The optical system according to claim 1, wherein said optical transmission system further comprises:
   a pair of telescopic lens elements.

8. The optical system according to claim 1,
   wherein said sensor array comprises: a plurality of sensors each having a unique length and width; and
   wherein a center of each of said plurality of sensors are arranged in a line to form a linear sensor array.

9. The optical system according to claim 1,
   wherein said sensor array comprises: a plurality of sensors each having the same length and width; and
   wherein a lengthwise direction of each of said plurality of sensors are parallel, and a center of each of said plurality of sensors are positioned to form an arcuate shape.

* * * * *